(12) United States Patent
Saund et al.

(10) Patent No.: US 10,296,570 B2
(45) Date of Patent: May 21, 2019

(54) REFLOW NARRATIVE TEXT OBJECTS IN A DOCUMENT HAVING TEXT OBJECTS AND GRAPHICAL OBJECTS, WHEREIN TEXT OBJECT ARE CLASSIFIED AS EITHER NARRATIVE TEXT OBJECT OR ANNOTATIVE TEXT OBJECT BASED ON THE DISTANCE FROM A LEFT EDGE OF A CANVAS OF DISPLAY

(71) Applicant: Palo Alto Research Center Incorporated, Palo Alto, CA (US)

(72) Inventors: Eric Saund, San Carlos, CA (US); James V. Mahoney, San Francisco, CA (US); William C. Janssen, Jr., Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 1100 days.

(21) Appl. No.: 14/062,971

(22) Filed: Oct. 25, 2013

(65) Prior Publication Data

US 2015/0121183 A1    Apr. 30, 2015

(51) Int. Cl.
*G06F 17/21* (2006.01)
*G06F 17/22* (2006.01)
*G06F 17/24* (2006.01)

(52) U.S. Cl.
CPC ............ *G06F 17/24* (2013.01); *G06F 17/211* (2013.01); *G06F 17/212* (2013.01); *G06F 17/2294* (2013.01)

(58) Field of Classification Search
CPC ... G06F 17/211; G06F 17/212; G06F 17/2294

USPC ............... 715/243, 244, 245, 246, 247, 253
See application file for complete search history.

(56) References Cited

U.S. PATENT DOCUMENTS

| | | | |
|---|---|---|---|
| 4,723,209 A * | 2/1988 | Hernandez | G06F 17/211 345/636 |
| 6,061,696 A | 5/2000 | Lee et al. | |
| 6,092,114 A | 7/2000 | Shaffer | |
| 6,223,213 B1 | 4/2001 | Cleron et al. | |
| 6,425,001 B2 | 7/2002 | Lo et al. | |

(Continued)

OTHER PUBLICATIONS

Saund et al. "Perceptually-Supported Image Editing of Text and Graphics," Proc. UIST 2003, ACM Symposium on User Interface Software and Technology, pp. 10 pgs.

(Continued)

*Primary Examiner* — Cesar B Paula
*Assistant Examiner* — Yahao Chen
(74) *Attorney, Agent, or Firm* — Fay Sharpe LLP

(57) ABSTRACT

A method and system is provided to author an electronic document having content including document objects, the documents objects including at least text objects and graphical objects, the graphical objects including at least one of image objects, structured graphics, digital ink, and hyperlinks. The method and system modifies the content of the electronic document, and applies an automatic hybrid reflow process to reflow at least one of the text objects of the electronic document in accordance with the applied automatic hybrid reflow process. The applied automatic hybrid reflow process acting to position the text objects and the graphical objects on the electronic document.

41 Claims, 58 Drawing Sheets

(56) References Cited

U.S. PATENT DOCUMENTS

| | | | |
|---|---|---|---|
| 6,903,751 | B2 | 6/2005 | Saund et al. |
| 7,036,077 | B2 | 4/2006 | Saund et al. |
| 7,076,730 | B1 | 7/2006 | Baker |
| 7,086,013 | B2 | 8/2006 | Saund et al. |
| 7,177,483 | B2 | 2/2007 | Saund |
| 7,177,811 | B1 | 2/2007 | Ostermann et al. |
| 7,949,950 | B2 | 5/2011 | Van Hoof |
| 8,023,738 | B1* | 9/2011 | Goodwin ............ G06K 9/00469 382/175 |
| 8,519,971 | B1* | 8/2013 | MacKraz ................ G06F 3/147 313/504 |
| 8,849,725 | B2* | 9/2014 | Duan ................ G06F 17/30873 706/12 |
| 9,021,035 | B2 | 4/2015 | Auriemma |
| 2002/0120693 | A1 | 8/2002 | Rudd |
| 2002/0152245 | A1 | 10/2002 | McCaskey |
| 2003/0014445 | A1* | 1/2003 | Formanek ............. G06F 17/211 715/247 |
| 2004/0010757 | A1 | 1/2004 | McCoy et al. |
| 2004/0146199 | A1* | 7/2004 | Berkner ............ G06F 17/30905 382/176 |
| 2004/0183830 | A1 | 9/2004 | Cody et al. |
| 2004/0268246 | A1 | 12/2004 | Leban |
| 2005/0086594 | A1 | 4/2005 | Schlimmer |
| 2006/0075033 | A1 | 4/2006 | Bienstock et al. |
| 2006/0238795 | A1 | 10/2006 | Van Hoof |
| 2006/0265458 | A1 | 11/2006 | Aldrich et al. |
| 2007/0233791 | A1 | 10/2007 | Sylthe et al. |
| 2008/0022197 | A1* | 1/2008 | Bargeron .............. G06F 17/211 715/246 |
| 2008/0107338 | A1* | 5/2008 | Furmaniak ......... G06K 9/00469 382/176 |
| 2009/0222714 | A1* | 9/2009 | Vaschillo .............. G06F 17/211 715/200 |
| 2009/0327864 | A1 | 12/2009 | Bogestam et al. |
| 2010/0040287 | A1* | 2/2010 | Jain .................... G06K 9/00463 382/177 |
| 2010/0275152 | A1* | 10/2010 | Atkins .................. G06F 17/212 715/788 |
| 2011/0161806 | A1* | 6/2011 | Stern ..................... G06F 17/211 715/247 |
| 2011/0167081 | A1* | 7/2011 | Kosaka .............. G06K 9/00456 707/769 |
| 2012/0079367 | A1 | 3/2012 | Carter |
| 2012/0096344 | A1* | 4/2012 | Ho ........................ G06F 17/211 715/249 |
| 2012/0128249 | A1* | 5/2012 | Panjwani ........... G06K 9/00469 382/177 |
| 2012/0246594 | A1 | 9/2012 | Han |
| 2012/0276880 | A1 | 11/2012 | Angorn et al. |
| 2012/0288190 | A1* | 11/2012 | Tang ........................ G06K 9/00 382/165 |
| 2013/0006759 | A1 | 1/2013 | Srivastava |
| 2013/0159823 | A1* | 6/2013 | Ri ........................ G06F 17/211 715/204 |
| 2013/0191734 | A1* | 7/2013 | Ayers .................... G06F 17/212 715/252 |
| 2013/0212470 | A1 | 8/2013 | Karunamuni et al. |
| 2013/0326321 | A1* | 12/2013 | Simmons .............. G06F 3/0481 715/202 |
| 2014/0208191 | A1* | 7/2014 | Zaric .................... G06F 17/211 715/201 |
| 2014/0215308 | A1* | 7/2014 | Cantrell ............ G06F 17/30905 715/234 |
| 2014/0289614 | A1* | 9/2014 | Ayers .................. G06F 3/04842 715/247 |
| 2014/0325407 | A1* | 10/2014 | Morris ................ G06F 3/04842 715/765 |
| 2015/0058711 | A1* | 2/2015 | Zeng .................... G06F 17/2247 715/234 |
| 2015/0121179 | A1 | 4/2015 | Saund et al. |
| 2015/0121202 | A1 | 4/2015 | Saund et al. |
| 2015/0121203 | A1 | 4/2015 | Saund et al. |
| 2015/0121305 | A1 | 4/2015 | Saund et al. |

OTHER PUBLICATIONS

Doush et al., "Detecting and Recognizing Tables in Spreadsheets", DAS 2010, Proceedings of the $9^{th}$ IAPR Int'l Workshop on Document Analysis Systems, ACM NY, NY, 8 pgs.

Saund et al., "Minimizing Modes for Smart Selection in Sketching/Drawing Interfaces", in J. Jorge and F. Samavati, eds., Sketch-based Interfaces and Modeling, Springer, 2011, pp. 1-27.

Rubine, "Specifying Gestures by Example", Computer Graphics, vol. 25, No. 4, Jul. 1991, Proc. SIGGRAPH 1991, New York ACM Press, pp. 329-337.

U.S. Application Serial No. , filed herewith, and entitled "System and Method for Transmitting Mixed Content Type Messages", by Eric Saund et al.

U.S. Application Serial No. , filed herewith, and entitled "System and Method for Generating Uniform Format Pages For a System for Composing Messages", by Eric Saund et al.

U.S. Application Serial No. , filed herewith, and entitled "Method and System for Enhanced Inferred Mode—User Interface Operation", by Eric Saund et al.

U.S. Application Serial No. , filed herewith, and entitled "System and Method for Creating Graphically Rich Messages Incorporating Shared Docments", by Eric Saund et al.

King, "Google Docs, Gmail Get in Touch With Written Word Via Handwriting Support", Between the Lines, Oct. 22, 2013, retrieved from the Internet at http://www.zdnet.com/google-docs-gmail-get-in-touch-with-written-word-via-handwriting-support-7000.

Wikipedia, "Scalable Vector Graphics," (Jun. 23, 2006) https://web.archive.org/web/20060623120417/http://en.wikipedia.org/wiki/Scalable_Vector_Graphics (retrieved Sep. 1, 2015).

Email from Paul Lindner to Internet Assigned Numbers Authority (IANA) (Jun. 4, 1993) (registering a digital video MIME subtype) (available at http://www.iana.org/assignments/media-types/video-quicktime) (retrieved Mar. 29, 2016).

Email from Alan Francis to IANA (Nov. 1, 1995) (registering a computer graphics MIME subtype) (available at http://www.iana.org/assignments/media-types/image/cgm) (retrieved Mar. 29, 2016).

Inkml+xml subtype (Aug. 15, 2011) (available at http://www.iana.org/assignments/media-types/application/inkml+xml) (retrieved Mar. 29, 2016).

MP4 subtype (Aug. 20110 (available at http://www.iana.org/assignments/media-types/audio/mp4) (retrieved Mar. 29, 2016).

* cited by examiner

FROM FIG. 6A

-610. After attachment page images are rendered on the server, they are automatically downloaded and appear in the VMail page view region (or pane).

-611. User views page images
-612. User selects region, executes drag and drop of selected material to the message composition region (or pane).

-613. Automatic image processing to make background transparent
-614. Automatic image sizing
-615. Automatic image positioning -616. User drags or pastes another document to view pages region (or pane) from file system, desktop, etc.

FROM FIG. 6B

-617. Other document is uploaded to the VMail Page Rendering Service
-618. VMail Page Rendering Service commences rendering page images and retrieving cached page images
-619. page images from other document are downloaded to the VMail page view region (or pane).

-620. User continues editing the message text
-621. User adds freeform digital ink in the message editing region (or pane).
-622. User adds structured graphics annotations in the message editing region (or pane).

-623. User edits email Subject, To: and Cc: fields.

-624. VMail system exchanges data with the user's email client and computer system to provide address book lookup and text completion.

-625. User presses "Send" button

-626. VMail system assembles message elements into multipart MIME format and transmits message to email server.
-627. VMail application exits.

FIG. 6C

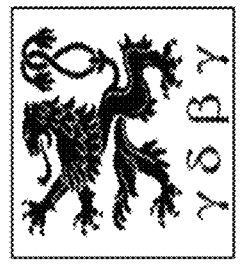
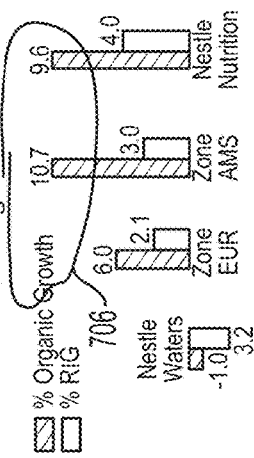
FIG. 7

FIG. 9A

| | A | B | C | D | E | F |
|---|---|---|---|---|---|---|
| 1 | Category | Item | Quantity | Weight (oz) | Weight (g) | Weight (pds) |
| 2 | Clothing Worn | | | | | |
| 3 | Hats | They LT3 | | 4.00 | 113.40 | |
| 4 | Clothing-Base layer -Shirts | Smartwool Aero | | 7.00 | 198.45 | |
| 5 | Clothing-Base layer -Underwear | Nike Spandex Running Short Tights | | 3.00 | 85.05 | |
| 6 | Clothing-Soft Shell-Pants | Cloudveil Prospector Pant | | 9.00 | 255.15 | |
| 7 | Footwear-Socks | Smartwool Trainner II | | 1.50 | 42.52 | |
| 8 | Footwear-Trail Running Shoes | Montrail Viesse II | | 26.00 | 737.09 | 1 lb 10 oz |
| 9 | | | | | | |
| 10 | | | Subtotal | 50.50 | 1431.65 | 3 lb 3 oz |
| 11 | | | | | | |
| 12 | Other Items Worn / Carried | | | | | |
| 13 | Trekking Poles | Bozeman Mountain Works STIX Pro | | 2.72 | 77.11 | |
| 14 | First Aide & Survival | ACR Whistle AirCore Spectra cord lanyard | | 1.00 | 28.35 | |
| 15 | Watchs | Suunto X5 | | 1.30 | 36.85 | |
| 16 | | | Subtotal | 5.02 | 142.31 | |
| 17 | | | | | | |
| 18 | | | | | | |
| 19 | Other Clothing | | | | | |
| 20 | Clothing-Wind Shirts | Montage Aero con Pulover | | 3.00 | 85.05 | |
| 21 | Clothing-Insulating-Jackets | Bozeman Mountain Works Co | | 8.00 | 226.80 | |
| 22 | Clothing-Raingear-Jackets | Montane Superfly Jacket | | 8.80 | 249.48 | |
| 23 | Clothing-Raingear-Pants | Golite Record | | 5.00 | 141.75 | |
| 24 | Hats | PossumDown Beanie Hat | | 1.85 | 52.45 | |
| 25 | Gloves | PossumDown Gloves | | 1.30 | 36.85 | |
| 26 | Gloves | Outdoor Research Rain Mitts | Subtotal | 1.10 | 31.18 | |
| 27 | | | | 29.05 | 823.05 | 1 lb 1, 3 oz |
| 28 | | | | | | |
| 29 | | | | | | |
| 30 | Sleep System | | | | | |
| 31 | Shelters-Taps & Flacrless | Bozeman Mountain Works Stealth 1 LITE | | 7.50 | 212.62 | |
| 32 | Stakes & Guylines | BMW Lazr HI-VIS Titanium Stakes | 8 | 1.89 | 53.71 | |
| 33 | Stakes & Guylines | Bozeman Mountain Works AirCore 1 | 25 | 0.10 | 2.83 | |
| 34 | Bivy Sacks | Bozeman Mountain Works Vaper Bvy Sack | | 6.50 | 184.27 | |
| 35 | Sleeping Bags-Top Bags & Quilts | Bozeman Mountain Works Arc X | | 16.00 | 453.59 | 1 lb 0 oz |
| 36 | Sleeping Packs-Inflatable | Bozeman Mountain Works Torsoline | | 10.00 | 283.50 | |
| 37 | | | | | | |
| 38 | | | | | | |
| 39 | | | | 41.99 | 1190.52 | 2 lb 10 oz |
| 40 | Packing | | | | | |
| 41 | Backpacks-Frameless | Six Moon Designs Moonline | Subtotal | 16.00 | 453.59 | 1 lb 0 oz |
| 42 | Stuf Sacks | Bozeman Mountain Works SoinSack-Small | 2 | 0.50 | 14.17 | |

FIG. 10B

```
                                    lori-ipsum-html-src-synopsis.text
       <!DOCTYPE html PUBLIC "-//W3C//DTD HTML 4.01//EN"
       "http://www.w3.org/TR/html4/strict.dtd">
       <html><head>
       <meta content="text/html; charset=ISO-8859-1"
       http-equiv="content-type"><title>lori-ipsum-html</title>
         <style type="text/css"></style></head>
       <body>
1201 ─── <img style="width: 93px; height: 38px; position: absolute; top: 49px; left: 350px;"
       alt="lori-ipsum-encircling"
       src="data:image/png;base64,iVBORw0KGgoAAAANSUhEUgAAAJMAAAA8CAYAAABir4guAAAjQklEQVR4A
       e1dd3xVvbZGQUqA0EMMN

[ Base64 encoding of image omitted for brevity ]

/OzAJuIIm44AAAAASUVORK5CYII=">

1202 ─── <div style="position: absolute; top: 59px; left: 77px;"><span style="font-family:
       Helvetica,Arial,sans-serif;">
       Lorem ipsum dolor sit amet, consectetur adipisicing elit,</span>
       <br style="font-family: Helvetica,Arial,sans-serif;">
       <span style="font-family: Helvetica,Arial,sans-serif;">
       sed do eiusmod tempor incididunt ut labore et dolore magna</span>
       <br style="font-family: Helvetica,Arial,sans-serif;">
       <span style="font-family: Helvetica,Arial,sans-serif;">
       aliqua. Ut enim ad minim veniam, quis nostrud exercitation</span>
       <br style="font-family: Helvetica,Arial,sans-serif;">
       <span style="font-family: Helvetica,Arial,sans-serif;">
       ullamco laboris nisi ut aliquip ex ea commodo consequat</span>.
       </div>

1203 ─── <img alt="lori-ipsum-tshirt" style="height: 326px; width: 326px; position: absolute;
       top: 147px; left: 102px;"
```

FROM FIG. 12-1 src="data:image/png;base64,iVBORw0KGgoAAAANSUhEUgAAAUUAAAAFFCAYAAAB7dP9dAAGJjUlEQVR4A
ey9d5yfVbX/6+tcPX0E

[ Base64 encoding of image omitted for brevity ]

bV70p/hBQPH/ApI98IHnQV3BAAAAAElFTkSuQmCC">
1204 — `<img style="width: 139px; height: 63px; position: absolute; top: 225px; left: 363px;" alt="lori-ipsum-arrow" src="data:image/png;base64,iVBORw0KGgoAAAANSUhEUgAAAJ4AAAA7CAYAAACKVDMmAAAGwUlEQVR4A e2c21MURxSH+Y+iaMUE`

[ Base64 encoding of image omitted for brevity ]

YsmvWEbLkMAjxRPCgJBMjdYWu15+xSTwSPGEMCAkUIIs+RXLaBkSeKR4QhgQkqnR2kLXy6+Y/wNO
F2aSzZoWbwAAAABJRU5ErkJggg==">
1205 — `<div style="position: absolute; top: 517px; left: 68px;"><span style="font-family: Helvetica,Arial,sans-serif;">`
Duis aute irure dolor in reprehenderit in voluptate velit esse
`</span><br style="font-family: Helvetica,Arial,sans-serif;">`
`<span style="font-family: Helvetica,Arial,sans-serif;">`
cillum dolore eu fugiat nulla pariatur. Excepteur sint occaecat
`</span><br style="font-family: Helvetica,Arial,sans-serif;">`
`<span style="font-family: Helvetica,Arial,sans-serif;">`
cupidatat non proident, sunt in culpa qui officia deserunt
`</span><br style="font-family: Helvetica,Arial,sans-serif;">`
`<span style="font-family: Helvetica,Arial,sans-serif;">`
mollit anim id est laborum.
`</span>`
`</div>`

`</body></html>` lori-ipsum-html-src-synopsis.text

FIG. 12-2

```
<?xml version="1.0" standalone="no"?>
<!-- Generated by VMail, Palo Alto Research Center (PARC) -->
<svg:svg contentScriptType="text/ecmascript" width="531px"
  xmlns:xlink="http://www.w3.org/1999/xlink"
  zoomAndPan="magnify" xmlns:svg="http://www.w3.org/2000/svg" contentStyleType="text/css" height="602px"
  preserveAspectRatio="xMidYMid meet" xmlns:sssvg="http://www.parc.com/scanscribesvg"
  xmlns="http://www.w3.org/2000/svg" version="1.0">
  <svg:symbol preserveAspectRatio="xMidYMid meet">
    <svg:g type="formatted-text" id="_14520">
      <svg:defs>
        <svg:text x="76.5" font-size="16" y="58.5" fill="Black" color="Black" font-family="SansSerif" id="t_14520">
          <svg:tspan x="76" y="74">
            Lorem ipsum dolor sit amet, consectetur adipisicing elit,   </svg:tspan>
          <svg:tspan x="76" y="90">
            sed do eiusmod tempor incididunt ut labore et dolore magna   </svg:tspan>
          <svg:tspan x="76" y="106">
            aliqua. Ut enim ad minim veniam, quis nostrud exercitation   </svg:tspan>
          <svg:tspan x="76" y="122">
            ullamco laboris nisi ut aliquip ex ea commodo consequat.   </svg:tspan>
        </svg:text>
        <svg:image x="76.5" y="58.5" width="414.0" xmlns:xlink="http://www.w3.org/1999/xlink"
          xlink:type="simple" xlink:actuate="onLoad" height="78.0" id="_14516" preserveAspectRatio="xMidYMid meet"
          xlink:show="embed"
          xlink:href="data:image/png;base64,iVBORw0KGgoAAAANSUhEUgAAAZ4AAABOCAYAAAAQNXCUAAAZZEIEQVR4Ae2bi3IbyY5t
+/9/ekZw
nOVevQ1UZIEkZdl5l3gB7BeySmIT7pn5559//vm//j9X/9/3+lvJz+D3f/d57uq969H9+K3+/etbj
⋮
[ Base64 encoding of image omitted for brevity ]

nmeFnZzi/lh/invfxuvfhPzR33/NnvHd3Hf13/t7sD/f/G6/+x0+Xzz/+6fn33v3y/v+0ffYP3me83f/d
nTP/eV9/9/3/0nty+e38XzLeAZ7gfcZ7/hL/8/4S9/44/0+9+h/8faKGv/VRoHWjk4AAAAASUVORK5C
YII=">
        </svg:image>
      </svg:defs>
      <svg:use xlink:href="#_14520" xlink:type="simple" xlink:actuate="onLoad" xlink:show="embed"
        xmlns:xlink="http://www.w3.org/1999/xlink">
      </svg:use>
    </svg:g>
    <svg:path fill-opacity="0.75000000" fill="none" color="Red" width="1.00" style="fill:none;
      stroke:Red; stroke-width:1.00px; fill-opacity:0.75000000" d="M 421 45 L 420 45 L 419 45 L 417 45
```

FROM FIG. 13-1

```
L 438 56 L 437 55 L 435 54 L 433 53 L 432 52 L 431 51 L 430 50 L 429 50 L 429 49" id="_14525"
pathLength="224.23659" opacity="1.0" stroke="Red" stroke-width="0.5px">
   </svg:path>
   <svg:image x="102.0" y="147.0" width="325.0" xmlns:xlink="http://www.w3.org/1999/xlink" xlink:type="simple"
1305  xlink:actuate="onLoad" height="325.0" id="_14542" preserveAspectRatio="xMidYMid meet"
   xlink:show="embed"
   xlink:href="data:image/png;base64,iVBORw0KGgoAAAANSUhEUgAAAUUAAAFFCAYAAAB7dP9dAAGJUIEQVR4Aey9d5yfVbX/6+tc
PXoE

[ Base64 encoding of image omitted for brevity ]

bV7Op/hBQPH/ApI98IHnQV3BAAAAAEIFTkSuQmCC">
   </svg:image>
   <svg:image x="363.17654" y="224.68912" width="157.99997" xmlns:xlink="http://www.w3.org/1999/xlink"
1306  xlink:type="simple" xlink:actuate="onLoad" height="59.0" id="_14547" preserveAspectRatio="xMidYMid meet"
   xlink:show="embed"
   xlink:href="data:image/png;base64,iVBORw0KGgoAAAANSUhEUgAAAJ4AAAA7CAYAAACKVDMmAAAGwUIEQVR4Ae2c21MURxS
H+Y+iaMUE

[ Base64 encoding of image omitted for brevity ]

F2aSzZoWbwAAAABJRU5ErkJggg==">
   </svg:image>
   <svg:g type="formatted-text" id="_14571">
1307 <svg:defs>
   <svg:text x="68.5" font-size="16" y="517.5" fill="Black" color="Black" font-family="SansSerif" id="_14571">
1308  <svg:tspan x="68" y="533">
   Duis aute irure dolor in reprehenderit in voluptate velit esse   </svg:tspan>
      <svg:tspan x="68" y="549">
   cillum dolore eu fugiat nulla pariatur. Excepteur sint occaecat   </svg:tspan>
      <svg:tspan x="68" y="565">
   cupidatat non proident, sunt in culpa qui officia deserunt   </svg:tspan>
      <svg:tspan x="68" y="581">
   mollit anim id est laborum.    </svg:tspan>
   </svg:text>
   <svg:image x="68.5" y="517.5" width="415.0" xmlns:xlink="http://www.w3.org/1999/xlink"
1309  xlink:type="simple" xlink:actuate="onLoad" height="75.0" id="_14627" preserveAspectRatio="xMidYMid meet"
```

FROM FIG. 13-2

```
    xlink:show="embed"
xlink:href="data:image/png;base64,iVBORw0KGgoAAAANSUhEUgAAAZ8AAABLCAYAAACvOooZAAAWl0lEQVR4Ae2c25LrRrJD/f8/
7VF6

[ Base64 encoding of image omitted for brevity ]

3Of3H8vphO7GlpM6AAAAAElFTkSuQmCC">
      </svg:image>
    </svg:defs>
    <svg:use xlink:href="#_14571" xlink:type="simple" xlink:actuate="onLoad" xlink:show="embed"
      xmlns:xlink="http://www.w3.org/1999/xlink">
    </svg:use>
  </svg:g>
  <svg:g type="composite" id="_14550">
    <svg:use xlink:href="#_14520" xlink:type="simple" xlink:actuate="onLoad" xlink:show="embed"
      xmlns:xlink="http://www.w3.org/1999/xlink">
    </svg:use>
    <svg:use xlink:href="#_14525" xlink:type="simple" xlink:actuate="onLoad" xlink:show="embed"
      xmlns:xlink="http://www.w3.org/1999/xlink">
    </svg:use>
    <svg:use xlink:href="#_14542" xlink:type="simple" xlink:actuate="onLoad" xlink:show="embed"
      xmlns:xlink="http://www.w3.org/1999/xlink">
    </svg:use>
    <svg:use xlink:href="#_14547" xlink:type="simple" xlink:actuate="onLoad" xlink:show="embed"
      xmlns:xlink="http://www.w3.org/1999/xlink">
    </svg:use>
  </svg:g>
</svg:symbol>
<svg:use xlink:href="#_14520" xlink:type="simple" xlink:actuate="onLoad" xlink:show="embed"
  xmlns:xlink="http://www.w3.org/1999/xlink">
</svg:use>
<svg:use xlink:href="#_14525" xlink:type="simple" xlink:actuate="onLoad" xlink:show="embed"
  xmlns:xlink="http://www.w3.org/1999/xlink">
</svg:use>
<svg:use xlink:href="#_14542" xlink:type="simple" xlink:actuate="onLoad" xlink:show="embed"
  xmlns:xlink="http://www.w3.org/1999/xlink">
</svg:use>
```

FROM FIG. 13-2

```
<svg:use xlink:href="#_14547" xlink:type="simple" xlink:actuate="onLoad" xlink:show="embed"
 xmlns:xlink="http://www.w3.org/1999/xlink">
</svg:use>
<svg:use xlink:href="#_14571" xlink:type="simple" xlink:actuate="onLoad" xlink:show="embed"
 xmlns:xlink="http://www.w3.org/1999/xlink">
</svg:use>
</svg:svg>
```

FIG. 13-4

1401 — Date: Tue, 14 May 2013 08:29:27 -0700 (PDT)
From: sender123@gmail.com
To: recipient123@gmail.com
Subject: test aaa1
MIME-Version: 1.0
Content-Type: multipart/related;
  boundary="----=_Part_0_1203591552.1368545365940"

1402 — ------=_Part_0_1203591552.1368545365940
Content-Type: multipart/alternative;
  boundary="----=_Part_1_1203349512.1368545366850"
Content-Disposition: inline 1403 — ------=_Part_1_1203349512.1368545366850
Content-Type: text/plain; charset=us-ascii
Content-Transfer-Encoding: 7bit
Content-Disposition: inline 1404 — [cid:image1.jpg@jj34.jj34]
1405 — aliqua. Ut enim ad minim veniam, quis nostrud exercitation
ullamco laboris nisi ut aliquip ex ea commodo consequat.
1406 — [cid:image2.jpg@jj34.jj34]
1407 — Duis aute irure dolor in reprehenderit in voluptate velit esse
cillum dolore eu fugiat nulla pariatur. Excepteur sint occaecat
cupidatat non proident, sunt in culpa qui officia deserunt
mollit anim id est laborum.

1408 — ------=_Part_1_1203349512.1368545366850
Content-Type: text/html; charset=us-ascii
Content-Transfer-Encoding: 7bit
Content-Disposition: inline 1409 — <html><body>
<p><img src="cid:image1.jpg@jj34.jj34"></p><b>
aliqua. Ut enim ad minim veniam, quis nostrud exercitation</b>
ullamco laboris nisi ut aliquip ex ea commodo consequat.</b>
<p><img src="cid:image2.jpg@jj34.jj34"></p><b>
<p>Duis aute irure dolor in reprehenderit in voluptate velit esse</b>
cillum dolore eu fugiat nulla pariatur. Excepteur sint occaecat</b>

FROM FIG. 14-1 cupidatat non proident, sunt in culpa qui officia deserunt</b>
mollit anim id est laborum.</b></p>
</body></html>
------=_Part_1_1203349512.1368545366850--

------=_Part_0_1203591552.1368545365940
1410 — Content-Type: image/jpeg;
       name="/temp/image_section1.jpg"
Content-Transfer-Encoding: base64
Content-Disposition: inline;
       filename="/temp/image_section1.jpg"
1412 — Content-ID: <image1.jpg@jj34.jj34>

/9j/4AAQSkZJRgABAQEBLAEsAAD/2wBDAAMCAgMCAgMDAwMEAwMEBQgFBQQEBQoHBwYIDAoMDAsK
CwsNDhIQDQ4RDgsLEBYQERMUFRUVDA8XGBYUGBIUFRT/2wBDAQMEBAUEBQkFBQkUDQsNFBQUFBQU

[ Base64 encoding of image omitted for brevity ]

KKKKACiiigAooooAKKKKACiiigAooooAKKKKACiiigAooooAKKKKACiiigAooooAKKKKACiiigAo
oooAKKKKACiiigAooooAKKKKACiiigApD0NFFACR/cFOoooAKKKKACiiigAooooAKKKKACiiigD/
2Q==
------=_Part_0_1203591552.1368545365940

FROM FIG. 14-2

1411 — Content-Type: image/jpeg;
   1413 — name="/temp/image_section2.jpg"
   Content-Transfer-Encoding: base64
   Content-Disposition: inline;
         filename="/temp/image_section2.jpg"
   Content-ID: <image2.jpg@jj34.jj34>

/9j/4AAQSkZJRgABAQEASABIAAD/2wBDAAMCAgMCAgMDAwMEAwMEBQgFBQQEBQoHBwYIDAoMDAsK
CwsNDhIQDQ4RDgsLEBYQERMUFRUVDA8XGBYUGBIUFRT/2wBDAQMEBAUEBQkFBQkUDQsNFBQUFBQU

[ Base64 encoding of image omitted for brevity ]

Mlz9Mfmazr03Or+ILOMW8qWVi5IIkf7sj4ITb9Msc+9dErbhkH6fnVN9wvqYPhzwdbalz3MjG7v5
P9ZdSHLH29hXSK+3AyPqO1QbsLknvTkcZJHH6VDGf//Z
----=_Part_0_1203591552.1368545365940--

FIG. 14-3

2320 → Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum

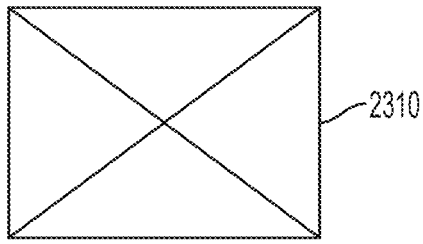

this is some text that has been placed deliberately on top of an image object ← 2330

2320 → Sed ut perspiciatis unde omnis iste natus error sit voluptatem accusantium doloremque laudantium, totam rem aperiam, eaque ipsa quae ab illo inventore veritatis et quasi architecto beatae vitae dicta sunt explicabo. Nemo enim ipsam voluptatem quia voluptas sit aspernatur aut odit aut fugit, sed quia consequuntur magni dolores eos qui ratione voluptatem sequi nesciunt. Neque porro quisquam est, qui dolorem ipsum quia dolor sit amet, consectetur, adipisci velit, sed quia non numquam eius modi tempora incidunt ut labore et dolore magnam aliquam quaerat voluptatem.

FIG. 23B

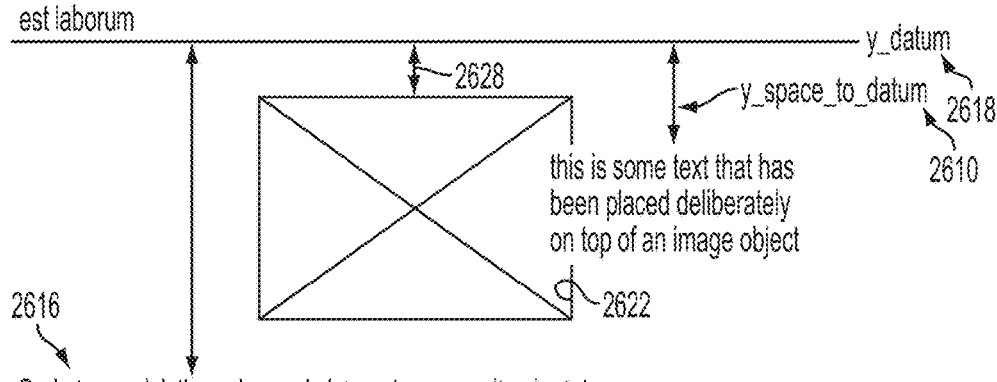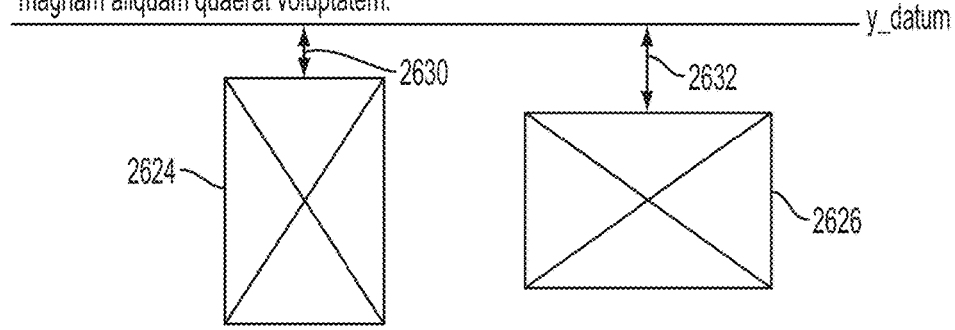
FIG. 26

REFLOW NARRATIVE TEXT OBJECTS IN A DOCUMENT HAVING TEXT OBJECTS AND GRAPHICAL OBJECTS, WHEREIN TEXT OBJECT ARE CLASSIFIED AS EITHER NARRATIVE TEXT OBJECT OR ANNOTATIVE TEXT OBJECT BASED ON THE DISTANCE FROM A LEFT EDGE OF A CANVAS OF DISPLAY

CROSS REFERENCE TO RELATED PATENTS AND APPLICATIONS

This application is related to the following applications, all of which are hereby incorporated by reference as if fully set forth herein:

U.S. application Ser. No. 14/062,934, Filed Oct. 25, 2013, and entitled "SYSTEM AND METHOD FOR CREATING GRAPHICALLY RICH MESSAGES INCORPORATING SHARED DOCUMENTS" by Eric Saund et al. (now abandoned);

U.S. application Ser. No. 14/062,942, Filed Oct. 25, 2013, and entitled "SYSTEM AND METHOD FOR TRANSMITTING MIXED CONTENT TYPE MESSAGES", by Eric Saund et al. (now abandoned);

U.S. application Ser. No. 14/062,954, Filed Oct. 25, 2013, and entitled "SYSTEM AND METHOD FOR GENERATING UNIFORM FORMAT PAGES FOR A SYSTEM FOR COMPOSING MESSAGES", by Eric Saund et al. (now abandoned); and U.S. application Ser. No. 14/063,002, Filed Oct. 25, 2013, and entitled "METHOD AND SYSTEM FOR ENHANCED INFERRED MODE—USER INTERFACE OPERATION", by Eric Saund et al. (now U.S. Pat. No. 9,659,279; Issued May 23, 2017).

BACKGROUND

The present application relates to electronic messages and documents and more particularly to improving the process of message and document generation and communication.

Presently a great deal of work between individuals is performed through written electronic discussion about shared documents. For example, it is common for electronic messages, such as email messages, to contain attachments or references to documents in shared repositories, and for the content of the email messages to refer to matter contained in these documents. A problem arises when the email correspondent wishes to directly include portions of these documents in their email message in order to refer to them, annotate them, or indicate modifications. Particularly, email is a text-based medium that does not readily support graphic markup or inclusive references to non-textual matter found in referenced documents.

To currently address these shortcomings emails can include attachments. Email attachments are separated from the body of email message text, which means that viewing both the body of an email, and material contained in attachments, requires different applications and view windows on a display screen of an electronic computing device (e.g., a computer, laptop, tablet, smartphone etc.).

Emails can include inline images, meaning that images can be interspersed with typed email text. It is possible in some email clients to author messages containing inline images derived from attachment documents, shared documents, or private documents. To generate such a message is currently a cumbersome multistep process involving opening a document in a viewer (different from the viewer in which the email is displayed), taking a screen snapshot, copying and pasting the image to another program which provides markup capabilities, performing markup on the document image, copying and then pasting the resulting marked up image into their email, then sizing and positioning the marked up image among their email text.

The present application addresses these and other shortcomings of the existing art.

INCORPORATION BY REFERENCE

The following Patents, Applications and Articles are incorporated herein by reference in their entireties: U.S. Pat. No. 7,177,483, "System And Method For Enhancement Of Document Images", by Saund; U.S. Pat. No. 7,086,013, "Method And System For Overloading Loop Selection Commands In A System For Selecting And Arranging Visible Material In Document Images", by Saund et al.; U.S. Pat. No. 6,903,751, "System And Method For Editing Electronic Images", by Saund et al.; U.S. Pat. No. 7,036,077, Method For Gestural Interpretation In A System For Selecting And Arranging Visible Material In Document Images" by Saund et al.; Saund et al., "Perceptually-Supported Image Editing of Text and Graphics," Proc. UIST 2003 (ACM Symposium on User Interface Software and Technology), pp. 183-192; Iyad Abu Doush et al., "Detecting And Recognizing Tables In Spreadsheets", DAS '10 (Proceedings of the 9th IAPR International Workshop on Document Analysis Systems) Pages 471-478 ACM New York, N.Y.; Eric Saund and Edward Lank, "Minimizing Modes for Smart Selection in Sketching/Drawing Interfaces" in J. Jorge and F. Samavati, eds., Sketch-based Interfaces and Modeling, Springer, 2011, pp. 55-80; and Rubine, D. (1991) Specifying gestures by example, Proc. SIGGRAPH 1991, New York ACM Press, 329-337.

BRIEF DESCRIPTION

A method and system is provided to author an electronic document having content including document objects, the documents objects including at least text objects and graphical objects, the graphical objects including at least one of image objects, structured graphics, digital ink, and hyperlinks. The method and system modifies the content of the electronic document, and applies an automatic hybrid reflow process to reflow at least one of the text objects of the electronic document in accordance with the applied automatic hybrid reflow process. The applied automatic hybrid reflow process acting to position the text objects and the graphical objects on the electronic document.

BRIEF DESCRIPTION OF THE DRAWINGS

FIGS. 6A to 6C depicts a representative workflow consisting of user activities and activities carried out by the processing modules of the VMail Application.

FIG. 7 illustrates elements of a mixed content type email message.

FIGS. 9A to 9C illustrates providing contextual material in the form of an indication of the page region a document region excerpt was extracted from.

FIGS. 10A to 10C illustrate selection and copy of contextual material in the case of a spreadsheet page image.

FIG. 10D-1 to 10D-2 present process flow diagrams for automatically selecting contextual material in the case of a spreadsheet page image.

FIGS. 12-1 to 12-2 is an HTML/CSS representation of a mixed content type email message.

FIGS. 13-1 to 13-4 is an SVG representation of a mixed content type email message.

FIGS. 14-1 to 14-3 is a multipart MIME email message representing a mixed content message.

FIG. 26 defines further text reflow concepts.

DETAILED DESCRIPTION

Figure 1:
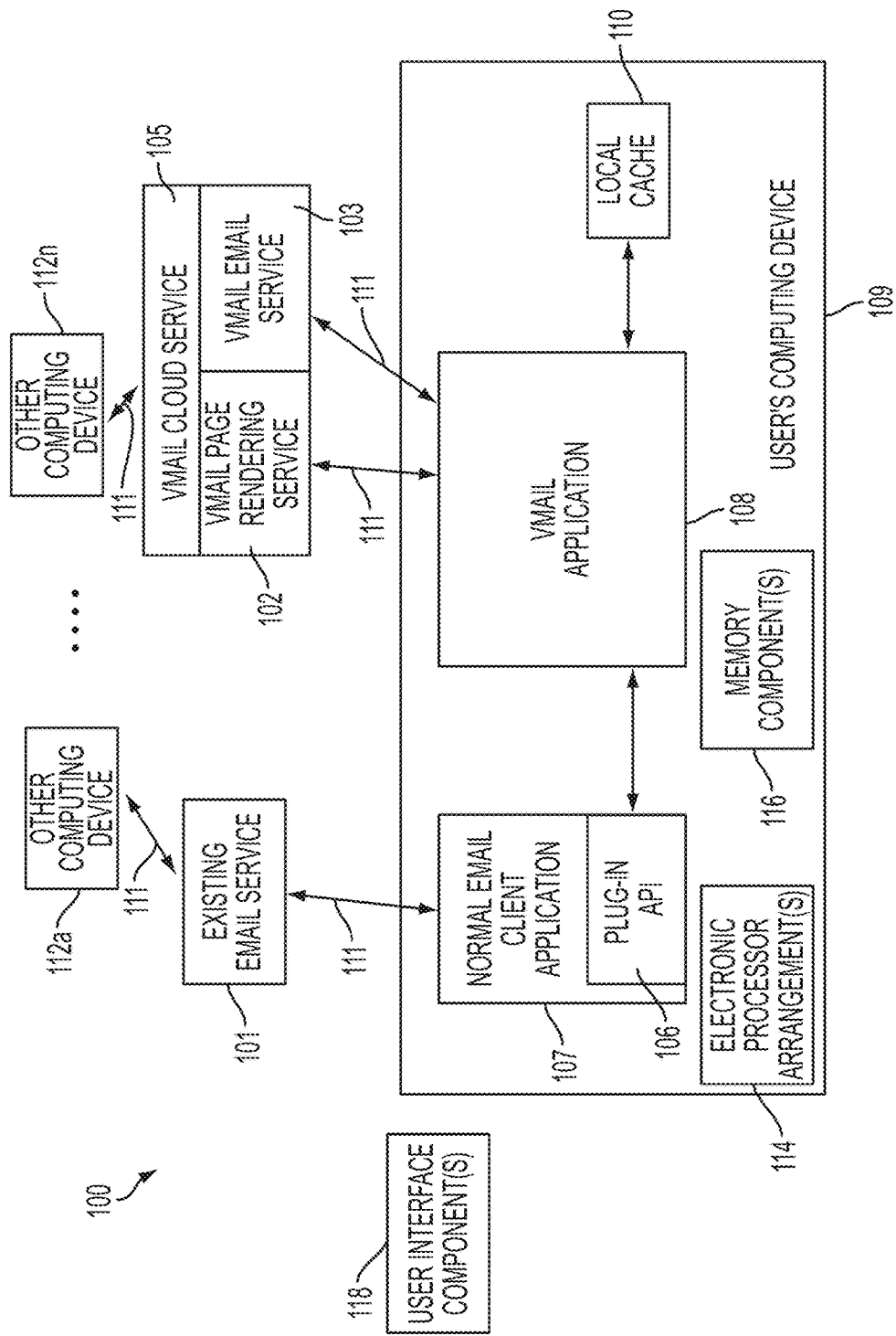
FIG. 1 presents system architecture and an environment for an embodiment of the present application in which a VMail Application is installed as a computer program on the user's electronic computing device, and serves as a companion to the user's normal/existing email client program.

As will be set out in detail in the following, the teachings of the present patent application simplify and streamline the process of referring to and including document material in the body of an electronically generated message, such as an email message. The disclosed systems and methods support the integrated inclusion of referenced document material in the body of an electronic message, which allows for composing and/or generating and the assembling of mixed content type electronic messages that have graphically rich layouts, including at least some of text, images, digital ink, graphic objects, annotations, voice (audio) clips, and/or video clips. Documents are understood herein to include a single page as well as multiple pages.

It is to be understood that in the following disclosure the use of the words, generating and/or composing, and variations thereof, include the concept of a user interacting with the methods and systems described herein to produce or author content of an electronic message on an electronic display of an electronic computing device being operated by a user. Further, the use of the word assembling, and variations thereof, include the concept of putting the content created by the generating and/or composing operations, into a format and/or form that is configured to be electronically transmitted across a communication network (networked service) via email protocols, and that will display on email client programs operating on other electronic computing devices, such that the content of the email (including at least some of text (or text objects), images (or image objects); digital ink; graphics (or graphic objects), annotations, voice (audio) clips, and audio clips) remains intact and with fidelity to its appearance as generated and/or composed by the user.

The described systems and methods allow a user to generate and/or compose the enhanced electronic message and to have the message assembled by use of a single application. Where application refers to an application in the form of computer code that is configured to operate on electronic computing devices, and in certain particular embodiments, computer code that allows for the generation of electronic messages (e.g., email). Calling the present application a single application is explained as follows. In existing email applications, a user can place an image in-line with an email message. However, this requires the user to take multiple steps employing more than a single application. As an example, the user will need to open a document in a viewer (different from the viewer in which the email is displayed), take a screen snapshot, copy and paste the image to another program which provides markup capabilities, perform markup on the document image, copy and then paste the resulting marked up image into the email, then the user must further size and position the marked up image among the email text. On the other hand the present methods and systems permit for an enhanced mixed content type electronic message through the use of a single email application which does not require the use of the aforementioned separate distinct applications.

It is further to be understood the concept of a single application includes situations where portions of the single application are found on more than a single electronic computing device. It is appreciated; in this situation the application is still a single application where there is no need for the user to open another separate application, rather aspects of the single application are simply distributed over more than a single electronic computing device.

The present systems and methods are also configured to present a single view to the user while the user generates and/or composes the mixed content. Particularly, in one embodiment the user is presented with a single display window of an electronic computing device, where the single display window includes multiple regions or panes. It is to be understood this concept of a single view, also includes when the single view is distributed over more than a single electronic display. For example, it is known that an electronic computing device may operate two or more electronic displays. Therefore a user could move some of the regions or panes of the single view from a first electronic display to another electronic display, being viewed by a user. Under the present teachings this splitting of the regions and/or panes among electronic displays is still understood to be a single view of a single display window.

The present systems and methods provide for at least the following:

- Rendering referenced documents in page image format and in augmented data format via a networked service that interacts with an application embodying the teachings disclosed herein.
- Viewing referenced documents which may include attachments, shared documents, and private documents.
- Selecting material to excerpt.
- Placing excerpted material in the body of a message.
- Rearranging excerpted image material within the body of a message.
- Adding freeform digital ink at arbitrary locations within the body of a message.
- Adding graphic objects at arbitrary locations within the body of a message.
- Adding annotations, voice (audio) clips, video clips at arbitrary locations within the body of a message.
- Placing typed text (or text objects) with customized layout within the body of a message.
- Automatically reformatting the layout of text in the electronic message to accommodate the user's positioning of material excerpted from referenced documents.
- Excerpting material from certain document types in a way that preserves contextual information.
- Preparing an outgoing email message in a form that can be received and displayed with mixed content in standard email clients.
- Preparing an outgoing email message in a form that can be displayed with enhanced capabilities when viewed by the recipient with a specialized email viewer/editor according to the present teachings.

System Architecture

In the following description, representative embodiments of the system and method of the present application are referred to herein as a "VMail Arrangement", which in general includes but is not limited to a "VMail Application" and in certain embodiments an optional VMail Cloud Service. It being understood the services of the VMail Cloud Service normally done remotely over a network, but such services could also be done locally on the same electronic computing device operating the VMail Application.

Turning to FIG. 1, illustrated is a system architecture and environment 100 for one embodiment of the VMail Arrangement 108. Herein VMail Application 108 is configured as computer code in the form of a computer program (e.g., email client) installed on a user's electronic computing (or computational) device 109. In this embodiment the electronic computing device also includes the user's normal/existing email program 107, e.g. Outlook® from Microsoft® Corporation, etc.

Electronic computing device 109 represents and includes, but is not limited to, a desktop computer, laptop computer, tablet computer, smartphone, mobile device, or other electronic device with an electronic display, and other hardware and software appropriate to operate as known in the art, including support for a user interface and network connectivity. Hardware and software of such electronic computing devices include but are not limited to, electronic processor arrangement(s) (e.g., electronic processor(s), video graphic processor(s), where for example the electronic processor arrangement(s) include a controller), memory component(s) (e.g., Random Access Memory (RAM), Read Only Memory (ROM), among other memory configurations), user interface components (e.g., keyboard, voice input control, an electronic mouse (i.e., both a mouse not physically integrated into an electronic computing device and an integrated mouse, also called a touchpad or similarly understood designation), electronic pen, stylus, and finger (for use with touch screens), or other known selection-transfer capable device) capable of, for example operating as a data entry and/or object selection device or mechanism. The memory components are configured to hold and allow the operation of software both for operation of the computing device (e.g., including but not limited to controllers, operating system software) and software which permits the electronic computing devices to perform tasks (e.g., application type software). Such elements or components are understood to be represented by the electronic computing device 109. It is also to be understood that electronic computing devices discussed in this embodiment are equally applicable to other embodiments of the present application.

VMail Application 108 is configured to have the capability to interact with plug-in API (Application Programming Interface) 106 of the user's normal email program, if such plug-in API exists. The normal/existing email program (e.g., Outlook®) 107 sends and receives email messages (e.g., outgoing and incoming messages) through an email service (e.g., networked service) 101, via an appropriate electronic communication network (e.g., Internet, Intranet, private network, etc.) 111. The email messages being sent and received by others having electronic computing devices 112a-112n, appropriately configured with email applications configured to be able to interact with the system architecture and environment 100 of FIG. 1.

The VMail Application program 108 communicates with optional VMail Cloud Service 105, which includes a VMail Page Rendering Service 102 and optionally a VMail Email Service (e.g., networked service) 103, for communication with the other electronic computing devices 112a-112n. Additionally, a local cache 110 is established for offline use. It is to be appreciated that the VMail Page Rendering Service may, in some embodiments be located on the electronic computing device 109. The embodiment of FIG. 1, also depicts an electronic processor arrangement 114, memory component(s) 116, and user interface component(s) 118.

Figure 2:
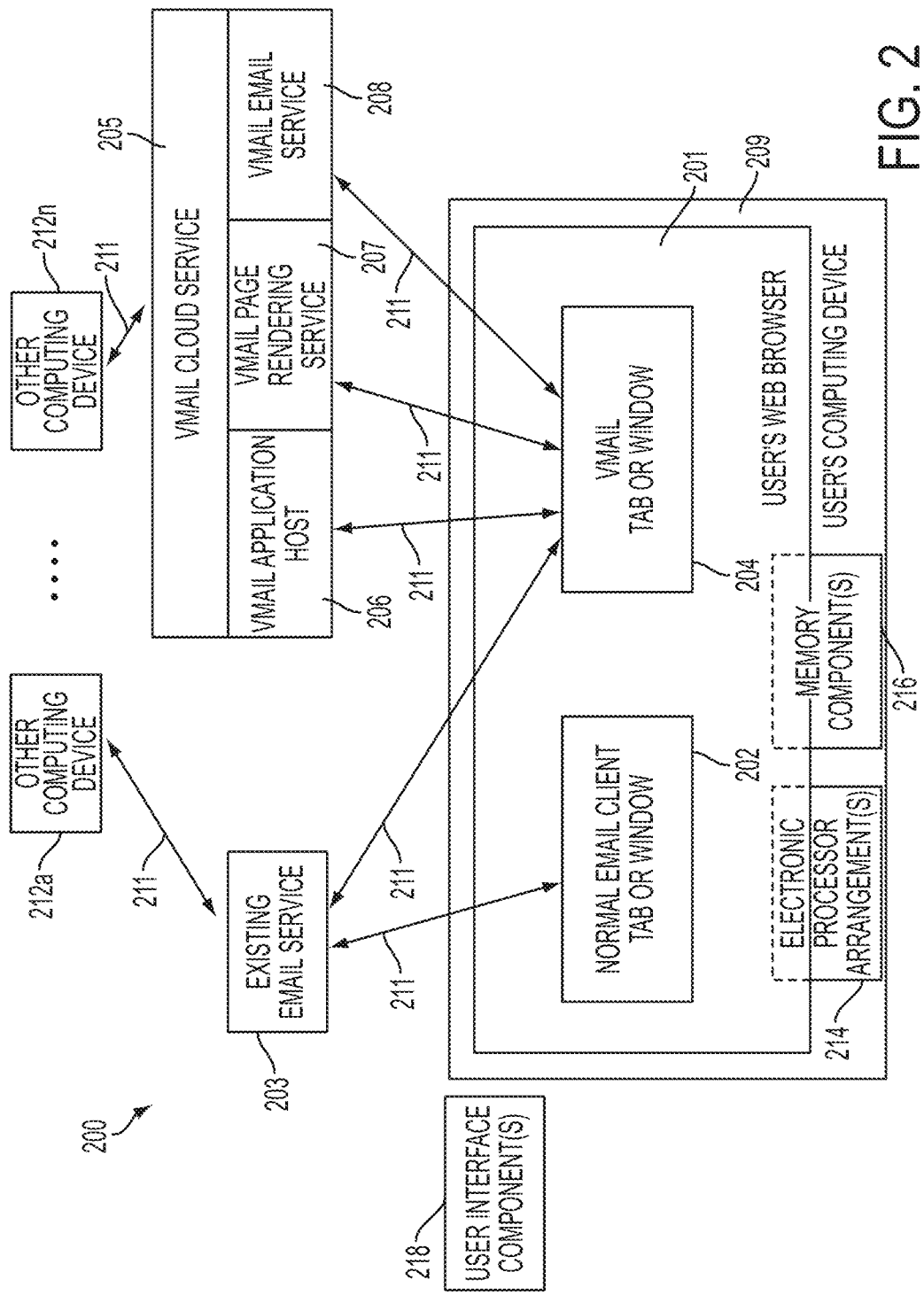
FIG. 2 presents system architecture and an environment for an embodiment of the present application in which the VMail Application runs as a browser application, and serves as a companion to the user's normal/existing email web application.

FIG. 2 presents a system architecture and environment 200 for another embodiment of the VMail Arrangement. In this embodiment, a user conducts email activity on a web browser 201 installed on electronic computing device 209. The browser presents an email browser application at tab or window 202 which presents a user interface and interaction via communication with an email service 203, over a communication network (e.g., Internet, Intranet, private network, etc.) 211 and with other electronic computing devices 212a-212n. In this embodiment, the VMail Application runs in window or tab 204 of the browser 201. The VMail Application interacts with the VMail Cloud Service 205 via the communication network 211. Cloud Service 205 includes the VMail Application Host 206 which holds the VMail Application computer code in the form of a computer program and delivers the user interface of the VMail Application to VMail Tab or Window 204, and VMail Page Rendering Service 207. Optionally the VMail Cloud Service 205 includes VMail Email Service 208. The embodiment of FIG. 2, also depicts an electronic processor arrangement 214, memory component(s) 216, and user interface component(s) 218.

Figure 3:
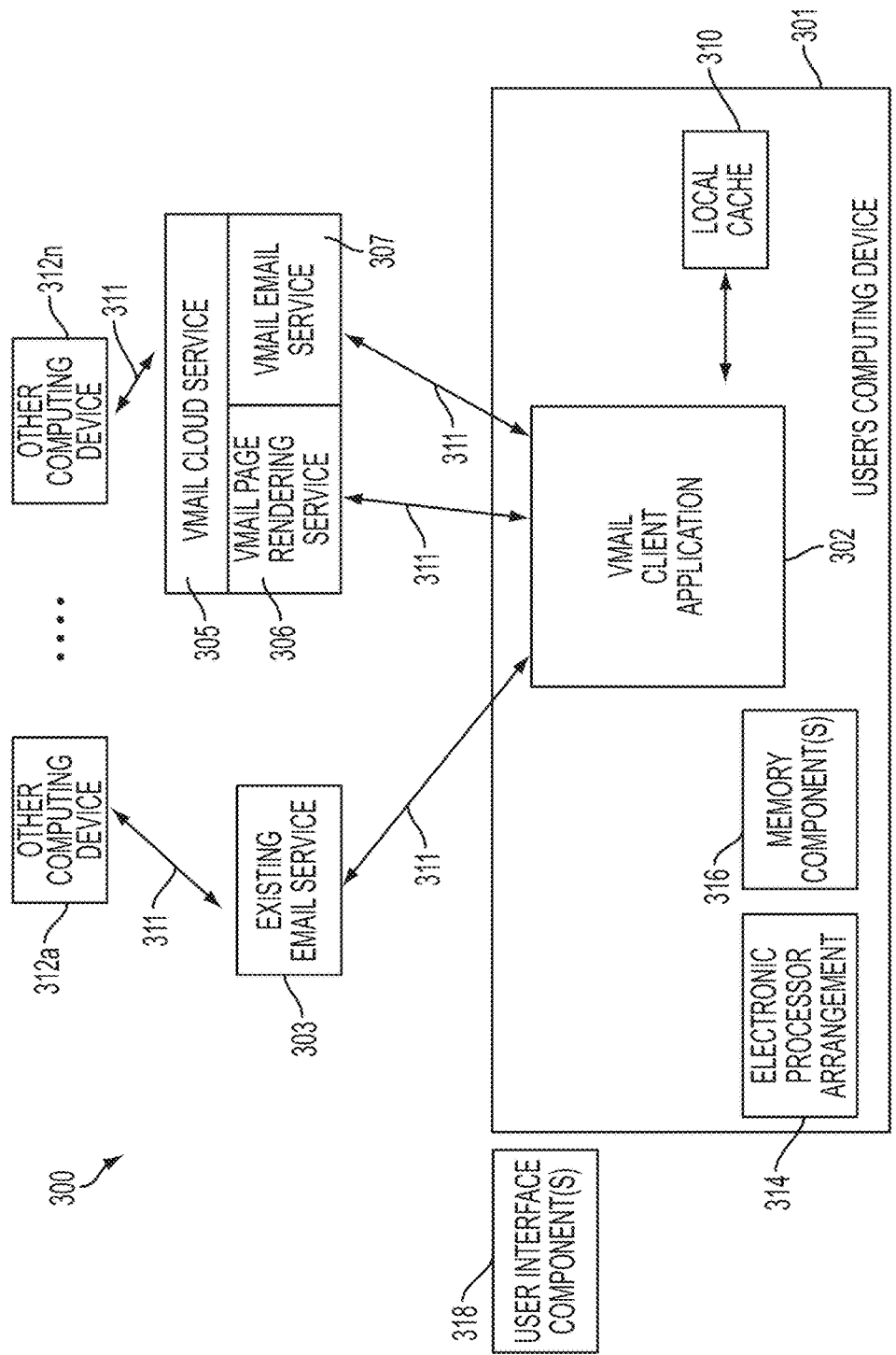
FIG. 3 presents system architecture and an environment for an embodiment of the present application in which the VMail Application is installed on the user's electronic computing device as a self-contained email client application.

FIG. 3 presents a system architecture and environment 300 for another embodiment of the VMail Arrangement. In this embodiment, the VMail Application is a self-contained email client program 302 that is installed on electronic computing device 301. The VMail Application client program 302 communicates with the user's existing or normal Email Service 303 via a communication network (e.g., Internet, Intranet, private network, etc.) 311. The VMail Application client program 302 also communicates with the VMail Cloud Service 305. The VMail Cloud Service 305 includes a VMail Page Rendering Service 306, and optionally a VMail Email Service 307, which may substitute for the aforementioned Email Service 303. Additionally, a Local Cache 310 is established for offline use. In the environment 300 other user's Electronic Computing Devices 312a-312n communicate as discussed in the previous embodiments. The embodiment of FIG. 3, also depicts an electronic processor arrangement 314, memory component(s) 316m, and user interface component(s) 318.

Figure 4:
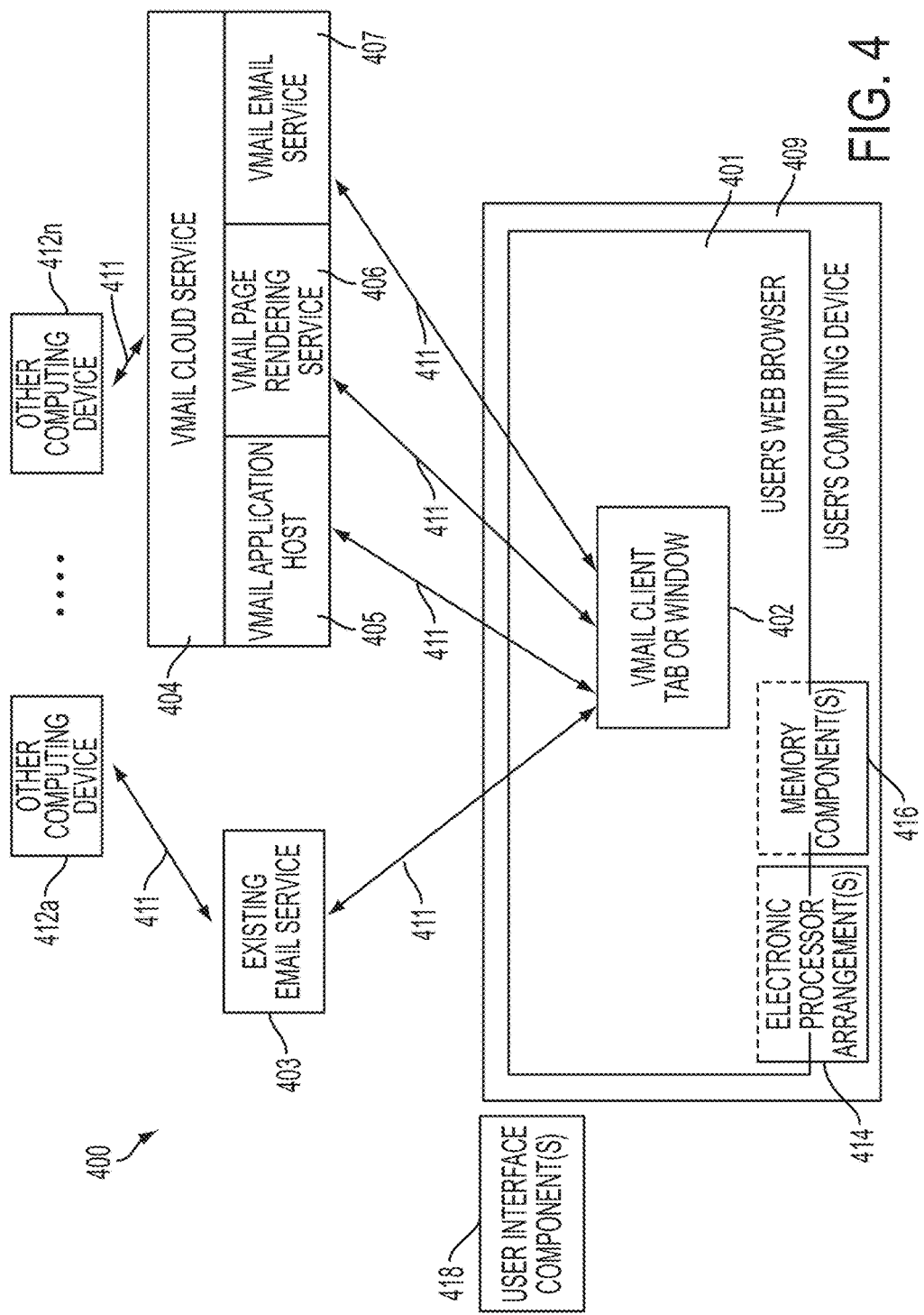
FIG. 4 presents system architecture and an environment for an embodiment of the present application in which the VMail Application (program) runs as a browser application as a self-contained email web application.

FIG. 4 presents a system architecture and environment 400 for another embodiment of a VMail Arrangement. In this embodiment, a user conducts email activity on a web browser 401 installed on a user's electronic computing device 409. The web browser 401 presents the VMail Application on VMail Client Tab or Window 402, through communication with the VMail Application Host 405, which holds program code of the VMail Application, and the VMail Page Rendering Service 406 of the VMail Cloud Service 404 via communication network (e.g., Internet, Intranet, private network, etc.) 411. The VMail Application transmits and receives email messages (e.g., outgoing messages and incoming messages) via email service 403 or optionally through VMail Email Service 407 associated with the VMail Cloud Service 404. In the environment 400 other electronic computing devices 412a-412n communicates as discussed in the previous embodiments.

The VMail Application Client Tab or Window 402, as previously discussed, is deployed on an electronic computing (or computational) device, including but not limited to a desktop workstation, laptop computer, tablet computer, smartphone, or other electronic device presenting a user interface and network connectivity. The embodiment of FIG. 4, also depicts an electronic processor arrangement 314, memory component(s) 316, and user interface component(s) 318.

Figure 5:
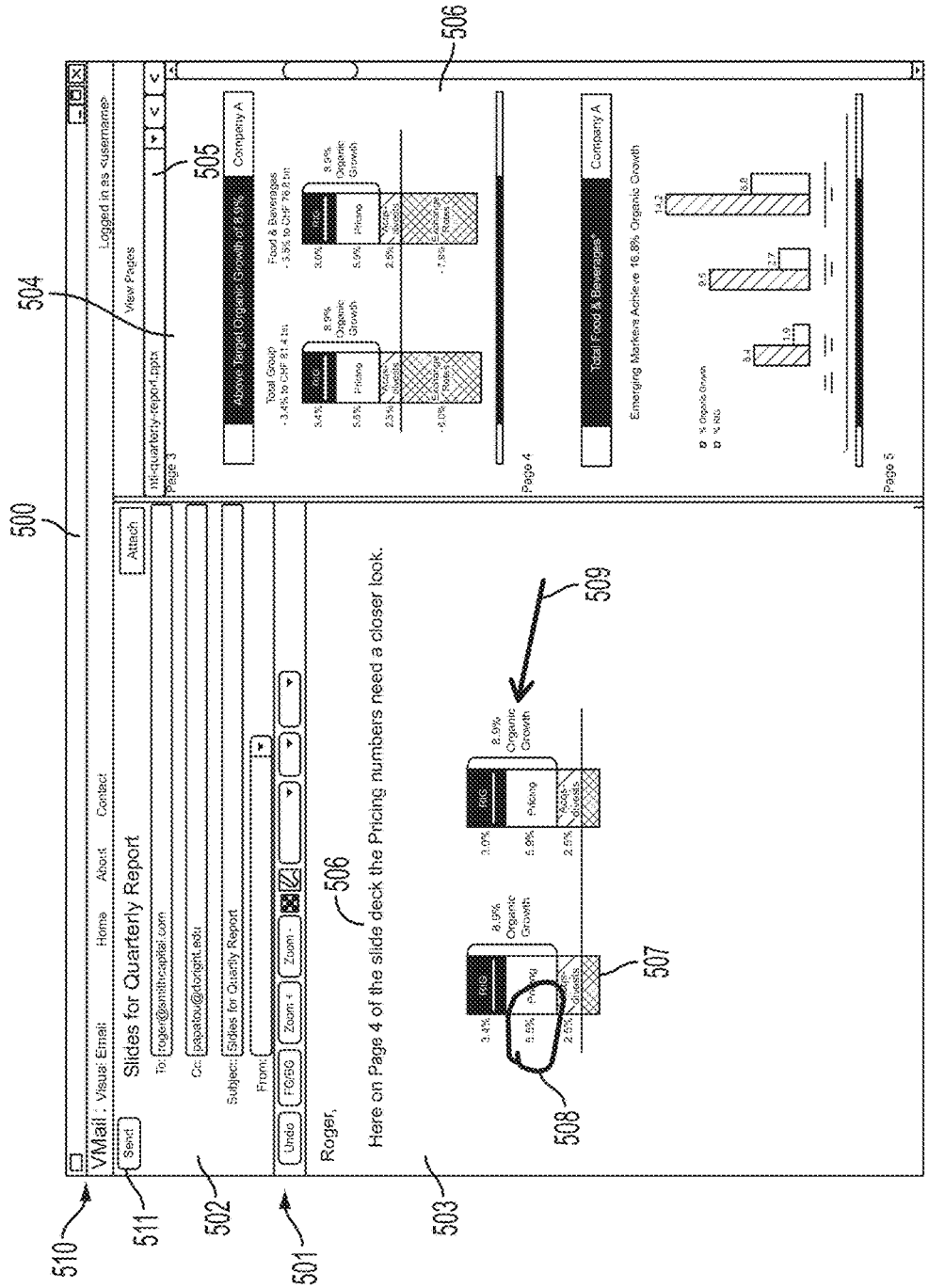
FIG. 5 illustrates one embodiment for the user interface layout configuration of the VMail Application.

Turning now to FIG. 5, illustrated is a user interface configuration (display window) 500 of an electronic display 510 (e.g., of electronic computing devices 109, 209, 301, 409 of FIGS. 1-4), for the VMail Application of the present disclosure. Provided, in this embodiment, are two main components, each of which is a region (or pane) contained within a display window (or screen window) 500 on an electronic display of an electronic computing device. One component is referred to as the Email Authoring Region 501. This in turn includes an Email Address Block 502 and a Message Composition Region 503. In the example shown, the Message Composition Region 503 includes text of a message 506 and enhanced content such as, but not limited to, images 507, digital ink (e.g., the hand-drawn loop) 508, and graphic objects (e.g., the lined arrow) 509. The second component is a Document Viewing Region (or Document Display Region) 504, which displays document image pages of reference documents (e.g., attachments, as well as documents stored in repositories, including those shared by others). This in turn includes a Document Chooser 505 and a Page Viewing Region (or Page Display Region) 506. In other configurations and/or embodiments, more than one Message Composition Region and more than one Page Viewing Region may be present. It should be appreciated that alternative configurations of user interface regions and widgets fall under the scope of this patent application.

System Operation

Figure 6A:
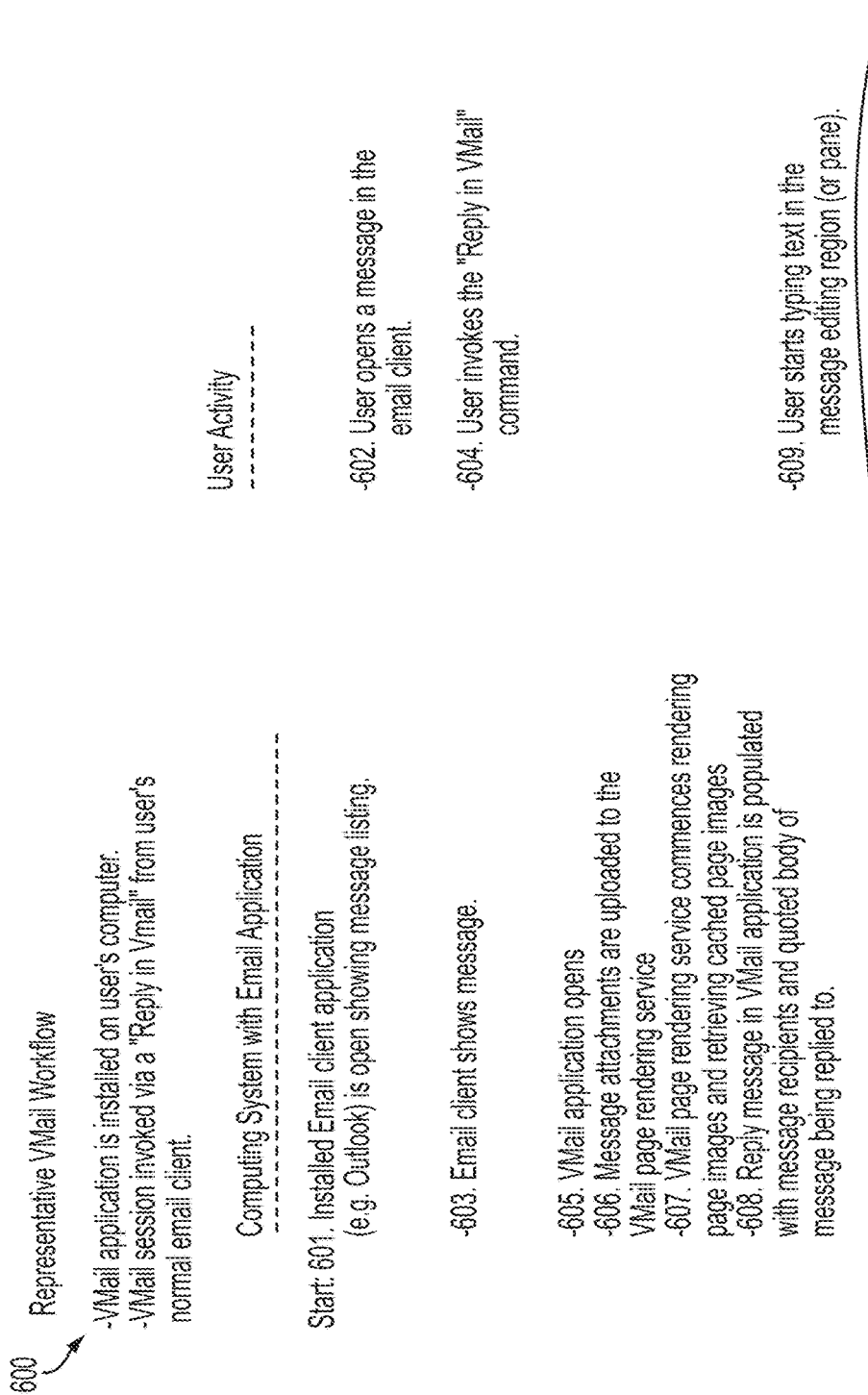

An exemplary operation of the VMail Arrangement is illustrated in FIGS. 6A-6C which presents a representative sequence 600 of user activities, interspersed with activities performed by the VMail Arrangement, that result in the user's authorship and sending of a message. The VMail Application is deployed to the user's electronic computing device through a variety of arrangements as described above, and it may be invoked through a variety operations. Among these, the sequence shown in FIGS. 6A-6C illustrates operation in connection with a configuration corresponding to FIG. 1 wherein the VMail Application is installed on the user's electronic computing device and is linked to the user's existing email client application, e.g. Outlook®, through a plug-in architecture.

In the sequence shown in FIGS. 6A-6C, the VMail Application is started by the user invoking a special "Reply In VMail" command from their existing email client. This may be included as a button on the interface of the existing email client.

With continuing reference to FIGS. 6A-6C, the sequence commences at 601 with the user's email client, e.g. Outlook®, already running and showing a listing of received messages. At step 602, the user performs an action in the normal/existing email client to open a message, and in step 603 the normal email client application brings up a window or view in which the message is displayed. In this representative sequence, it is assumed the message contains one or more attachments. At step 604 the user invokes the "Reply in VMail" command. This causes the VMail Application itself to be started on electronic computing device (step 605). Through the well-established use of plug-in architectures, the "Reply in VMail" command is invoked within the context of the normal email client.

At step 606, attachment documents of the replied-to message are automatically transferred to the VMail Page Rendering Service. In one embodiment, the VMail Page Rendering Service runs on the client's electronic computing device. In another embodiment as represented in FIG. 1, the VMail Page Rendering Service 102 runs on a remote server system that the VMail Application communicates with over a communication network.

The attachment documents from the email message being replied to will in general be encoded in a variety of native document formats, including Microsoft Word, Microsoft PowerPoint®, Microsoft Excel®, Adobe® PDF, Microsoft Visio®, plain text, Rich Text Format, .jpg, .png, and any number of additional native document formats.

At step 607 the VMail Page Rendering Service 102 performs computations to render the uploaded document(s) into a uniform format. In one embodiment, the uniform format is any document communication format that preserves the visual appearance of the document. Examples of such formats include but are not limited to bitmap image formats such as .png format, .jpg format, and .tif format, each of which are capable of various types of image compression, as well as pdf format, and proprietary formats. In another embodiment, the uniform format includes an augmented data format. The augmented data format gives access to symbolic data contained in the documents, including ascii text, rich text format, and graphics. The augmented data format also gives access to metadata about the document including author, date, version number, and additional information about the source document.

In a situation where the uniform format includes augmented data, another embodiment of the VMail Application arrangement includes providing access to different versions of a same document. For example, for an edited document (such as a Word document with track changes used). This arrangement provides a user with access to a layered number of versions of the same document. For example, if a document has been revised though a number of versions with each version having additional changes, the layered number of versions include the various revised versions of the document.

At step 608 the fields of the Address Block e.g., 502 are automatically populated with recipient information (To: field and CC: field), Sender information (From: field) and Subject field in accordance with the Address field of the message being replied to. In one embodiment, this information is obtained through the plug-in mechanism of the normal email client. In another embodiment, this information is obtained through a standard service interface to the address book function and email services accessible through their computer.

At step 609 the user edits the text 506 and enhanced content 507, 508, 509 of their reply email message in a Message Composition Region 503. It is to be understood that editing activities in the Message Composition Region can take place at any time during the sequence, not only in the order shown in the representative scenario 600.

After some period of time, the VMail Page Rendering Service 102 completes rendering of at least one page image of the first attachment document, which is then automatically downloaded (step 610) to the VMail Application, where it is provided to the VMail Document Viewing Region 504. After a period of time, the page images of the attachment documents have been rendered and automatically downloaded. The names or titles of the attachment documents are added to a list of documents for which page images are available in the Document Chooser 505.

While not shown as a separate step in FIGS. 6A-6C, it is understood the steps allow the user to use the Document Chooser 505 to select among multiple documents to display page images of in the Page Viewing Region 506. In one embodiment, the Page Viewing Region 506 displaying page images of a document is in the form of a scroll region.

Upon viewing one or more document page images (step 611), the user performs a selection operation (step 612) on a page image displayed in Page Viewing Region 506. By use of a selection-transfer mechanism or device, such as a mouse, finger, stylus elements, or other known selection-transfer device, a convenient set of mouse operations or finger/stylus gestures are used to select an entire page, or a region, portion or material of a page of a rendered document. For example in one embodiment, a double click selects an entire page image, while a mouse-press-drag-release operation selects a rectangular region of a page image.

At step 613 the user copies the selected page image region to the Message Composition Region 503. In one embodiment, this is accomplished by a standard drag-and-drop gesture.

At step 614, the VMail Arrangement optionally performs automatic image processing on the selected image region. This image processing is designed to render background regions of the image transparent, for reasons that will become apparent later. The method of U.S. Pat. No. 7,177, 483, "System and method for enhancement of document images", is used in one embodiment to perform this image processing.

At step 615, the image region is optionally re-sized to fit appropriately with the span of text and other material being generated in Message Composition Region 503.

At step 616, the position of the image region in Message Composition Region 503 is optionally adjusted to align it with margins and/or other image material.

Optionally, during drag-and-drop step 613, if the user drags an image region in such a manner that it overlaps existing text, graphics, or other material in Message Composition Region 503, the locations and layout parameters of this other material is readjusted to make room for the new image region. In particular, text may optionally be caused to reflow (or reformatted) around the dragged image region and material may be moved down to extend the vertical extent of the contents in the Message Composition Region. This reflow or reformatting will be described in more detail in connection with FIGS. 21A-33B.

At step 617 the user selects one or more documents to be rendered and provided to Document Viewing Region 504, so that pages of such documents may be viewed as page images in Page Viewing Region 506. These documents are other than and in addition to the email attachment documents already there by virtue of steps 606, 607, and 610. These additional documents may be selected from among a number of sources, including but not limited to the user's electronic computing device, a clipboard, a file system, cloud storage, or from the attachments of other emails in their normal email client. In one embodiment, icons for these additional documents are dragged-and-dropped into the Page Viewing Region 504, which causes the VMail Application to automatically upload them and send them to the VMail Page Rendering Service 102.

In steps 617, 618, and 619 the Page Rendering Service commences rendering the documents and downloading page images to the VMail Application as described above, analogously to steps 606, 607, and 610.

In steps 620, 621, and 622 the user performs additional edit operations incorporating at least some of text, images, freeform digital ink, voice (audio) clips, video clips, structured graphic objects, and annotations.

At step 623 the user edits the Subject:, To:, and From: fields of the Address Block 502. In one embodiment the VMail Application provides semi-automatic text completion 624 by exchanging data with the user's email client via the normal email application's plug-in API 106.

At step 625 the user presses the Send button, e.g., 511 of FIG. 5.

Figure 10A:
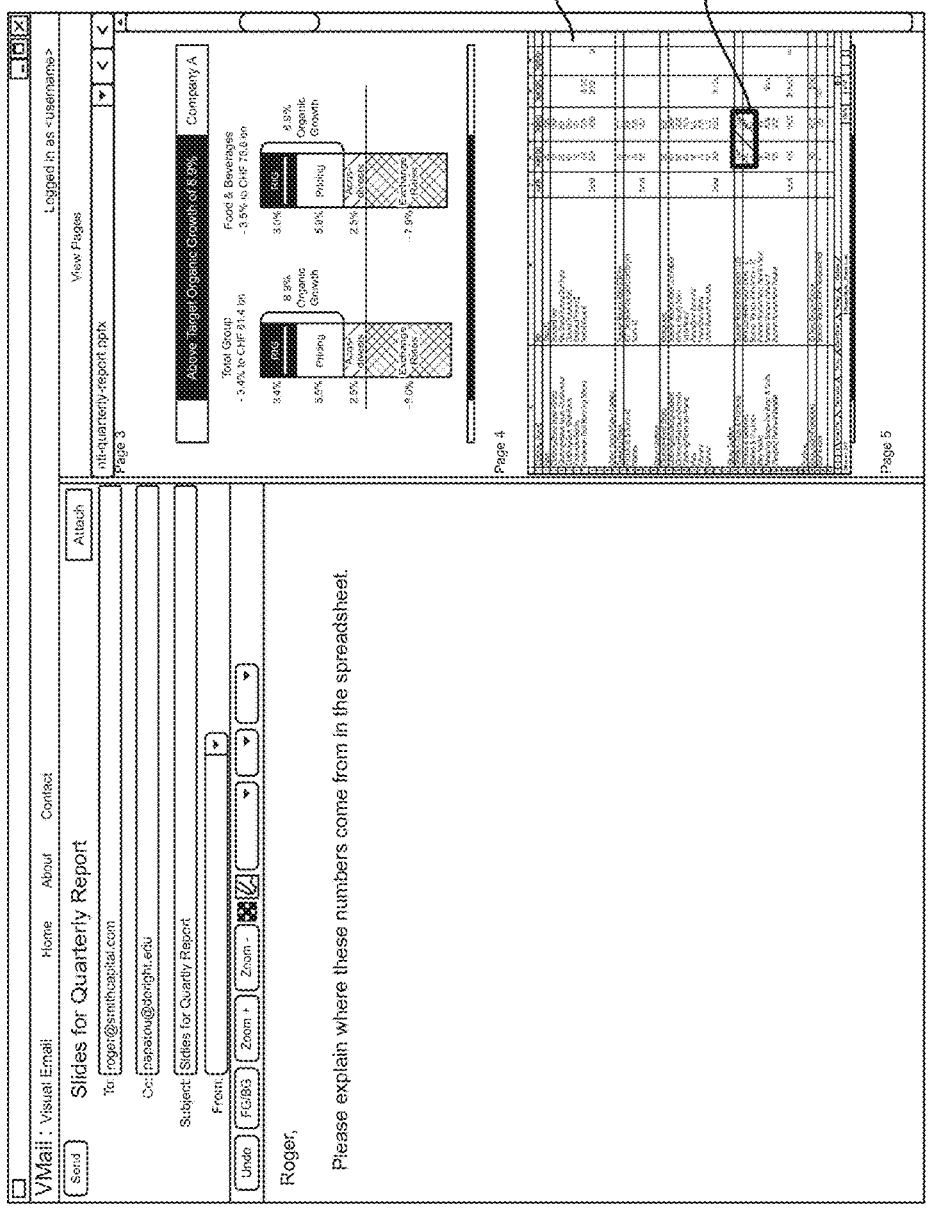
Figure 10C:
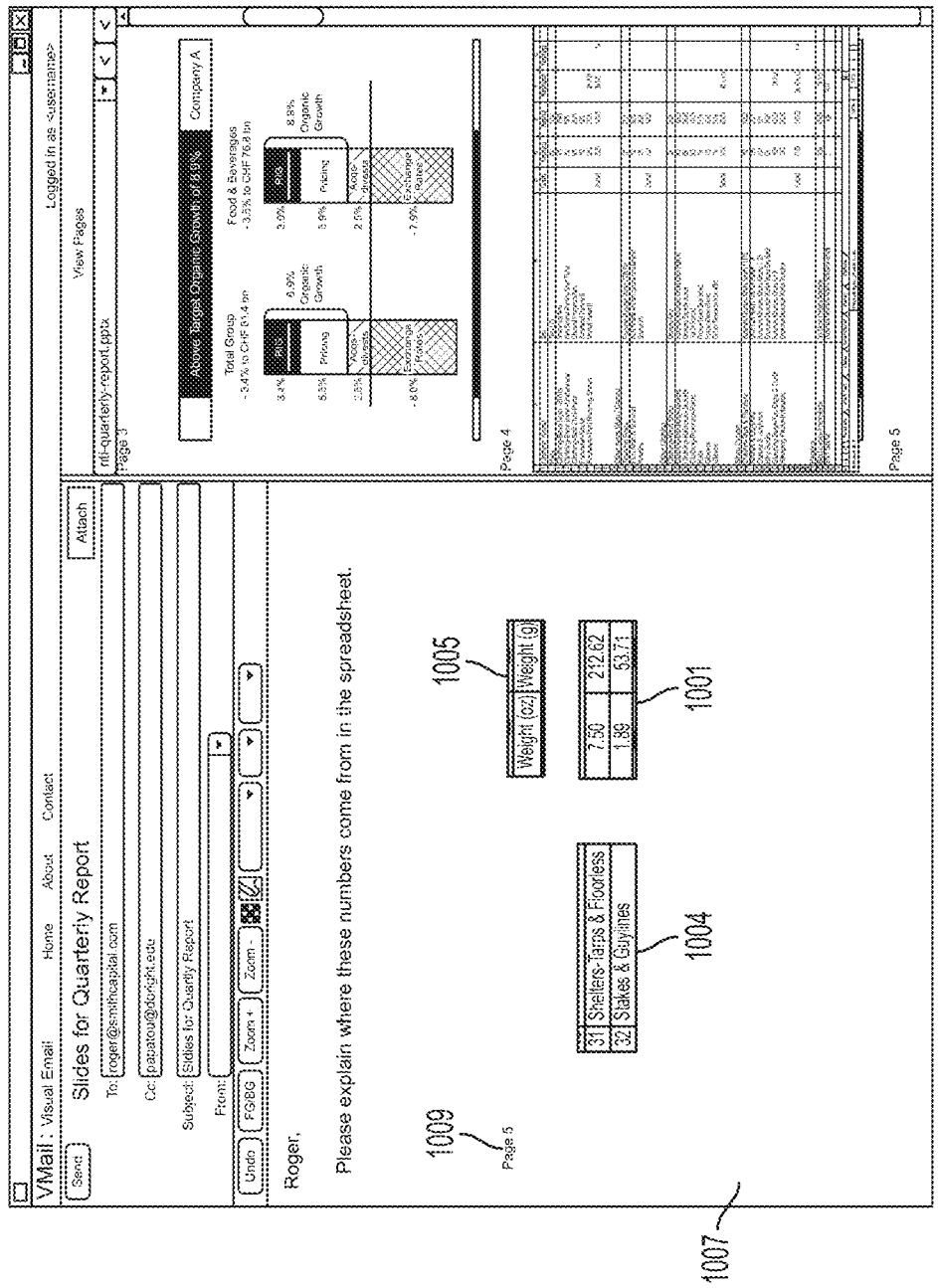
Figures 1, 2, 10D:
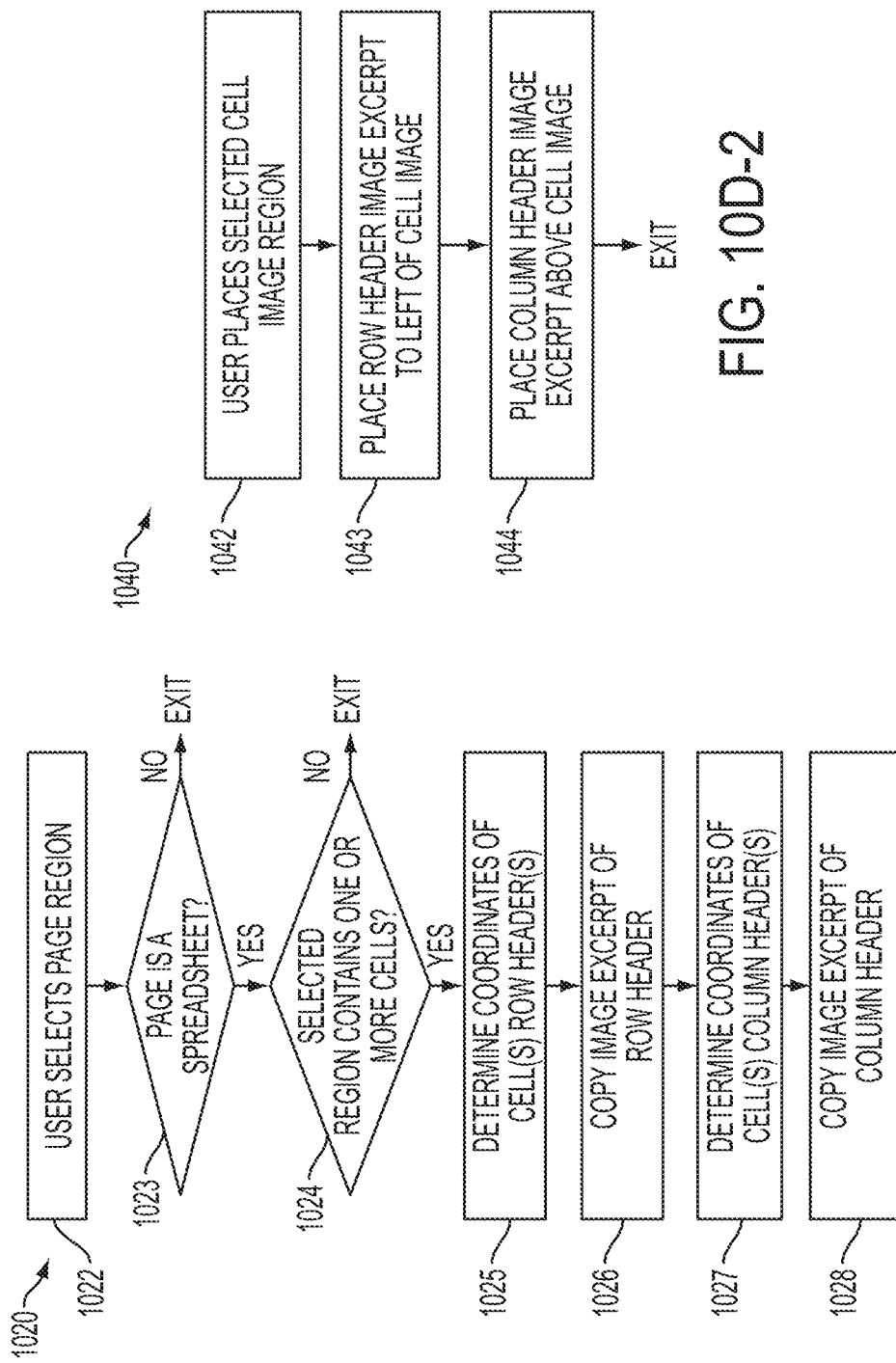
Figure 11:
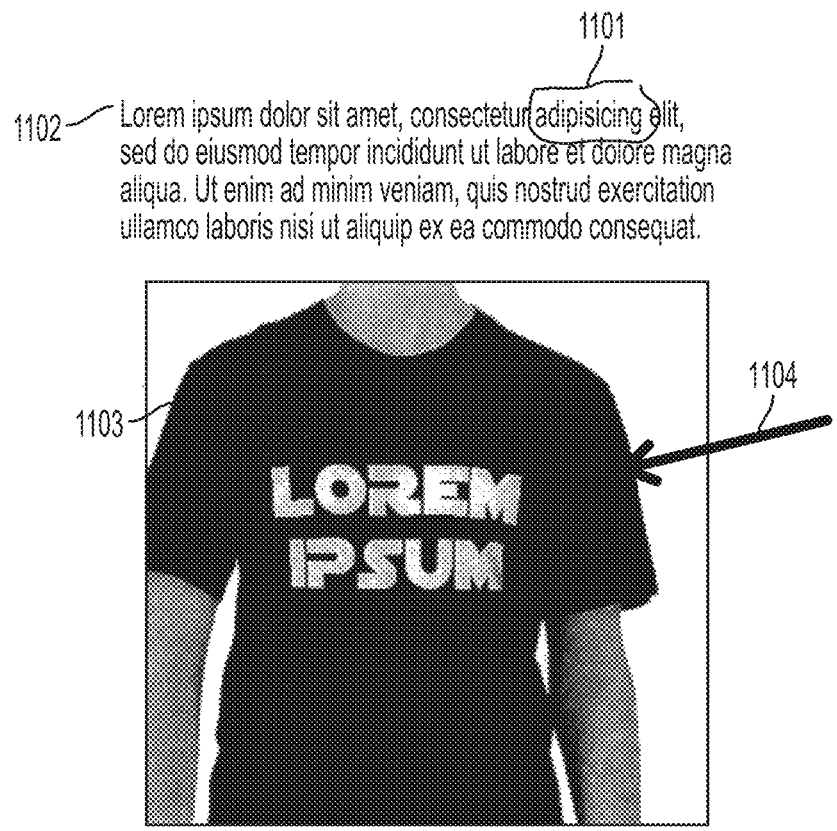
FIG. 11 is a sample mixed content type message that could be composed under this application.

In response, at 626 the VMail Application performs steps such as described in FIG. 9, 10, or 11 to assemble the contents of the Message Composition Region 503 into a form that can be transmitted via email protocols and that will display on email recipient's email client programs with at least some of text, images, digital freeform ink, voice (audio) clips, video clips, and annotations, intact and with fidelity to its appearance in a Message Composition Region 503.

At step 627 the VMail Application program is exited.

It will be appreciated that analogous and corresponding workflow steps apply to alternative embodiments of the application such as those described in FIGS. 2, 3, and 4. In the previous representative scenario described in FIGS. 6A-6C, the VMail Application was launched by the user by pressing a "Reply in VMail" button on their normal/existing email client. Alternative means are provided to launch the program and include, but are not limited to, pressing a "New Message in VMail" or equivalent button on the normal/existing email client; starting the program from scratch with no other email client running; replying to an email message in a browser-based email client 200; and navigating a browser to the URL (Uniform Resource Locator) of the Mail Application Host 206, 405.

Optionally, access to the VMail Cloud Services may be gated by a user log-in process. Under the system architecture 200 of FIG. 2 and 400 of FIG. 4, this would apply to the VMail Application Host service as well.

The VMail Page Rendering Service is optionally designed to store page images for previously uploaded documents, which enables faster return of page images to the VMail Application program. The stored document page images are optionally indexed by User ID, user groups, user organizations, and by other metadata for purposes of collaborative sharing. Furthermore, the VMail Cloud Service in some embodiments is configured to perform additional data analysis on the uploaded documents including keyword extraction, text analysis, and image analysis, in order to support added-value services including document version tracking, similar-document and related-document search, and targeted advertising.

In an embodiment of the present disclosure, the VMail Email Service (e.g., 103, 208, 307, 407) performs all email handling and storage functions and can therefore substitute for and replace the user's existing email service (e.g., 101, 203, 303, 403). In certain embodiments, VMail Email Service incorporates the VMail Page Rendering Service function of rendering document page images and enhanced page images such as (e.g., 102, 207, 306, 406) of the foregoing description.

In an embodiment where the user employs the VMail Email Service (e.g., 103, 208, 307, 407), when an email is received (e.g., from 112a-112n, 211a-211n, 311a-311n or 411a-411n), the VMail Email Service (e.g., 103, 208, 307, 407) will directly provide attached documents that are to be rendered to the VMail Page Rendering Service (e.g., 102, 207, 306, 406). Then when rendered such documents are provided to the VMail application, such that when the user is viewing the email, the rendered documents are available. This is in contrast to the situation when the existing or normal email service (e.g., 101, 203, 303, 403) is used. In those situations, the received email is first provided to the VMail application and then the documents to be rendered are sent to the Page Rendering Service. This results in a possible delay for the user to view the rendered documents.

The VMail Email Service (e.g., 103, 208, 307, 407) of the present application is also configured to provide, logging, caching of documents, as well as tracking of email threads.

Message Editing

Turning to FIG. 7, the VMail Application incorporates various tools and/or processes to facilitate the user's ability to generate and/or compose messages containing a mixture of content, including but not limited to: plain text 702, formatted text 703, desired text layout 704, images 705, freeform digital ink 706, and structured graphics 707.

Message Composition Region 503 (of FIG. 5) provides a canvas architecture on which editing tools (e.g., mechanisms) and processes are used on textual and graphic objects to place, rearrange, copy, paste, select, and/or modify the text and graphic objects.

In addition to the above editing tools (e.g., mechanisms) and processes the present concepts provide additional document editing tools and processes including the following (Where various ones of the tools and processes are further described in connection with FIGS. 8A, 8B, 17, 18, 19, and 20-40):

(i) A select and crop tool and process configured to select and crop image objects using rectangle drag or lasso drag without prior selection of mode as described in more detail, for example, in U.S. Pat. No. 7,086,013, "Method and system for overloading loop selection commands in a system for selecting and arranging visible material in document images." (See for example FIG. 17, herein.).

(ii) A select primitive object tool and process configured to select among multiple overlapping groups of primitive objects as described in more detail, for example, in U.S. Pat. No. 6,903,751, "System and method for editing electronic images." It is understood that in the art, a primitive object is also understood to be identified or called a primary object as well as an atomic object, and in U.S. Pat. No. 6,903,751 the primary object is understood to include a bitmap object (See for example FIG. 18, herein.).

(iii) A gesture interpretation tool and process configured to interpret mouse/stylus/finger gestures as either a lasso (e.g., also identified as a closed or nearly closed freeform path) selection gesture or a stroke of digital ink, as described in more detailed, in for example, U.S. Pat. No. 7,036,077, "Method for gestural interpretation in a system for selecting and arranging visible material in document images." (See for example FIG. 19, herein.).

(iv) A gesture interpretation tool and process configured to interpret mouse/stylus/finger gestures as either a lasso selection gesture, a rectangle selection gesture, or a stroke of digital ink, as described in more detail, for example, in connection with FIG. 35-40.

(v) An automatic subdividing (e.g., fragmenting or decomposition) tool configured to provide automatic subdividing (e.g., fragmenting or decomposition) of image regions into smaller image objects on the basis of user selection operations as described in more detail, for example, in U.S. Pat. No. 6,903,751, "System and method for editing electronic images." (See for example FIG. 20, herein.).

(vi) A placement and object location modifier (e.g., adjustment) tool and process configured to place and adjust (locations of) predefined graphic objects by selection from a menu or toolbar.

(vii) A hand-drawn gesture recognition tool and process configured to recognize hand-drawn gestures as indicators of graphic objects according to stroke and sketch recognition methods known in the art, and placement of corresponding graphic objects on the canvas.

(viii) A automatic adjustment tool and process wherein for graphic objects attached to text and/or locations on image objects, the tool and process automatically adjusts position of the graphic objects as the text or image objects to which they are attached are rearranged.

(ix) Image editing tools and processes that include the operations of translation, rotation, and scaling of selected objects including text, digital ink, images, and graphic objects.

(x) A proximity-sensitive tool and process for positioning a text entry location. Referring, for example to user interface configuration 800 of FIG. 8A, in general, computer-based document editing user interfaces employ a text cursor or text caret as a visual indicator for where text entered by keystrokes will appear on a screen. Oftentimes the text cursor is displayed as a blinking vertical line although other visual indicators are common. Text on the screen is associated with blocks of text which may be lines 801, paragraphs, lists, or other structures. Text entry locations are locations where text will be placed through keystrokes, selection of text from menus, voice commands, or other mechanism to enter text. Commonly, text entry locations include the beginning of a block of text 802, the end of a block of text 803, or insertion between characters of a block of text 804. Additionally, a text entry location can be associated with a new block of text that does not yet contain any characters 805 Conventionally in the art, a new text block is established via a menu or toolbar operation that places the user interface in a mode wherein a subsequent mouse press or touch gesture determines the location of the new text block text entry location.

VMail Message Composition Region 810 (See also 503 of FIG. 5) is intended to support placement of text at arbitrary locations on a canvas 812 according to the expressive desires of the user. Accordingly, enhanced tools are provided to allow the user to assert text entry locations and associated text cursor with a minimum of effort. Specifically, the VMail Application includes a process for placement of a text entry location either in association with an existing text block, or to establish a new text block, without prior specification of mode, and thereby without a requirement to first choose any menu item, press any toolbar button, or otherwise place the user interface into a special mode for text entry.

Figure 8A:
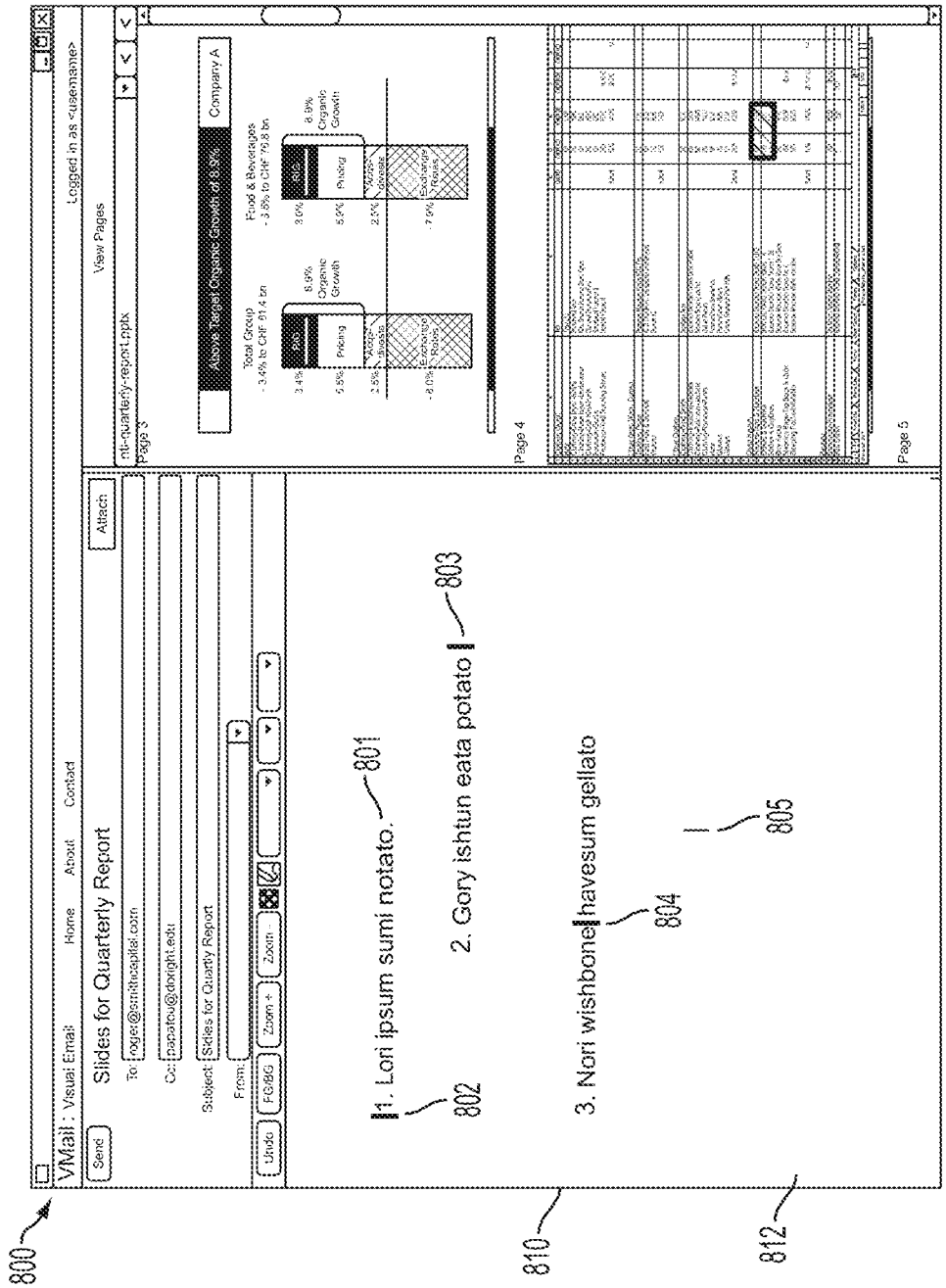
FIGS. 8A to 8B illustrates placement of a text entry point based on proximity to existing text on a canvas of a display window.
Figure 8B:
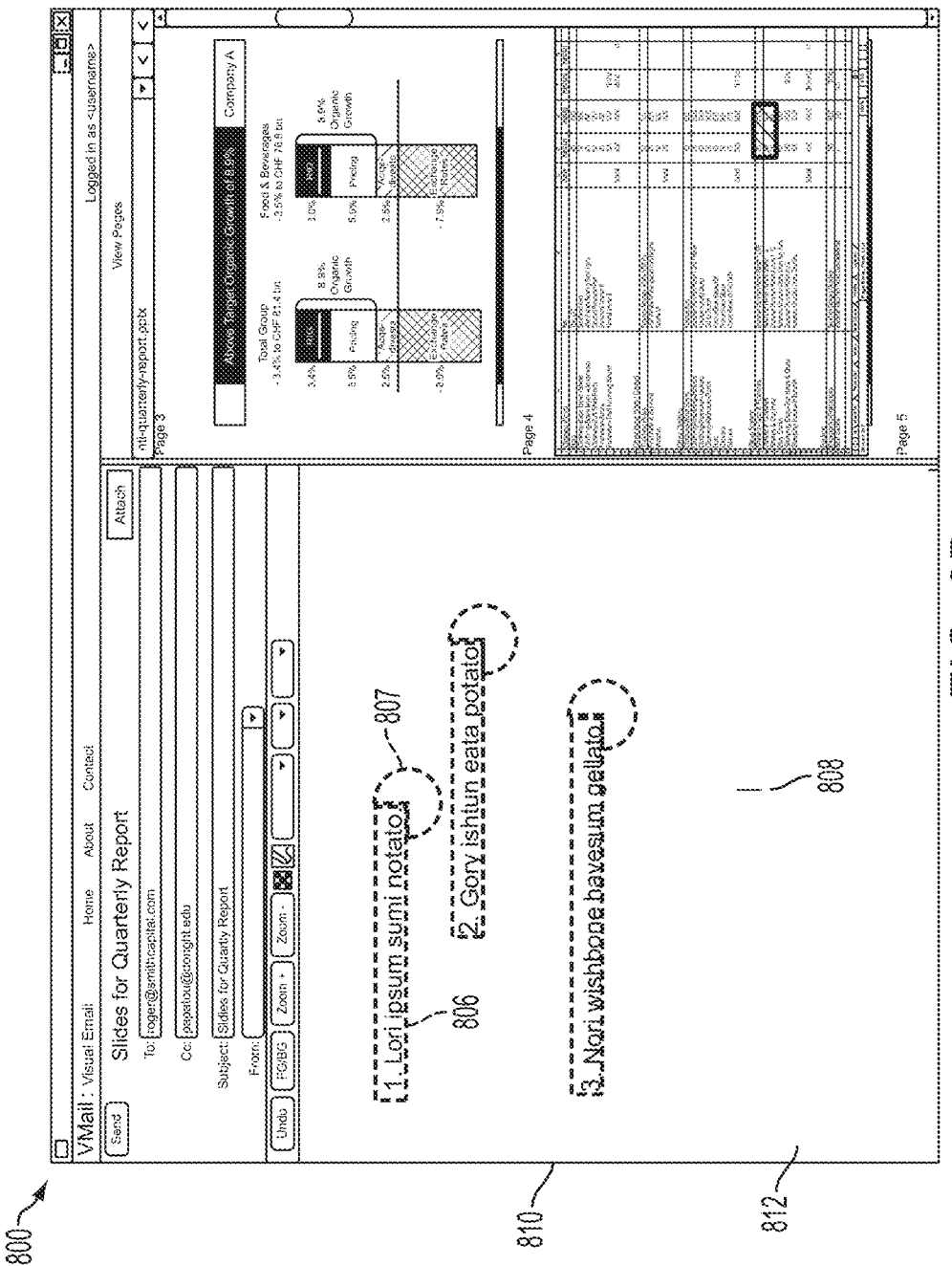

Referring to FIG. 8B, regions of the canvas 812 are established according to proximity to existing text blocks. Rectangular regions 806 represent locations wherein a user mouse click or touch gesture will snap the text entry location in association with the enclosed text block. These locations include before the first character of the text block or insertion between existing characters of the text block. Pie-shaped regions 807 indicate locations wherein a user mouse click or touch gesture will snap the text entry location after the last character of the associated text block. The radius of the pie region is a predetermined distance designed to permit the user be imprecise in their text location positioning click or gesture. Finally, a user mouse click or touch at an arbitrary location over the canvas outside these regions proximal to existing text blocks causes a new text block to be established 808, and subsequent character keystrokes will add text to this new text block.

It is to be appreciated that mouse press or touch gestures may also take into account existing image, digital ink, and graphic objects on the canvas, in which case instead of positioning a text entry location, selection operations on existing objects may instead take place. In general, a new text block will be created if the mouse click or touch occurs either over a background region of the canvas, or over an anchored image object as described, for example, in the publication, E. Saund, D. Fleet, D. Lamer, and J. Mahoney; "Perceptually-Supported Image Editing of Text and Graphics," Proc. UIST '03 (ACM Symposium on User Interface Software and Technology), pp. 183-192.

Contextually Augmented Selection and Copy

In some cases, information copied to the Message Composition Region is better understood if it is accompanied by additional contextual information. The VMail Application provides a process for contextual image material to be automatically or semi-automatically transferred to Message Composition Region 503 (e.g., of FIG. 5) from Page Viewing Region 506 (e.g., of FIG. 5) in conjunction with targeted image material manually selected and transferred by the user.

Figure 9A:
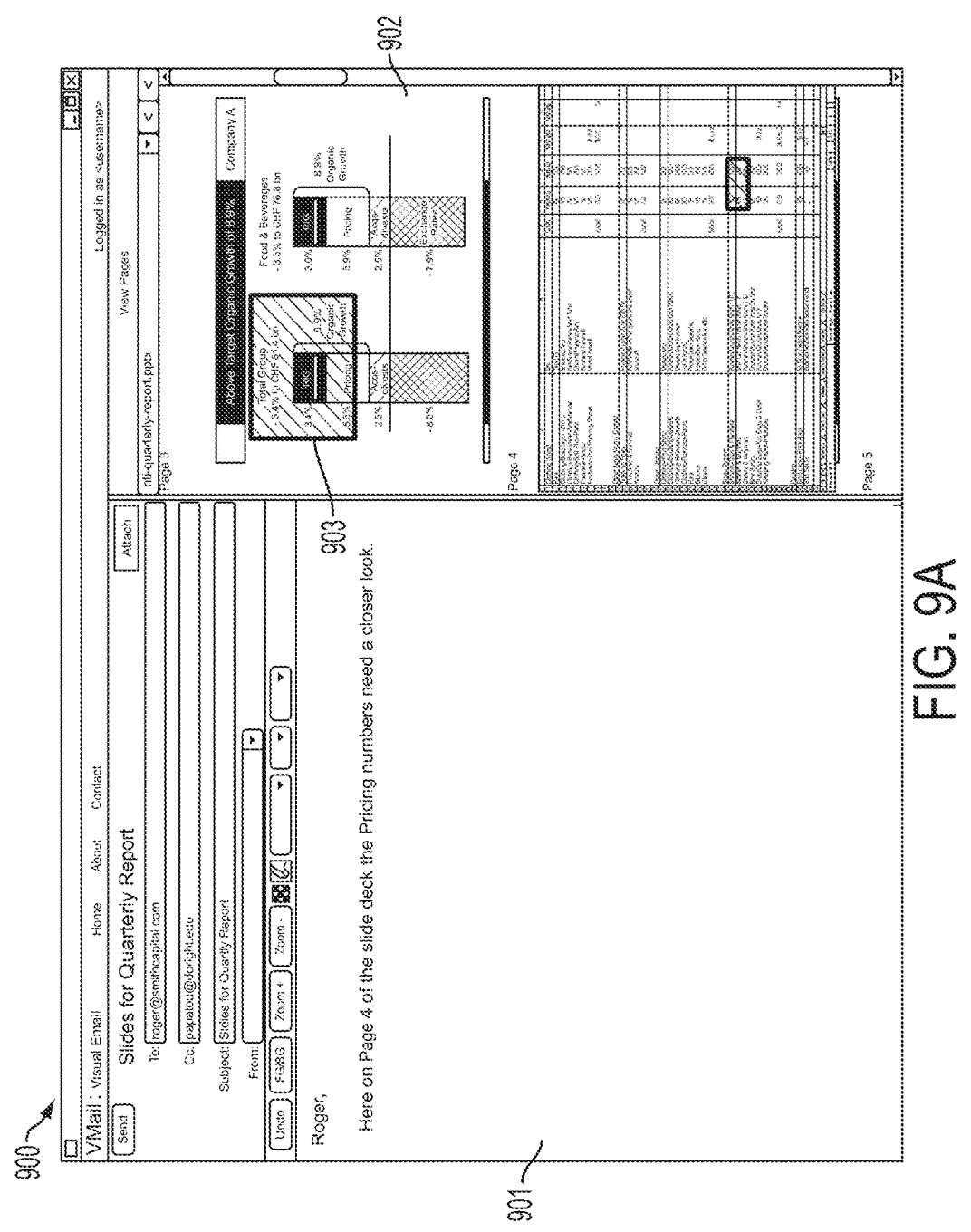
Figure 9B:
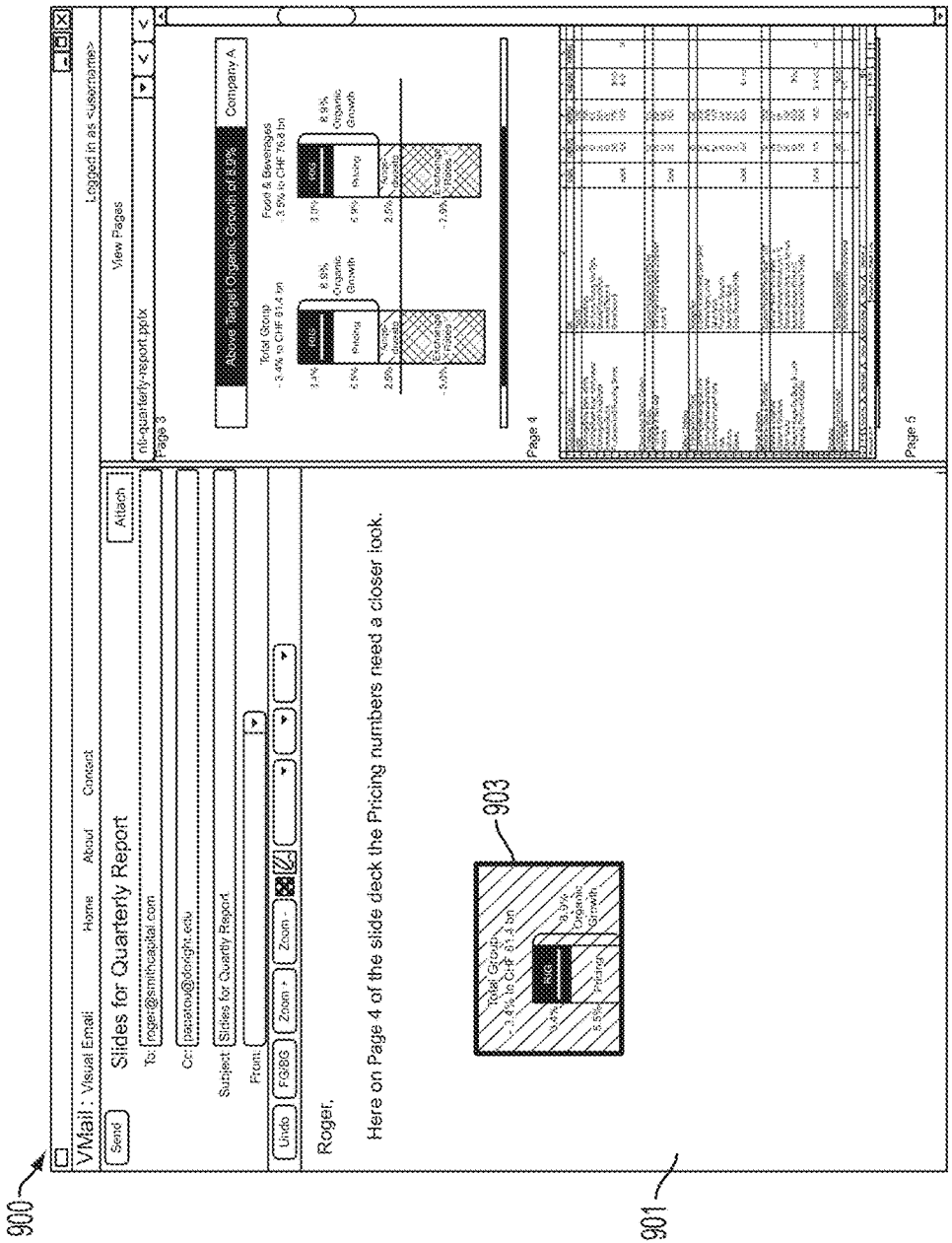
Figure 9C:
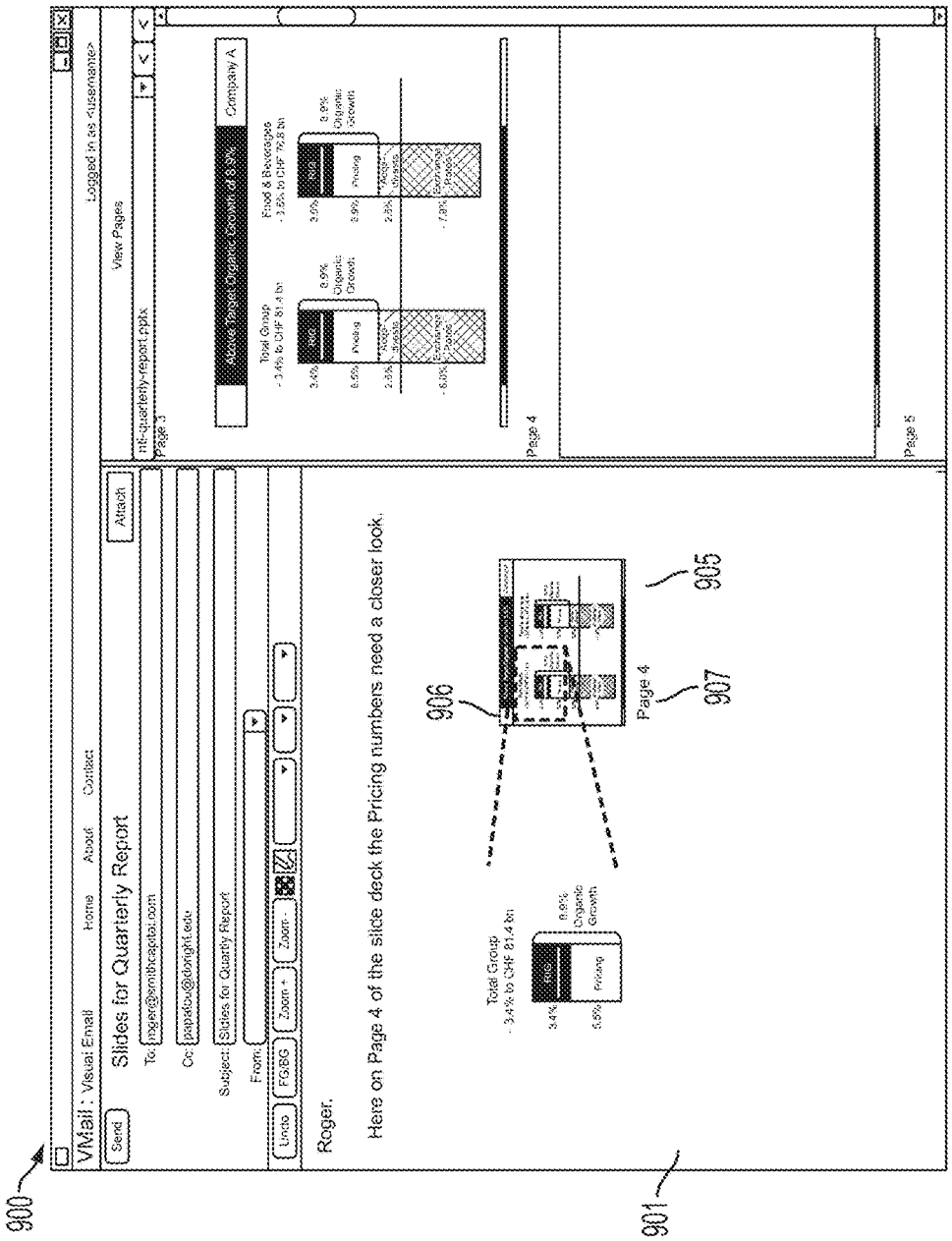

FIGS. 9A-9C illustrates one aspect of transfer and inclusion of contextual information when incorporating material from referenced documents in an email message.

Referring to FIG. 9A, the VMail Application user interface 900 displays a partially composed message in a Message Composition Region 901 and pages from a reference document image in a Page Viewing Region 902. A user selects a region of a page image 903 by a convenient operation such as dragging out a rectangle with a mouse, or by other known processes.

Referring to FIG. 9B, the user transfers the page image region of interest 903 to the Message Composition Region 901 by a convenient operation such as drag and drop.

Referring to FIG. 9C, another example is given. Here, the VMail Application places into the Message Composition Region 901 additional contextual information. In this illustration, the contextual information consists of a reduced size image of the entire page 905 from which the selected region 906 was extracted along with dashed lines indicating the location of the selected region within the entire page 905. Additionally, the page number of the source page is represented as a text object 907. In one embodiment of the present patent application, additional contextual information is carried in the form of metadata which may be accessed via a right button click, menu selection, or other well-known interface command. The metadata may include the document title, author, date, version number, and additional information about the source document.

In one embodiment of the present patent application, the selection and placement of additional contextual information is programmed to be fully automatic. In another embodiment, the selection and placement is semi-automatic and is invoked by convenient operations available to the user such as menu selection, keystrokes, or toolbar buttons.

FIGS. 10A-10D-2 illustrate other aspects of including contextual information which is enabled by existing methods in document image recognition. Specifically, FIGS. 10A-10D-2 refer to selection of material from a tabular document such as a spreadsheet. Very often, a cell or collection of cells of a spreadsheet or table are not informative in isolation, but are informative in the context of the row headers and column headers that index the cells' locations in the spreadsheet. An entire image region encompassing both the target cell(s) and its(their) respective row and column header(s) would often not be appropriate to copy to the Message Composition Region because it is very often too large and contains irrelevant material. FIGS. 10A, 10B and 10C illustrate user interface states in the selection of cells of a spreadsheet.

Referring to FIG. 10A, certain cells 1001 of a referenced spreadsheet document image 1000 have been selected by the user through a convenient operation such as mouse rectangle drag operation.

Referring to FIG. 10B, an enlargement of a portion of the spreadsheet image 1000 is shown. Accordingly, the user-selected cells 1001 are shown enlarged. Additionally shown are row header cells 1004 and column header cells 1005 that indicate the semantic index, or address, of the selected cells in the spreadsheet.

Referring to FIG. 10C, the user has dragged the selected cells 1001 to Message Composition Region 1007 (see also 503 of FIG. 5). But also appearing are excerpts of the source image corresponding to the row headers 1004 and column headers 1005. Additionally, the page number of the source image is added as a text object 1009.

FIGS. 10D-1 and 10D-2 present the process steps to perform automatic selection of contextual image material, in the case of a spreadsheet. The overall workflow decomposes into two sub-workflows that occur sequentially. The first sub-workflow 1020 is initiated by the user selecting a region of a page image in the Page Viewing Region, e.g. by a mouse rectangle drag operation, or other known process. The second sub-workflow 1040 is initiated by the user transferring selected material to the Message Composition Region, e.g. by a drag-and-drop operation or other known process.

Focusing on the first sub-workflow 1020, the user selects a region of page image 1022. At step 1023, automatic document recognition processing is applied to determine whether the page image contains tabular organized data such as a spreadsheet. Processes for performing such document recognition are available in the art such as described in Iyad Abu Doush and Enrico Pontelli, "Detecting and recognizing tables in spreadsheets", DAS '10 (Proceedings of the 9th IAPR International Workshop on Document Analysis Systems) Pages 471-478 ACM New York, N.Y.

If the decision point in step 1023 returns "YES", processing proceeds to step 1024. If the decision point returns "NO" an exit point is encountered and the sub-workflow 1020 is ended. In step 1024 it is determined whether the image region selected by the user contains one or more cells of the spreadsheet. This determination is made by intersecting the region of the page image containing data cells with the region selected by the user. Upon returning "YES", processing proceeds to step 1025. If the decision point returns "NO" an exit point is encountered and the sub-workflow 1020 is ended. In step 1025, the bounds of the row header corresponding to the selected cell(s) is determined, and then the process moves to step 1026 where the region identified in step 1025 is excerpted (copied) from the page image. Similarly, at steps 1027 and 1028 the region of the column header(s) corresponding to the selected cell(s) is determined and excerpted (copied). The determination of row and column header regions of the page is accomplished through tabular document image recognition methods as mentioned above.

Focusing on the second sub-workflow 1040, the user places their selected cell image region in Message Composition Region (e.g., 1007 of FIG. 10C), by drag-and-drop or a similar convenient operation 1042. At steps 1043 and 1044, the row header and column header context for the cell's meaning in the spreadsheet are automatically placed to the left and above, respectively of the cell's location in the Message Composition Region 1007.

Subsequent repositioning of the cell image region 1001 automatically causes the row header region 1004 and column header region 1005 to maintain their respective alignments to each other and the cell image region. However, manual direct repositioning or adjustment by the user of the row header region or column header region does not affect other regions, so the user is capable of achieving whatever configuration of image regions they may ultimately desire.

It is to be appreciated that the feature of automatic selection and copying of contextual information such as can be achieved by automatic document recognition processes are available in the art, and are applicable to document material other than spreadsheets.

Email Message Assembly

Returning to FIG. 6, at step 626 the VMail Application component of the present application performs steps that assemble the mixed type contents of the Message Composition Region (e.g., 503 of FIG. 5; 810 of FIG. 8B; 901 of FIG. 9C; 1007 of FIG. 10C) into a form that is configured to be transmitted via email protocols and that will display on the email client programs of the recipient of the email with text, and images intact and with fidelity to its appearance in the Message Composition Region. For the purposes of this application, this form of email message is referred to generically as a "composed mixed-content email message." Where such a message includes a coded format preserving separable structure of the content, such as but not limited to, text, image objects, digital ink, graphic objects, voice (audio) clips, and video clips.

In one embodiment of the present application, a composed mixed-content email message employs HTML/CSS tags as illustrated in FIGS. 11 and 12. FIG. 11 presents an example mixed content type message that could be composed in a Message Composition Region of the present disclosure. This message of FIG. 11 includes text 1102 and 1105; digital ink 1101 in the form of the encircling of some text; an image 1103 in the form of a torso in a t-shirt; and structured graphics in the form of an arrow 1104.

HTML (HyperText Markup Language) with CSS (Cascading Style Sheets) enhancements is a standard representation for communicating document content over the internet for display in web browsers. Under some circumstances, email clients are capable of rendering mixed content type messages encoded in terms of standard HTML/CSS tags. It is well known in the art how to convert different standard content element types to corresponding HTML/CSS tags. In the case of FIG. 11, the corresponding HTML/CSS representation is shown in FIG. 12. Specifically, text 1102 and 1105 is converted to <div> tags and <span tags> 1202 and 1205. Any freeform digital ink path 1101 is converted to an <img> tag 1202. As illustrated in FIG. 12, in one embodiment of the present application, the page image data itself is encoded in Base64 as the "src" attribute of the <img> tag. In an alternative embodiment, the image data is stored on the VMail Cloud Service and a URL (Uniform Resource Locator) for the image data is placed as the "src" attribute of the tag. Any image object of the mixed content type message 1103 is converted to an <img> tag 1203. Any graphic object 1104 is converted to an <img> tag 1204. Typically, CSS attribute positioning attributes are used to assign locations to the various content objects.

It is noted that certain figures include a statement that parts of Base64 code has been omitted for brevity. This omitted material does not affect the intended teaching of the present concepts.

In another embodiment of the present application, a composed mixed-content email message employs SVG tags as illustrated by reference to FIGS. 11 and 13.

SVG (Scalable Vector Graphics is a standard representation for communicating document content over the internet for display in web browsers. Under some circumstances, email clients are capable of rendering mixed content type messages encoded in terms of SVG tags. It is well known in the art how to convert different standard content element types to corresponding SVG tags. It is to be appreciated that multiple ways of mapping from mixed content type objects to SVG tags are possible. FIGS. 11 and 12 are used to illustrate one embodiment. In the case of FIG. 11, the corresponding SVG representation is shown in FIG. 13. Specifically, text 1102 and 1105 is converted to SVG <text> tags 1302 and 1308. Alternative image renderings of text are also encoded. These take form as <img> tags 1303 and 1309 which are grouped with their corresponding <text> tags through the use of <g> (group) tags, 1301 and 1307 respectively. Digital ink 1101 is converted to an svg <path> tag 1304. Any image object 1103 is converted to an SVG <img> tag 1305. Some graphic objects can be converted to corresponding SVG tags, while in other cases graphic objects, such as the arrow 1104 of FIG. 11, are converted to more generic <img> tags 1306.

In another embodiment of the present patent application, a composed mixed-content email message employs a sequence of text and image elements in the multipart MIME email transmission format. MIME is a standard representation for email messages that can include different types of content including plain text, rich text, and images.

For the example of the mixed content type message of FIG. 11, FIG. 14 illustrates a MIME encoding that standard email clients are capable of rendering such that the visual appearance of FIG. 11 is substantially preserved in the screen image presented to email message recipients. The email message includes a "multipart/related" section 1401. This in turn refers to a "multipart/alternative" section 1402 and one or more image/jpeg sections 1410, 1411. The "multipart/alternative" section 1402 in turn refers to a "text/plain" section 1403 and a "text/html" section 1408. In general, the email recipient controls whether plain text or html text is displayed. Both the plain text section and html section intersperse text and image objects. In the terminology of the art, images are displayed "inline". In the embodiment shown in FIG. 14, the image data is encoded as part of the message in Base64 format in the "image/jpeg" sections 1410 and 1411. In an alternative embodiment, the image data is stored on the VMail Cloud Service and URLs are provided. For the purpose of inline intermixing of text and image content, image data is given ID names 1412 and 1413. These are referred to in the plain text and html text sections, e.g. 1404, 1406, and 1409.

It is to be appreciated the forgoing describes only one exemplary configuration of a MIME based message, and other configurations of multipart MIME types are possible.

Figure 15:
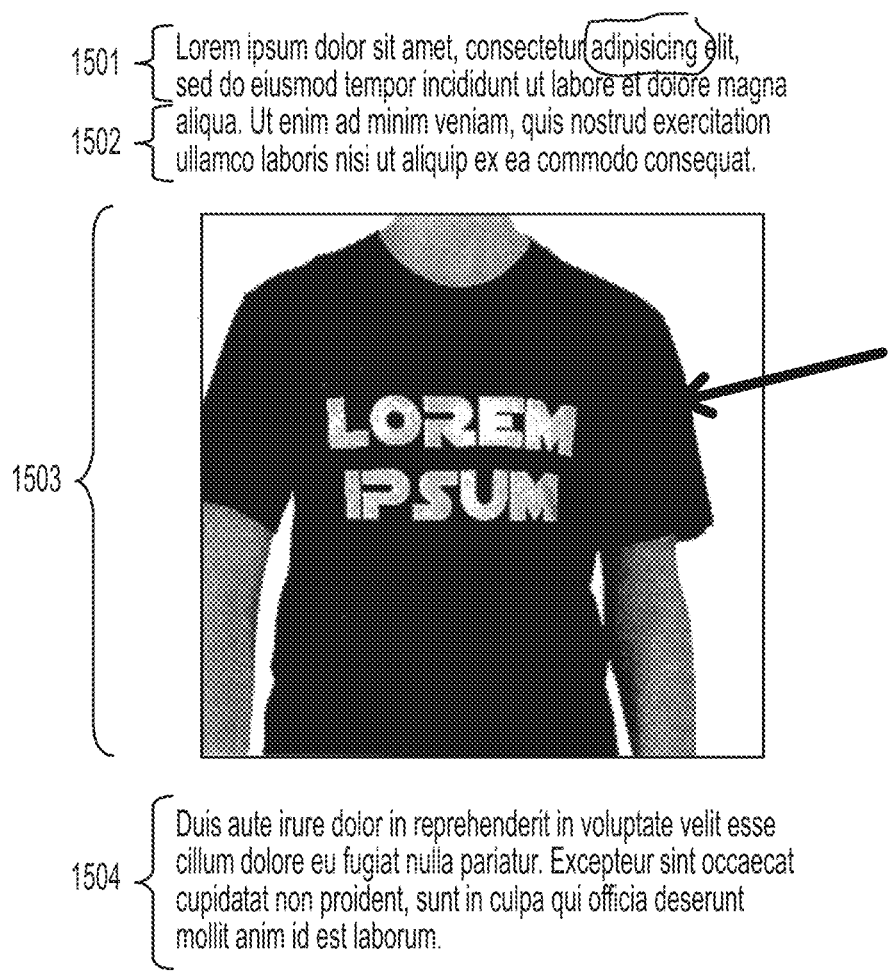
FIG. 15 illustrates bands of alternating image and text sections a mixed content message.

In an embodiment employing multipart MIME encoding, individual text, image, digital ink, and graphic objects from the original mixed content type message are not give different sections of the MIME message. Instead, the message is converted to strips, or bands of alternating text and image content, stacked vertically. FIG. 15 shows how the example of FIG. 11 is decomposed into bands. Any horizontal strip of the mixed content type message that includes any image, digital ink, or graphic content (anything other than text) will be rendered as image format. Thus, a line of text in the message that has a non-text marking, for example the encircling of a word, will be transmitted as image content type 1501, (1412 of FIGS. 14-1 to 14-3). Image and graphic objects are also transmitted as image content type 1503, (1413 of FIGS. 14-1 to 14-3). Sections of the original message whose horizontal projections contain only textual material are transmitted as text 1502, 1504, (1405, 1407 of FIGS. 14-1 to 14-3). Alternative embodiments are possible wherein textual message content that is eligible to be transmitted as text is nonetheless converted to image format. In the extreme, under one embodiment of this application, the entire message content is converted and transmitted as one or more image sections of a MIME-encoded email message.

Figure 16A:
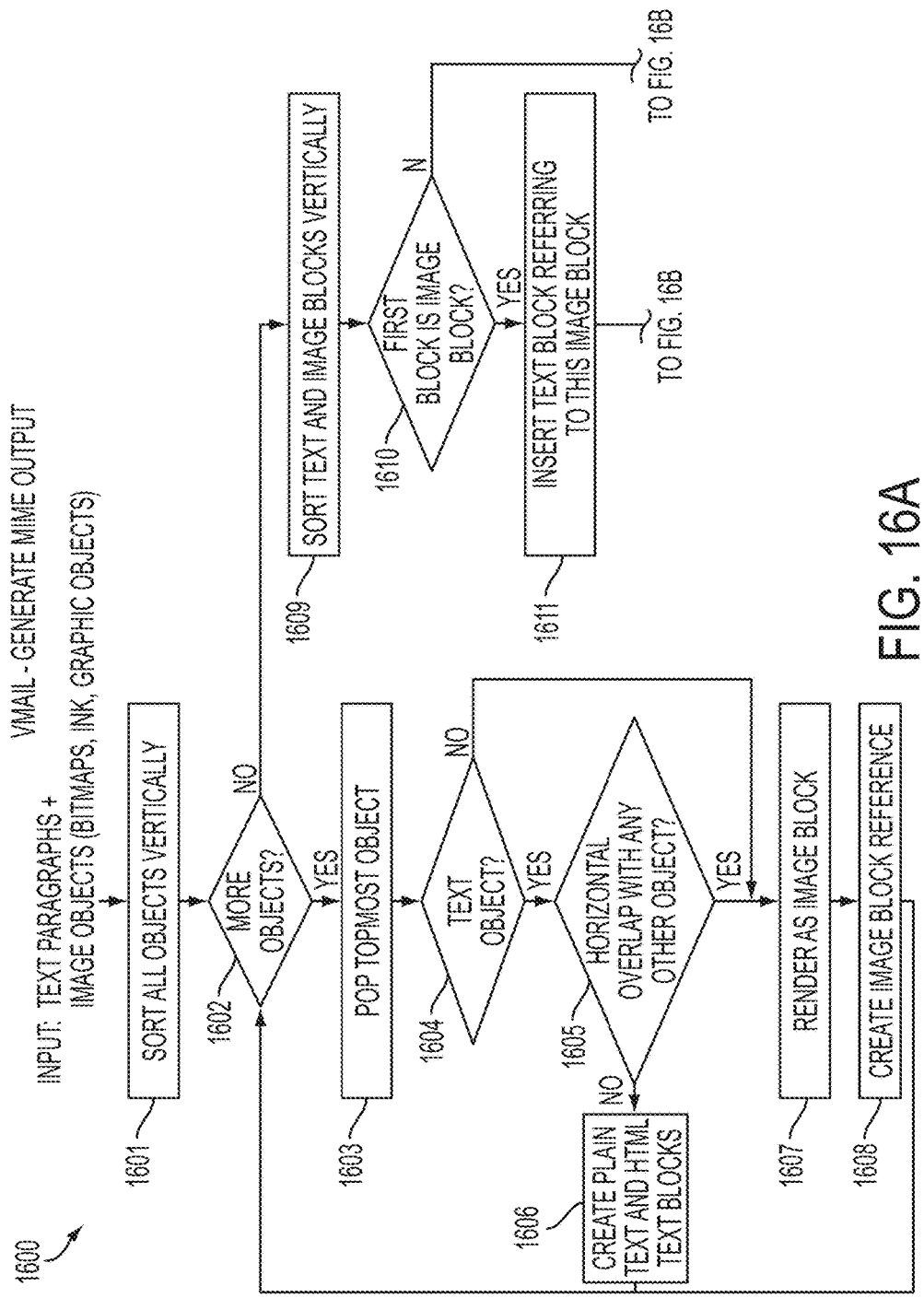
FIGS. 16A to 16B presents a process flow for generating a multipart MIME email message from mixed content on a canvas.
Figure 16B:
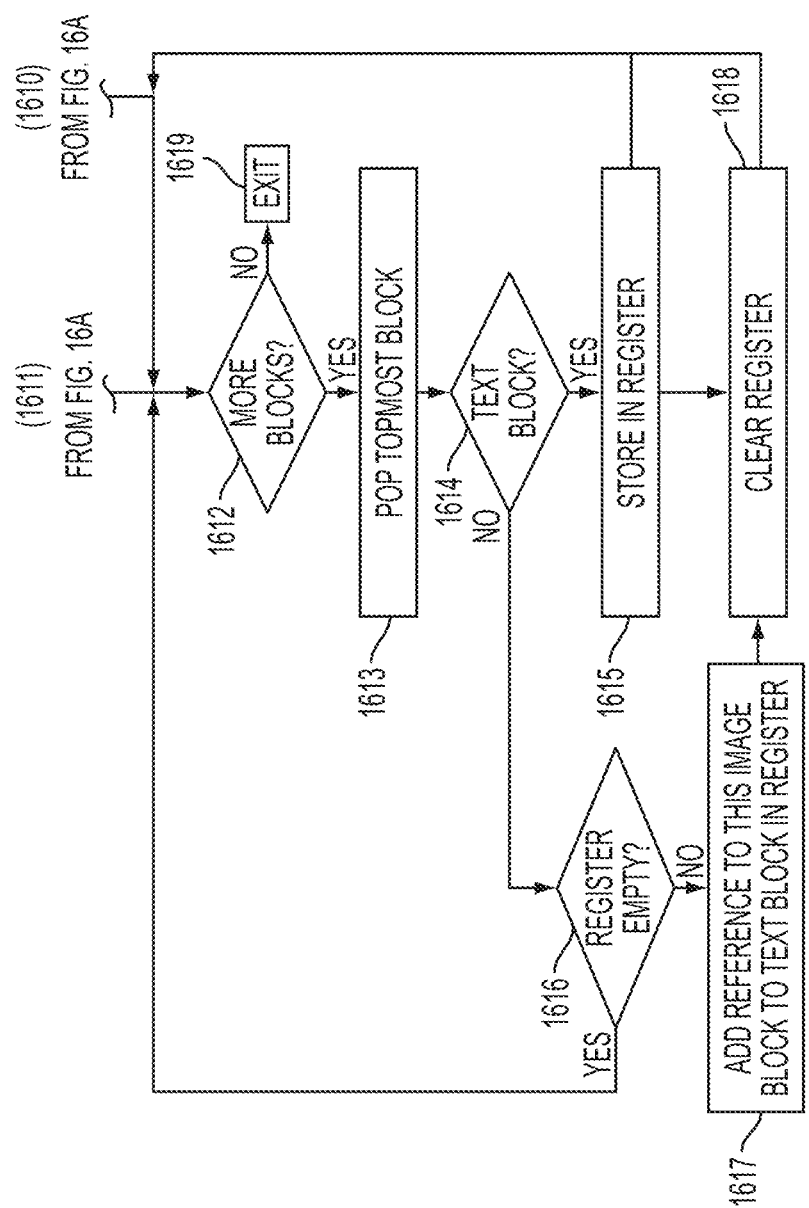

FIG. 16 presents a procedure 1600 for converting a mixed content type message into the text and image sections of a multipart MIME message. The input to the procedure is a mixed content type message in general containing text, bitmap image, digital ink, and graphic objects. At step 1601 all objects are sorted vertically by their topmost location. The sorted list of objects is passed to an iterator 1602 which considers objects one at a time. When more objects exist, the process moves to step 1603. At step 1603 the next object is popped from the list. At step 1604 the object type is considered. If it is a text object, processing proceeds to step 1605. If it is an image object, digital ink, or a graphic object, processing skips step 1605 and proceeds to step 1607.

At step 1605, all non-textual objects are considered and by a well-known method of projection profiles it is determined whether any non-text object intersects the current text object in horizontal projection. If so, processing proceeds to step 1607. If on the other hand the object consists purely of text that does not intersect any non-text object in projection profile, processing proceeds to step 1606. At step 1606, plain text and html text versions of the textual matter are created. These are referred to as "text blocks".

If the process on the other hand moves from steps 1605 or 1604 to step 1607, objects are rendered into bitmap objects and then at step 1608 these are converted to jpeg image format, png format, or any other format that may be accepted by email clients for inclusion in the multipart MIME message. These are referred to as "image blocks."

When all objects have been considered, the iterator step 1602 passes processing to step 1609. At step 1609, the list of text blocks and image blocks is sorted vertically by their topmost location. At step 1610 it is determined if the first block in the list is an image block. If yes, processing proceeds to step 1611. If not, processing proceeds to step 1612.

At step 1611, a text block is created that contains a reference to the image block, following the example shown by 1404 and 1409 (of FIGS. 14-1 to 14-3). Step 1612 is an iterator that considers the remaining sorted blocks one at a time. At step 1613 the next block is popped. Step 1614 determines whether this is a text block. If so, this text block is stored in a register at step 1615, and processing returns to the iterator 1612. If at step 1614 the block is an image block and not a text block, then the process moves to step 1616 to determine whether the register is empty. If the register is empty, then processing returns to the iterator 1612. If it is not empty, then at step 1617 a reference to this image block is created for the text block in the register, and at 1618 the register is cleared, whereupon processing returns to the iterator 1612. In this manner, it is ensured that the image sections of the multipart MIME message created are all referred to by a preceding text block. Thereby, the recipient's email client will render text sections and image sections in correct order preserving the layout of the sender's mixed content type message.

VMail Enhanced Message Content

While it is understood that even others that are using an email service that is not a VMail Arrangement will obtain the VMail generated message with the content created by a VMail based system (i.e., a third party does not need to employ the VMail Application to receive enhanced mixed content VMail emails). In one embodiment of the present teachings, the VMail-generated message further exploits the multipart MIME email format standard to provide enhanced functionality to email recipients who possess VMail-enabled email client programs. In this embodiment, an additional text/plain section is added to the multipart MIME message. The section is given a special Content-Type, which by example is referred to here as "VMail-SVG". The text content of this section consists of the SVG encoding of the mixed content type message as exemplified in FIGS. 13-1 to 13-4.

The VMail-SVG section of the multipart MIME email message is generated by the VMail Application to gain access to the mixed content type objects the VMail message sender created and manipulated, including plain text, formatted text, bitmap images, digital ink, and graphic objects. A recipient possessing a suitably enabled and authorized VMail Application or equivalent that is capable of parsing and rendering the SVG representation then presents these objects in the Message Composition Region, in lieu of the sequential text sections and inline image sections of a standard multipart MIME rendering. It is to be appreciated that in some embodiments of the present application, access to VMail-SVG content is provided as an added value service or product.

In one embodiment of the present application, the additional text/plain section incorporates metadata about authorship and other attributes of text and enhanced content. Each text object, image object, digital ink object, and graphic object is tagged with the user ID of the person who created or edited it. Then, a document viewer such as the VMail Application exploits this metadata in order to support filtering, selective viewing and selective re-editing of the VMail message. This functionality enhances users' ability to understand what comments or remarks were made by the various parties to an email thread built up in layers by multiple people modifying VMail-generated messages.

Expanded Editing Tools and Processes Discussion

A number of editing tools and processes have been previously introduced, such as in the paragraphs related to FIGS. 8A and 8B, and the paragraphs immediately preceding those paragraphs. The following discussion includes additional discussion regarding various ones of those tools and processes.

Figure 17:
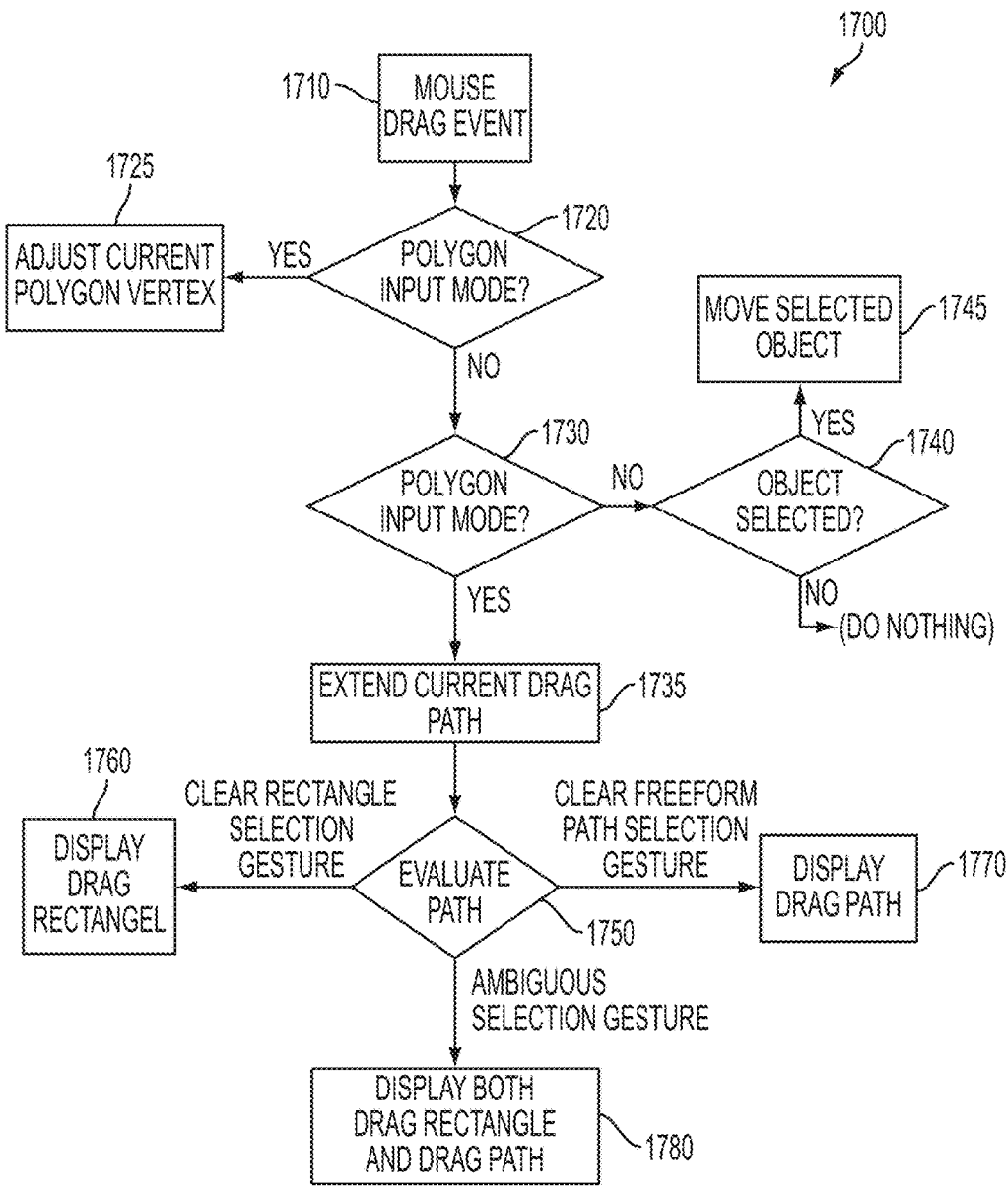
FIGS. 17 to 20 are flow diagrams of editing tools and processes.

The previously introduced select and crop tool and process which is configured to select and crop image objects using rectangle drag or lasso drag without prior selection of mode is illustrated in one embodiment by reference to FIG. 17. This figure shows a flow chart illustrating the steps in rectangle drag and freeform path (e.g., lasso selection) methods of object selection. At step 1710 a mouse drag event is initiated. The user determines whether to utilize a polygon input mode at step 1720. If the polygon input mode is selected, the processor adjusts the current polygon vertex at step 1725. If the polygon input mode is not selected, a decision is made at step 1730 as to whether to select the path/rectangle input mode. When the path/rectangle input mode is not selected, the processor, at step 1740, determines whether an object has been selected. If an object has been selected, it is moved at step 1745. If an object has not been selected, no action is taken. Returning to step 1730, if the path/rectangle input mode is selected then an evaluation of the path is initiated at step 1750. If a clear rectangle selection gesture is provided, the processor displays the drag rectangle at step 1760. If the selection gesture is a clear freeform path, then the drag path is displayed at step 1770. In those cases in which the selection gesture is ambiguous, both the drag rectangle and drag path are displayed at step 1780.

Freeform path selection gestures and enclosing rectangle selection gestures are both initiated by the same event, a single mouse press not occurring over a selectable object. In this state, the spatial characteristics of the gesture are analyzed to determine whether it has the characteristics of a freeform path, a rectangle, or either/both. Depending on this analysis, the path, the rectangle, or both are displayed.

Figure 18:
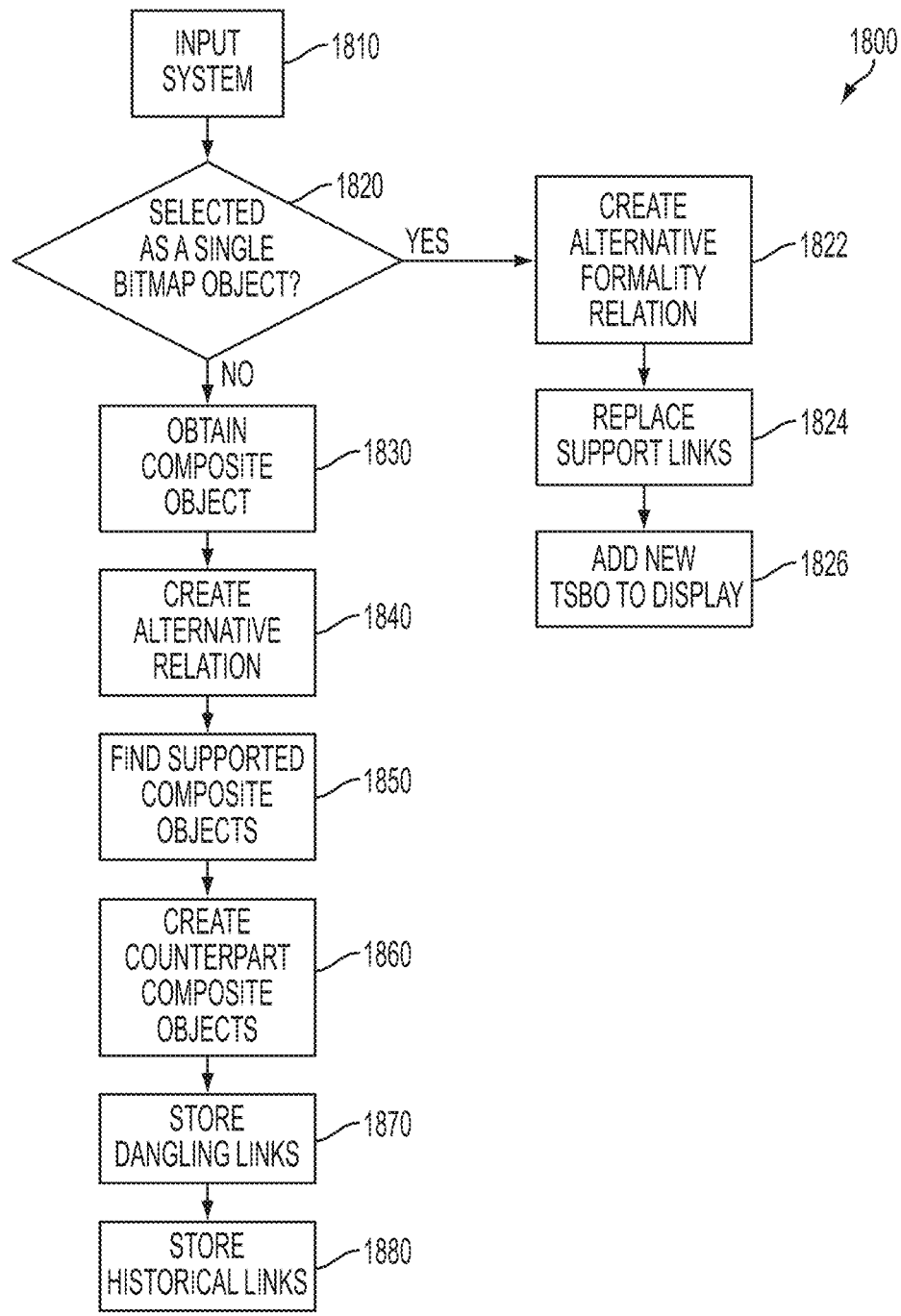

Turning now to FIG. 18, an embodiment of the select primitive object tool and process, which is configured to select among multiple overlapping groups of primitive (or primary) objects is set forth.

The flow diagram of FIG. 18 teaches a method for maintaining established group structure even while the user replaces source image material with typed text. The Primary Image Object (e.g. Bitmap Objects), which are to be replaced by typed text, may in many cases participate in groups, which are represented by Composite Objects. These groups should be preserved if possible even if the selected Bitmap Objects are removed and replaced with typed text. In this example, typed text is entered into a display of an electronic computing device using a special kind of Bitmap Object called a Text String Bitmap Object. This is a Bitmap Object which is associated with a set of ascii characters plus typography information such as font family, font size, font color, etc. The textual characters and typography information permit this Bitmap Object to be modified by the user in terms of its formatted textual appearance.

At step 1810, the input to the system may include Bitmap Objects, with a group structure represented by a lattice of Composite Objects, a Text String Bitmap Object (TSBO), and a listing of Selected Bitmap Objects the TSBO is to replace in the image display. At step 1820 a determination is made as to whether the selected image objects are comprised of a single Bitmap Object. If the selected image objects are not comprised of a single Bitmap Object, then at step 1830, a Composite Object corresponding to the collection of selected Bitmap Objects is identified.

At step 1840 an Alternative Formality Relation is generated between the Composite Object and a new TSBO. At step 1850 the processor identifies those Composite Objects whose supporting Bitmap Objects include the entire set of selected Bitmap Objects, as well as additional Bitmap Objects. The additional Bitmap Objects supporting each such Composite Object are identified as the non-selected supporting Bitmap Objects. At step 1860 the processor removes the links from the non-selected supporting Bitmap Objects and identifies these as historical links. The processor then creates a counterpart Composite Object whose support is the non-selected supporting Bitmap Objects plus the new TSBO. At step 1870 the processor identifies Composite Objects whose support does not include the entire set of selected Bitmap Objects and removes the links to the non-selected Bitmap Objects supporting these Composite Objects. These are stored as historical links, to be restored in the event that the replacing typed text in the display is itself replaced by the original informal Bitmap Objects it replaced. At step 1880 the selected Bitmap Objects are removed from the display and the new TSBO is added to the display. If the selected image objects are comprised of a single Bitmap Object, at step 1822 the processor creates an Alternative Formality Relation between the selected Bitmap Object and a new TSBO. At step 1824 the processor identifies each Composite Object supported by the selected Bitmap Object and replaces the support link to the Bitmap Object with a support link to the new TSBO. At step 1826 the processor removes the selected Bitmap Object from the display and replaces it with the new TSBO.

The result of the procedure described above is a reconfigured structure lattice, whereby the TSBO replaces the selected Bitmap Objects in the list of displayed image objects visible in a display, while groups involving the selected Bitmap Objects now become associated with the TSBO. This structure leaves "historical links", which preserve the information about the original groupings. This permits the TSBO to be exchanged and the original Bitmap Objects it replaced to be restored, with all of their prior grouping structure. It will be noted that although the foregoing has been described with regard to replacing Bitmap Objects representing textual material with typed text represented in a Text String Bitmap Object, this procedure applies as well to purely graphical or line-art data, thus enabling groups of image primitives to be replaced with Formal Graphic Objects while maintaining prior grouping relationships.

Figure 19:
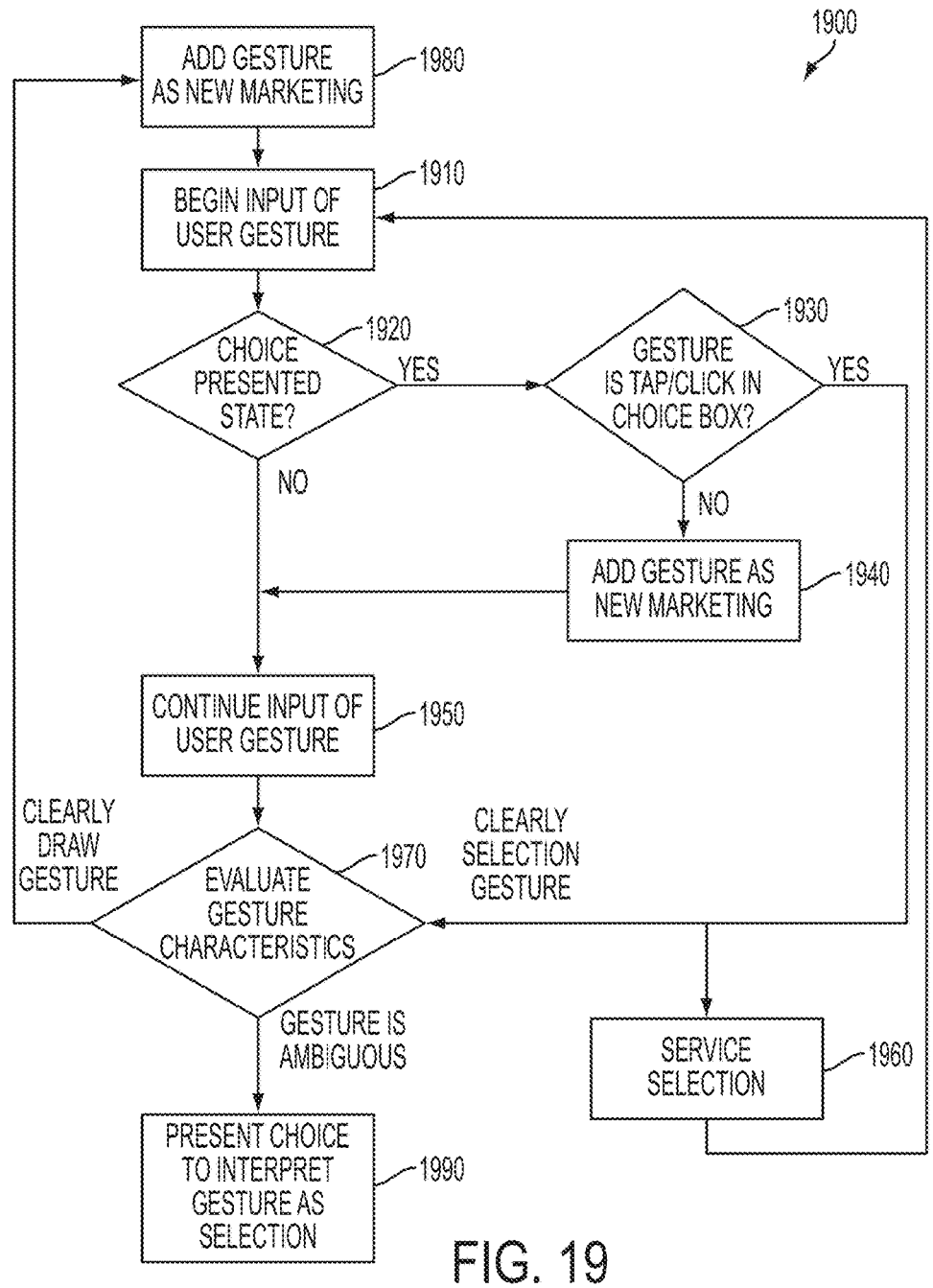

Attention is now directed to the previously introduced gesture interpretation tool and process, configured to interpret mouse/stylus/finger gestures as either a lasso selection gesture or a stroke of digital ink. FIG. 19 shows a flow diagram illustrating steps in a user interaction cycle of this tool and process.

Initially, the user interaction cycle begins with the user initiating a gesture, which could be either drawn digital ink content or a command/selection gesture, by pressing or touching the stylus, pen, or mouse. This occurrence is indicated by the processor passing a "stylus down" event or equivalent at Step 1910. At Step 1920 a determination is made as to whether the system is in "choice presented state" by consulting a "CHOICE_PRESENTED_STATE" internal state variable. At the outset of user interaction this variable is initialized to the value, FALSE. If at Step 1920 the CHOICE_PRESENTED_STATE is FALSE, then the user's input is gathered until the stylus is lifted or mouse button is released. This input may be a stroke consisting of a series of mouse/stylus locations, or it may be a "tap" if the pointing device is lifted/released at the same location where it was set down or the button was pressed. In the event that a stroke is being drawn, at step 1950 this gesture may be rendered on the display as a tentative path, such as a dotted line. When the gesture is completed, various tests are then employed at step 1970 to determine whether a user gesture can be interpreted as an unambiguous draw operation, an unambiguous selection operation, or an ambiguous operation.

If the gesture is a "tap" located on top of or immediately beside an image object, then it is interpreted as a selection gesture and that object is selected and processing proceeds to step 1960. Repeated tapping at approximately the same location may be used to cycle through groups that this object belongs to. Servicing the selection at step 1960 involves highlighting or otherwise indicating which object(s) are selected and entering a state whereby further input gestures may be interpreted as move, delete, or other operations on the selected objects, as is standard in the art. For example, a pop-up menu of operations may be presented for the user to select among, including Move, Delete, Rotate, Duplicate, etc. Furthermore, the selected object(s) may be highlighted, and Move operations may be executed by pressing the mouse/stylus on a selected object and dragging it. If the gesture is a tap not located on top of or immediately beside an image object, then the gesture is interpreted as a drawn "dot" of digital ink, and at step 1980 is rendered as such on the display and recorded as such in the displayed objects data structure.

If the gesture is a closed or nearly closed path that encloses or partially encloses at least one existing object, then it is ambiguously a selection operation or a draw operation. Also, if the gesture is a nearly straight line that approximately underlines textual image material or falls besides several lines of text, then it is ambiguously a selection operation or a draw operation. It will be clear to skilled practitioners that other comparisons of the user's stroke with displayed image material can be devised for which the gesture can be interpreted either as selecting certain image material, or else existing simply as hand-drawn digital ink image content. In such a case, processing proceeds to step 1990. The internal "CHOICE_PRESENTED_STATE" state variable is set to TRUE, and a choice is presented to the user as to whether to interpret the gesture as a selection operation or not. This may take the form of a pop-up menu choose box in close proximity to the gesture.

If, at step 1970 the processor determines that the gesture input at step 1950 is clearly a draw operation, for example, closed path strokes that do not enclose anything or open strokes occurring not in proximity to textual image material, the program proceeds to step 1980, where the gesture is added as a new marking. Consider next the processing of user input gestures when the "CHOICE_PRESENTED_STATE" flag is TRUE at step 1920, and the display consequently contains a pop-up menu choose box. At step 1930 the system makes a determination as to whether the gesture is a tap/click inside the pop-up choice box. If the gesture is a tap/click inside the choice box, then the gesture is interpreted as a selection operation, the tentative path is erased and the program services the selection at step 1960. If on the other hand the mouse/stylus press is outside the choice box, then the prior gesture is interpreted as drawn material. It is immediately rendered as such and entered into the displayed object data structure at step 1940, and the system continues to gather the path of the currently input gesture, at step 1950. From step 1950, when the pen is lifted, the current gesture is evaluated at step 1970, as described above.

Thus the described tool and process provides the user with the ability to execute unimpeded sequential input of freeform strokes of many types rapidly and without making explicit choices about user interface modes or interpretations. The user can perform selection operations without first entering a selection mode. Instead, a selection choice is presented, but only after the gesture has been drawn and it is found to be ambiguous in intent. Although the present invention has been described in terms of draw gestures, it will be noted that the present invention is not limited to draw gestures only. Additional commands can be recognized by their intrinsic characteristics and context, for example, a cross-out/erase command indicated by a "scratch out" gesture. This would cause an "Erase?" menu button to pop up, which could be pressed to erase crossed-out material, or ignored if the intent was to draw and leave on the canvas a cross-out marking. Numerous other such examples will occur to those skilled in the art.

It is noted that within this discussion reference has been made to "tapping", "clicking" or otherwise selecting an object. The term tapping is generally used in reference to the physical act of touching a stylus, pen, or finger of a touch-based computing system to the screen or tablet and shortly thereafter lifting the stylus, pen or finger from the screen (i.e. within a predetermined period of time) without moving the stylus, pen or finger any significant amount (i.e. less than a predetermined amount, as for example two pixels). This is a typical method of selecting objects in a touch-based computing system. The term "clicking" is intended to be broader in scope and is intended to cover not only tapping, but also the action of selecting an object using a button associated with a mouse, track ball, or touchpad as well as the selection of an object using any other pointer device.

Figure 20:
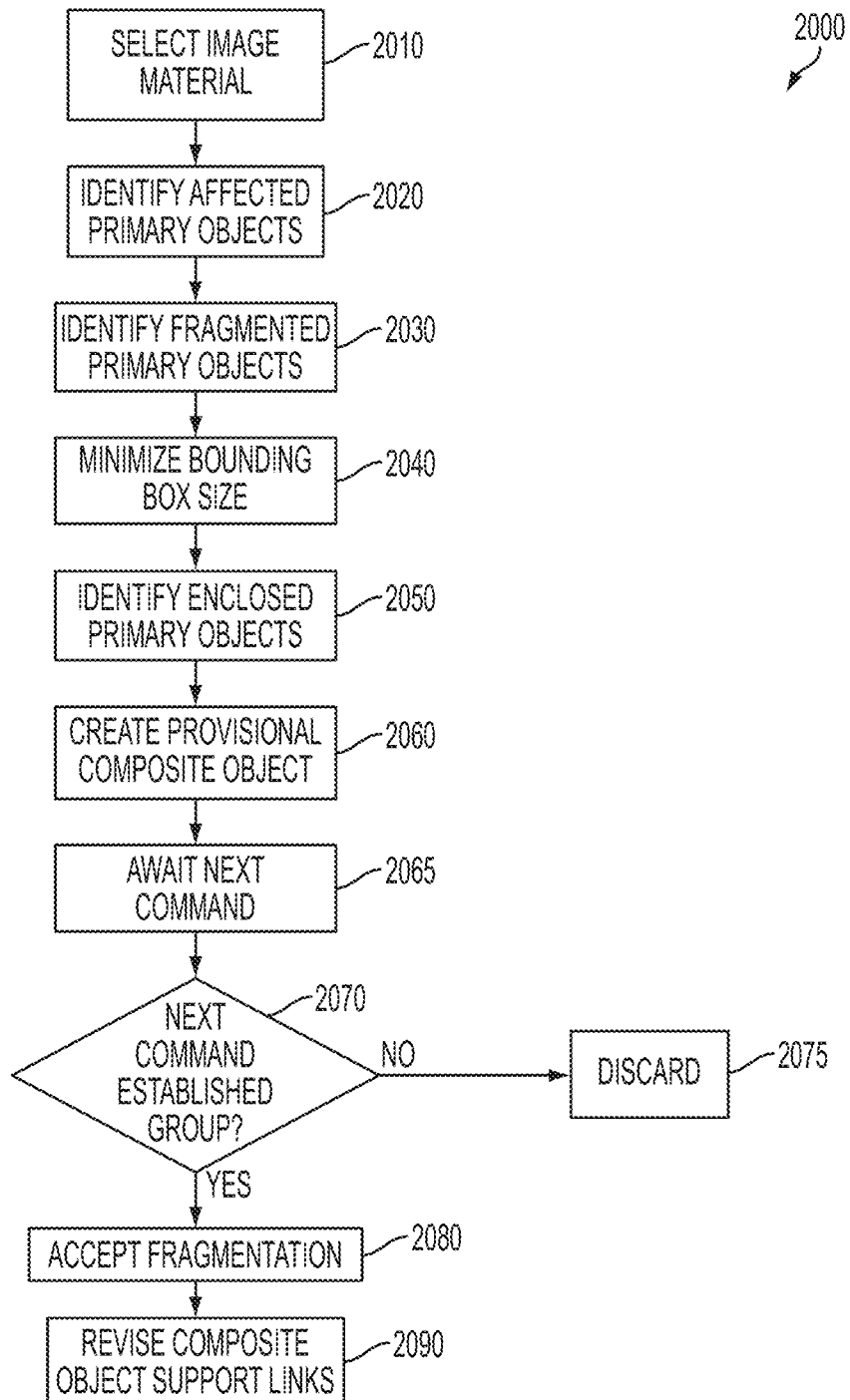

Attention is now directed to the previously introduced automatic subdividing (e.g., fragmentation or decomposition) tool configured to provide automatic subdividing (e.g., fragmentation or decomposition) of image regions into smaller image objects on the basis of user selection operations. FIG. 20 is a flow diagram illustrating one possible user interaction procedure in which Primary Objects may be split or fragmented through user selection. At step 2010 image material is selected by inputting a closed path selection to enclose the desired material from the Primary Objects. Although for the purposes of this example material is selected through use of a freeform path, it is noted that multiple other means may be used, such as rectangle dragging, polygon selection, selection of established primitive image objects with a single mouse click, selection of established groups of image objects with multiple mouse clicks, and editing of group structure by depressing a single pre-specified key, for example the shift key, while performing selection operations.

The desired material may contain one or more objects, such as text characters and words or other shapes. At step 2020 the processor detects the Primary Objects intersected or enclosed by the selection path and identifies them as the affected Primary Objects. The affected Primary Objects' bitmaps are broken into fragments according to the selection path at step. The bounding box size of each of the fragmented Primary Objects is reduced to the minimal bounding box size of the foreground material for each fragmented Primary Object at step 2040 and fragments containing no foreground pixels are eliminated. At step 2050 the processor gathers the fragmented Primary Objects and non-fragmented affected Primary Objects enclosed by the selection path to form enclosed Primary Objects.

The use of bitmap type Primary Objects is improved by the step 613 of FIGS. 6A-6C of performing automatic image processing to render background regions of the image transparent. Typically, the background in a document image is the color of paper or a blank canvas which is normally white or nearly white. In selecting and re-arranging bitmap type Primary Objects on the canvas, the user will find that background pixels can occlude the foreground markings of interest. Therefore, it is beneficial to apply image processing to detect background pixels and render them transparent in the electronic bitmap image. This way, foreground objects can be put in close proximity and remain fully visible, without occlusion by surrounding background pixels. In one embodiment, at step 613 of FIGS. 6A-6C, a machine learning classifier, well known in the art, is applied. The classifier is trained to distinguish between document type images which contain foreground graphic markings against a uniform or near-uniform background, versus photographic images. Automatic image processing to set background pixels transparent is applied only to those images that are classified as document images not to photographic images (e.g., bitmap images of document pages versus bitmap images of photographic scans).

The processor then creates a new provisional Composite Object representing the group of enclosed Primary Objects at step 2060. At this point the user has performed a selection operation and the system completes its tasks and at step 2065 pauses for receipt of a next command. At step 2070 a determination is made as to whether the next command establishes a group. If a group is not to be established, the processor discards the fragmented Primary Objects and the provisional Composite Object at step 2075. If a group is to be established, the fragmentation is accepted. The processor then removes the affected Primary Objects from the original Primary Object List and adds the fragmented Primary Objects to the Primary Object List at step 2080. At step 2090 the processor locates Composite Objects supported by the affected Primary Objects. For each such Composite Object, the processor replaces its support by the affected Primary Objects with support links to enclosed Primary Objects.

Automatic Hybrid Reflow System and Method for Reflow of Text in Mixed Content Documents Attention is now directed to text reflow concepts, incorporated into the disclosed VMail Arrangement. It is understood however that the following concepts may also be implemented in environments other than the presently disclosed VMail Arrangement, such as but not limited to other electronic document forming and editing environments.

The issues, to which the present concepts are directed, involve the creation and editing of mixed content type documents containing both running text and graphical objects, which includes but is not limited to images, drawings, structured graphics, digital ink, and text. Graphical objects thus encompass what are conventionally known as figures in documents. Document authors desire to achieve document layout which is both logically meaningful and visually pleasing. Figures need to be placed in correct juxtaposition to the running text that refers to them. Running text requires text to reflow to maintain column width and avoid overlap with figures. To be easily readable and visually pleasing, text lines must have a minimum width. Graphical objects require that text which is part of the graphical objects stay where the user entered them relative to other elements of a graphical object (or figure), and thus not be subject to reflow. These behaviors can be at odds with one another. The following presents teachings in connection with FIGS. 22A-34 which reconcile these conflicts.

Figure 33A:
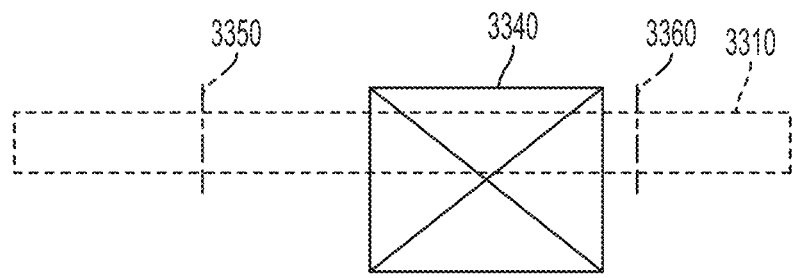
Figure 33B:
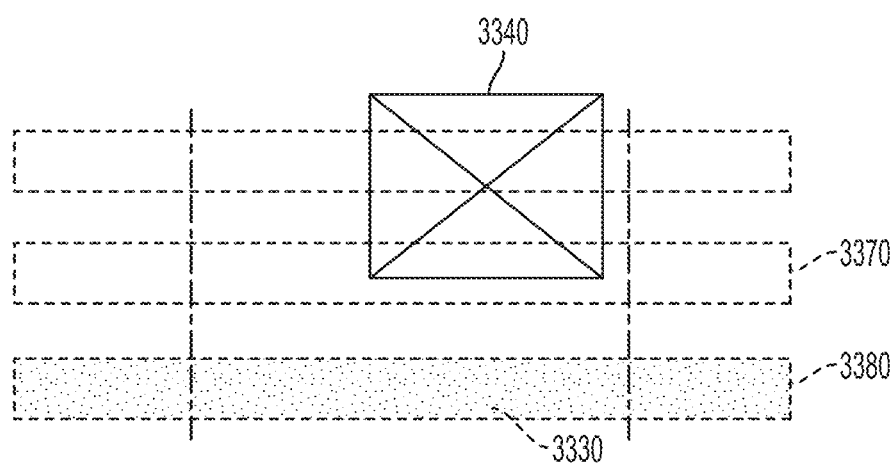
Figure 34:
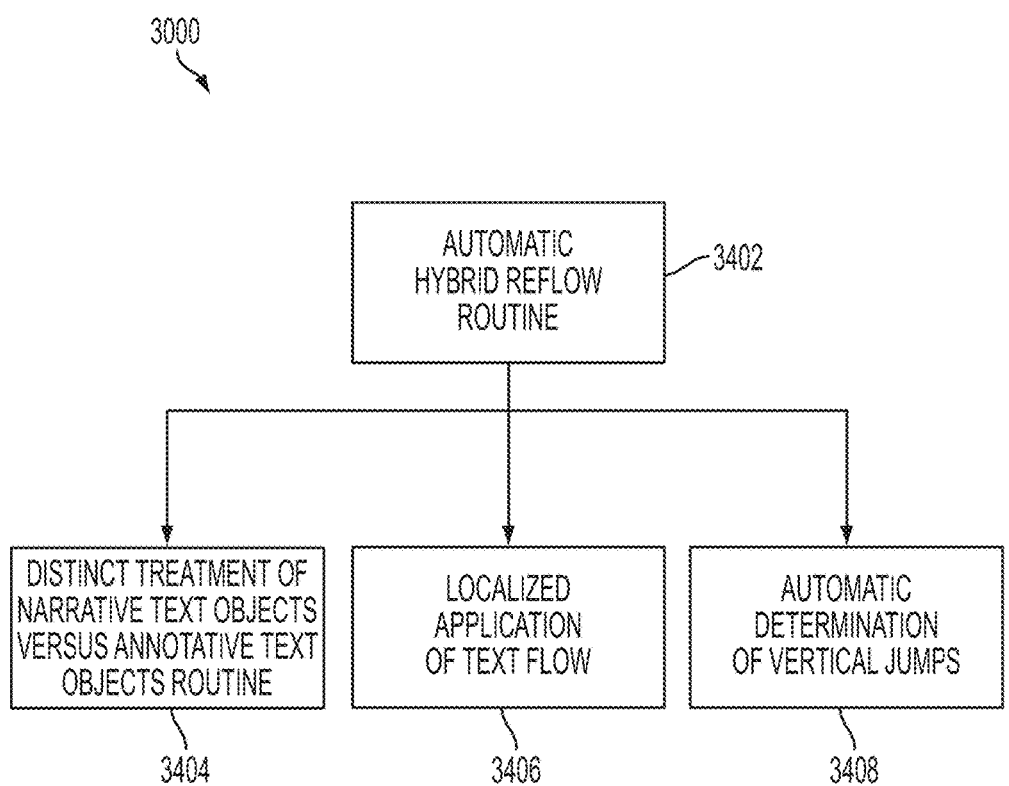
FIG. 34 illustrates automatic hybrid reflow concepts.

With attention to FIG. 34, illustrated is a document authoring and editing tool or process 3000. The tool or process employs an Automatic Hybrid Reflow Routine 3402 which presents a user interaction design that, among other aspects, encompasses the following features: (i) Distinctive Treatment of Narrative Versus Annotative Text Routine 3404; (ii) Localized Application of Text Reflow Routine 3406; and (iii) Automatic Determination of Vertical Jumps Routine 3408. Any one or a combination of these features may be applicable to any given document, depending on the document's content. It is to be appreciated that in some embodiments the fully automatic aspects of the Automatic Hybrid Reflow Routine may be modified to include deliberate user intervention to set conditions and parameters of the method manually and thus become semi-automatic. FIGS. 22a-33B and the associated discussion expand upon the document authoring tool having aspects summarized by FIG. 34.

Distinctive Treatment of Narrative Versus Annotative Text

A specific aspect of the present teachings is a feature known as Distinctive Treatment of Narrative Versus Annotative Text Routine 3404. Narrative text is subject to automatic reflow, while annotative text stays where the user placed such text, relative to local coordinate systems, where the local coordinate systems of graphical objects can be translated with respect to the global system of the entire document. It is to be understood that narrative text and annotative text refers to what a user intends to put in an electronic message, and what is instantiated by a program configured according to present teachings.

Providing some background, it is known that WYSIWYG (What You See Is What You Get) User interfaces for document editing follow one of two models for placement of text and figures: "flow formatting" and "absolute positioning". A standard WYSIWYG text editor such as Microsoft Word uses flow formatting to cause text layout to conform to a predetermined design. Text is laid out in one or more columns that extend through one or more pages. Text may be inserted or deleted anywhere, but at each such operation the locations of other text elements (i.e. words) are repositioned to adhere to the layout format. In enhanced versions of flow formatting text editors, images and figures may be placed within the body of the text, and text will be positioned automatically to flow around the images and figures.

A standard graphics editing tool such as Microsoft PowerPoint or Adobe Illustrator use absolute positioning, whereby text and image objects remain where they are placed by the user. In some cases, an absolute positioning editor may incorporate a limited amount of flow formatting for text objects. But the placement of the text object itself is fixed wherever the text object is placed by the user. For example, in PowerPoint a user can create a text object and place it on a canvas of an electronic display. Then, for example, the user can grab a right side of the text graphic and change the width, and the text will reflow in a limited amount. However the text object would remain fixed, i.e. the left side edge or location of the text object would not be moved. Thus in contrast to a full narrative text editor, in a structured graphics editor such as PowerPoint, the reflow is constrained to the text object affected and does not propagate to other objects on the canvas.

Under existing practice, if a user wishes to author a document containing text interspersed with graphical objects, they use a structured graphics editing tool or a photo editing tool to create individual graphical objects (or figures), and a separate WYSIWYG text editing tool to position such graphical objects within the text document. In some cases it is possible to invoke a structured graphics editing tool or photo editing tool from within the text editing tool, but any textual or graphic objects are constrained to the page region defined by the structured graphics editing tool or photo editing tool.

This situation is less than ideal for anyone wishing to place graphical objects at arbitrary locations within the running text of a document, and have the running text flow around (not overlap) such graphical objects, where the graphical objects include but are not limited to images, structured graphics, digital ink and text. An example situation where this more flexible type of authoring would be preferred is in the presently disclosed Visual Email (e.g., VMail). As has been described, with VMail a user is allowed to compose a narrative text message that incorporates excerpts from email attachments or other shared documents, including drag and drop of graphical objects into the body of the VMail email message, and including entry of text as annotations or captions to these graphical objects.

Attention is now directed to a more detailed discussion of the present methods and systems for distinctive treatment of narrative versus annotative text in text reflow.

It is understood from the foregoing that in the presently described VMail Application includes at least the following elements:

(i) Document Objects (Which include at least the following types of document objects):
Text Objects
Graphical Objects, which may include:
Image Objects
Ink Objects (Digital Ink Objects)
Structured Graphics Objects
Hyperlinks
Audio Clips (Icons)
Video Clips (Icons)
(ii) A canvas on which Document Objects are placed.
(iii) A caret, or other visible cursor, indicating a reference location for various operations including text placement and paste location for document objects.
(iv) A controller which responds to user interface commands and causes changes to the content of the canvas, changes to layout of objects on the canvas, and changes to the internal structure of document objects.

Operations available to a user of the VMail application include the following:
(i) Text-related:
keyboard entry of text
keyboard deletion of text (e.g. backspace)
placement of the caret within a text object
selection of a passage of a text object
cutting of a selected passage of a text object
pasting of text at the caret location
changing the font of a selected passage of a text object
changing the font of an entire text object
adjustment of the width of text objects
(ii) General:
selection of one or more entire document objects
cut/deletion of selected document objects
placement of the caret at a general location on the canvas
paste of text and non-text document objects at the caret location
translation (moving) of selected document objects
resizing of selected document objects
rotation and scaling of selected document objects The controller manages receipt of mouse and keyboard events whereby the user conducts these operations. Methods for performing the above-mentioned operations are well known in the art and are embodied by many available applications.

Figure 21A:
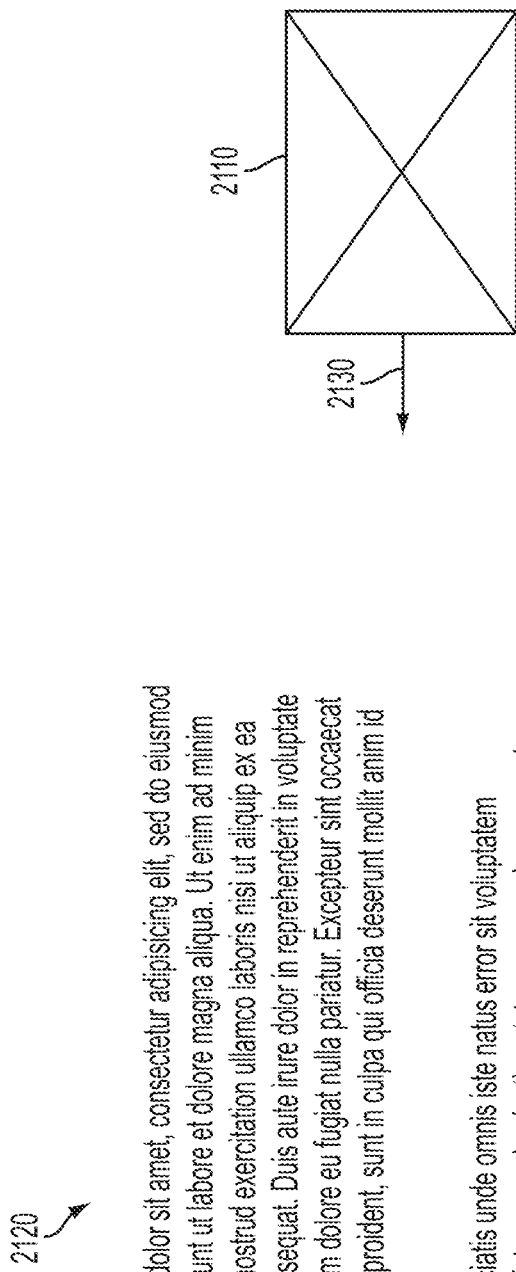
FIGS. 21A to 24B illustrates concepts related to the reflow of text.
Figure 21B:
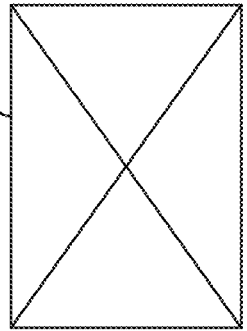

In FIG. 21A, an image object (rectangle with X) 2110 is adjacent to two paragraphs of text 2120. An arrow 2130 indicates a small translational re-positioning of the image object caused by a user action such as a mouse drag. FIG. 21B shows the desirable behavior wherein after the repositioning, the text 2120 has reflowed around the image object 2110.

Figure 22A:
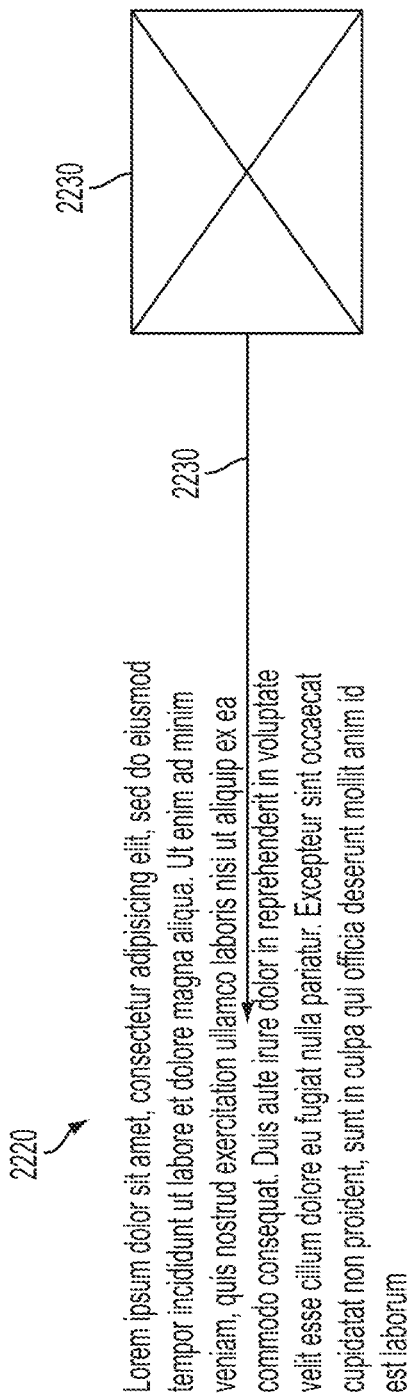
Figure 22B:
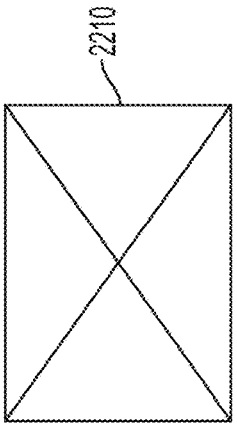

In FIG. 22A, an image object (rectangle with X) 2210 is adjacent to two paragraphs of text 2220. An arrow 2230 indicates a large translational re-positioning of the image object caused by a user action such as a mouse drag. FIG. 22B shows the desirable behavior that after the repositioning, text 2220 has reflowed to create a vertical gap to create space for the image object 2210. Consequently, some text has moved downward.

Figure 23A:
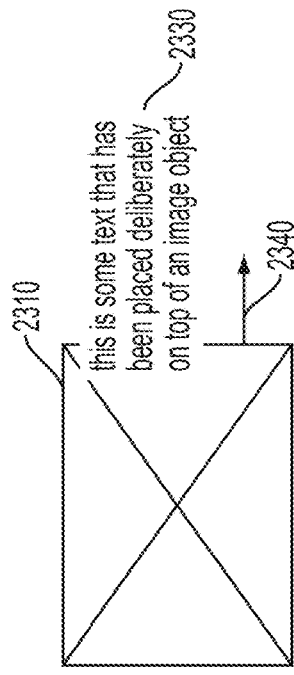

In FIG. 23A, an image object (rectangle with X) 2310 has been placed within a spatial gap amongst paragraphs of text 2320, and a textual annotation 2330 has been placed on top of the image object. An arrow 2340 indicates a small translational re-positioning of the image object 2310 caused by a user action such as a mouse drag. FIG. 23B shows undesirable behavior which would occur if text is always caused to reflow whenever it would otherwise overlap or collide with an image object. The annotation text 2330 has been repositioned below the image object 2310. This is undesirable because it is no longer positioned where the user originally placed it with respect to the image object, and the user's layout intent has been violated.

Figure 24A:
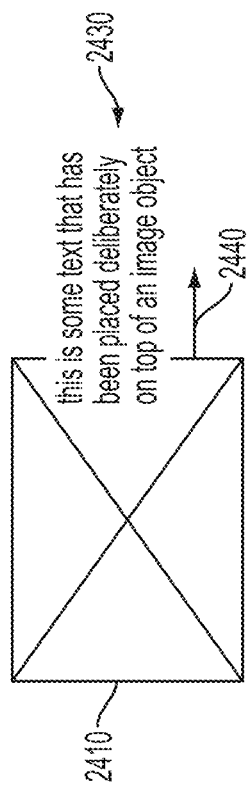
Figure 24B:
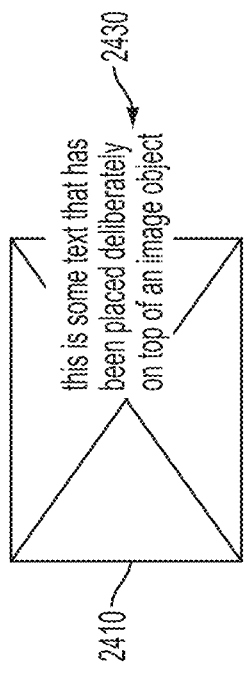

In FIG. 24A, an image object (rectangle with X) 2410 has been placed within a spatial gap amongst paragraphs of text 2420, and a textual annotation 2430 has been placed on top of the image object 2310. An arrow 2440 indicates a small translational re-positioning of the image object caused by a user action such as a mouse drag. FIG. 24B shows desirable behavior. The annotation text 2430 remains in place and has not been automatically repositioned to a more distant location in order to avoid overlap with the image object 2410. The user's layout intent is therefore maintained.

To achieve the desirable behaviors of FIGS. 21A, 21B, 22A, 22B, and 24A, 24B, this application introduces two computational devices.

First, Text Objects are classified into one of two categories:

"Narrative text" which is subject to automatic reflow as in FIGS. 21A, 21B and 22A, 22B; or "Annotative text" which does not automatically reflow, as shown in FIG. 24A, 24B.

The classification of text as narrative or annotative can be done under user control while interacting with a computing device, or automatically. In one embodiment of the present disclosure, a text object is automatically classified as narrative text if its left edge is placed within a predetermined distance from the left edge or margin of the canvas. Otherwise it is classified as annotative text.

Figure 25:
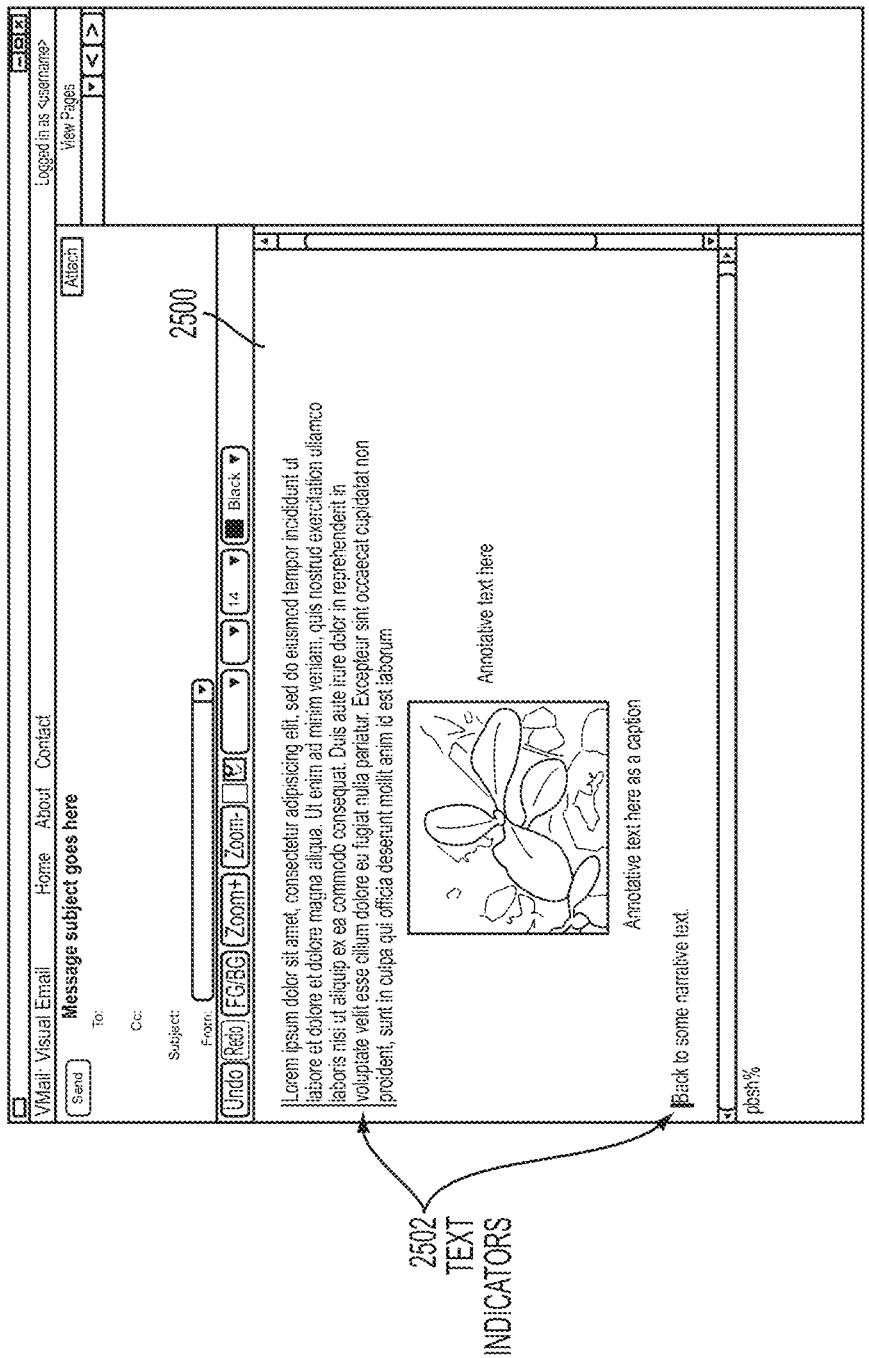
FIG. 25 depicts an identifier related to the text reflow concepts.

In one embodiment of the present disclosure, as shown in FIG. 25, visual indicators 2502 are added to canvas 2500 of an electronic user interface display to aid the user in appreciating the text object's classification. In this embodiment, text indicators 2502 are shown as vertical lines positioned at the left margin alongside the vertical extent of text objects 2504. It is to be understood in other embodiments the visual indicators can take other forms. Further, the visual indicators can be added to identify narrative text, annotative text, or both.

Localized Application of Text Reflow

The reflow system and method being disclosed is concerned with text reflow: namely when and how the controller causes text to reflow, or adjust position on the canvas, in response to various user commands. It is desirable for text to reflow automatically to avoid overlap with figural elements, yet also for text annotations and captions for figural elements to maintain a relatively fixed layout with respect to those elements, and hence not to be subject to reflow. FIGS. 21A-23B illustrates the relevant behavior. We herein disclose a feature known as Localized Application of Text Reflow.

Because of the reflow feature, narrative text objects become taller or shorter, and move up and down, subject to user operations of insertion and deletion of text and figural objects. It is necessary for elements of the document to move in synchrony and maintain correct vertical spacing. The foregoing will be described in more detail in connection with FIG. 26.

In FIG. 26 all document objects 2622, 2624, 2626 maintain an internal parameter called herein: y_space_to_datum 2610, 2630, 2632. The y_space_to_datum parameter indicates the vertical distance to the bottom of the vertically closest narrative paragraph. The bottom vertical location of each paragraph is considered a datum, or reference vertical position, for objects lying below the paragraph. In FIG. 26, two narrative text objects 2614, 2616 are shown. The bottom of each one defines a y_datum 2618, 2620. All document objects maintain a y_space_to_datum value 2610, 2630, 2632 which is the vertical distance to the nearest y_datum 2618, 2620 reference above.

Whenever text is reflowed, document objects adjust their vertical position so as to maintain the distance, y_space_to_datum 2610, 2630, 2632 with respect to the narrative paragraph object 2614, 2616 immediately above it. By this strategy, the various document objects comprising figures are able to maintain their relative vertical positioning and hence maintain the layout intent of the author.

Flow diagrams and illustrations related to the flow diagrams for carrying out the present processes are shown by FIGS. 27-33B.

Figure 27:
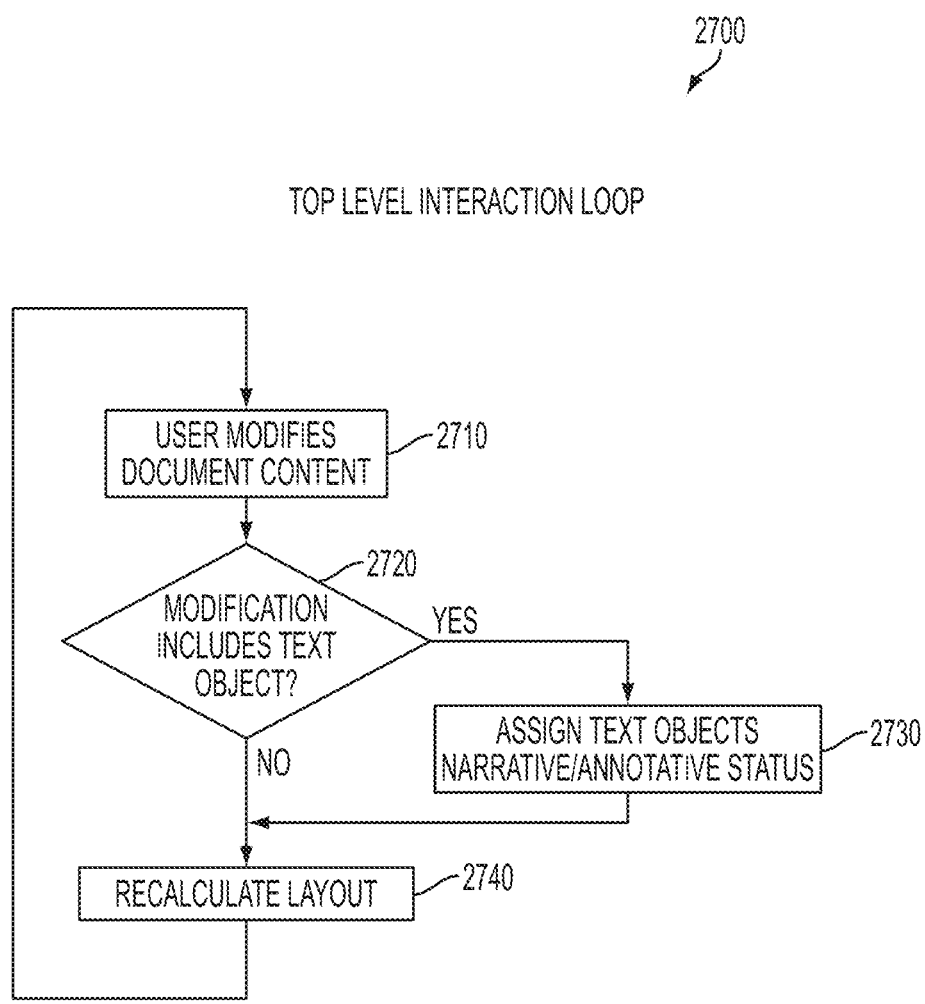
FIG. 27 is a top level interactive loop related to the reflow concepts.

FIG. 27 illustrates a top level interaction loop 2700. In step 2710, (User Modifies Document Content), refers to a user command to modify document content (including but not limited to, typing text, erasing text, pasting text, cutting text, pasting an image object, cutting an image object, translating any document object (e.g., text object, image object), rotating any document object, scaling any document object, changing the layout width of a text object). In addition Step 2710 refers to a command-specific response of the system to carry out the user command, without regard to consequences for document layout.

At Step 2720, it is determined whether one or more document objects acted on (modified) by the user command is a Text Object. If so (i.e., YES), the location and optionally other properties of the Text Object are assessed to assign the text a status of being Narrative Text or else Annotative Text 2730. In one embodiment, the distance of the leftmost edge of the Text Object to the left margin of the canvas is compared with a predetermined threshold, to determine if the text is narrative or annotative (e.g., if meeting the threshold the text is annotative and if outside of the threshold the text is annotative).

At step 2740, a routine, Recalculate Layout, which recalculates the page or document layout, is applied to the document, taking into account a status of the modified text object as being one of a narrative text object or an annotative text object. Thereafter, control returns to step 2710, where additional user commands are received.

If at step 2720 it is determined the modification does not include a text object (i.e., NO) the process moves directly to the Recalculate Layout routine of step 2740, and thereafter control returns to step 2710.

Figure 28:
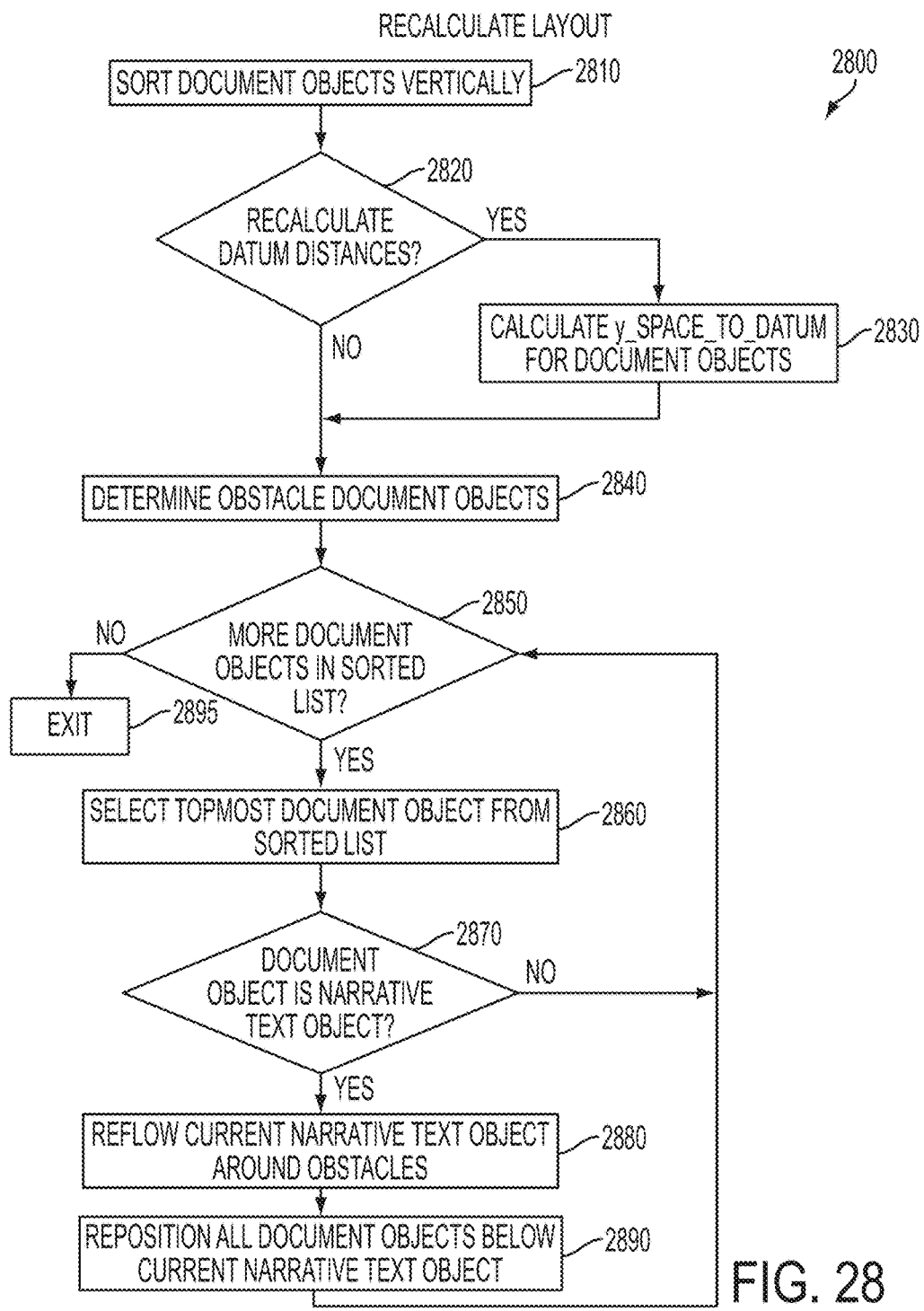
FIG. 28 is a recalculate layout routine related to the text reflow concepts.

FIG. 28 describes the Recalculate Layout routine 2800 in more detail.

At step 2810 document objects are sorted in a list ordered by vertical position of the top of the object's bounding box. The topmost or highest object in the document is placed first in the list, and bottommost object is last (where the top of a document and the bottom of a document is used here as is commonly understood). At step 2820 it is determined whether to recalculate datum distances of document objects. Under most user operations datum locations are re-assigned, but under some operations they are not. For example, under a cut or paste operation, some embodiments may determine not to reassign datum locations. In this way, in accordance with the subsequent steps, in particular (reposition all document objects below current narrative text object), objects will be repositioned to fill or expand vertical spacing for the cut or pasted document objects.

If it is determined to recalculate datum distances (YES), then at step 2830 the document objects assign their internal parameter (i.e., y_space_to_datum; and as shown in FIG. 26).

At step 2840 a list of "obstacle" document objects is created. This list is transient and exists only for the remaining duration of the Recalculate Layout routine. The obstacle list contains objects that narrative text type Text Objects must flow around. Each document object that is of type Image Object or Annotative Text is added to the obstacle list.

At steps 2850 and 2860, document objects are considered sequentially, from top to bottom as they were vertically sorted at step 2810, until no more document objects are in the sorted list and the routine is exited at step 2895. In step 2870 a determination is made if the document object is a narrative text object, such that only Narrative Text Objects are considered at step 2880. At step 2880, the Narrative Text Object is reflowed around obstacles in the obstacle list, according to a routine identified as: Reflow Narrative Text Object (e.g., see FIG. 29). The result of this reflow operation may cause the narrative text object to grow or shrink in height.

Therefore, at step 2890, all objects falling below the current narrative text object are adjusted in vertical position to maintain their distance, y-space-to-datum, with respect to a reference vertical position. In this embodiment, we define and assign the reference vertical position, for each object falling below the current narrative text object, to be the bottom text line of the closest narrative text object above itself (e.g. see FIG. 26, reference vertical position shown as y-datum 2618 in the figure).

By this means, when reflow takes place with regard to document objects acted upon (modified) by the user, certain obstacle document objects will have narrative text reflow around them, while obstacle document objects lower on the page will be translated vertically in synchrony with the surrounding narrative text.

In another embodiment, this same goal is achieved with the use of a single narrative text object containing all narrative text in the document. In this case, reflow of the narrative text object occurs with respect to the document objects acted upon (modified) by the user, as described above. But at some vertical location in the document, a reference vertical position is established and assigned to all document objects falling below this location. Typically, this reference vertical position occurs at a paragraph break, but it can be set at the vertical location of any text line below the document objects being acted upon whose character content does not change due to reflow of the narrative text object around the obstacle document objects.

Automatic Determination of Vertical Jumps

Figure 29:
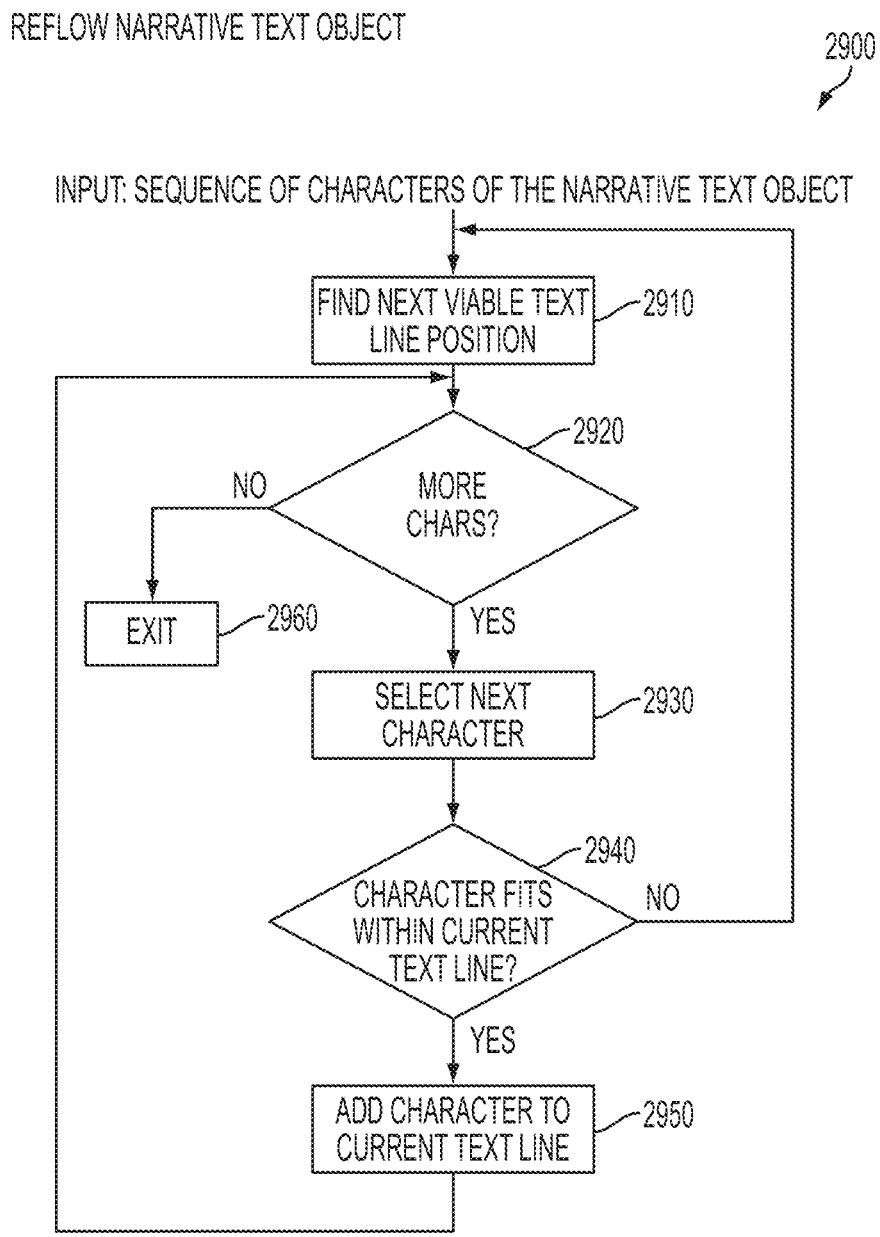
FIG. 29 is a reflow narrative text object routine.

Turning to FIG. 29 the routine: Reflow Narrative Text Object 2900 is set forth. The purpose of this routine is to place the characters comprising a text object into a sequence of text lines so as to avoid overlap with obstacles. The input to the routine is the sequence of characters of the narrative text object. Normally the characters will be organized as a sequence of words separated by spaces.

It is desirable that, under some conditions, narrative text flow around graphical objects such that text lines are of shortened width placed in horizontal juxtaposition to graphical objects, yet under other conditions, successive text lines maintain full width and jump vertically to create a full-width gap to make room for one or more graphical objects. For example, often a small image is placed toward the left side or right side margin of text, in which case the text would be intended to flow around the figure. While in another case a figure is positioned near the centerline of the text, in which case the intent is to have the text jump to below the figure's location. Further, it is desirable for a user to achieve these effects without having to manually set a reflow mode in the interface. To accommodate this user intent, we herein disclose a feature known as Automatic Determination of Vertical Jumps.

At step 2910, the routine, Find Next Viable Text Line Position is called. This routine examines the target location of the first (and on subsequent calls, subsequent) text line(s). A viable text line position is defined in some embodiments as a bounding box or rectangle that does not overlap any obstacles and that meets predetermined minimum width and centering conditions, as described below. At this step, a location for the current text line is established.

At steps 2920 and 2930, characters are considered sequentially to build the textual content of the current text line. At step 2940, it is determined if, by adding the current character, the text line's width would fall within or outside the limits of the current line's bounding box as determined at step 2910. If by the addition the character does not extend outside the bounding box, then the character is added step 2950 and control proceeds from step 2950 to step 2920 where the next character is considered. If the addition of the character would cause the text line to extend outside the bounding box, then control proceeds from step 2940 to step 2910 where a bounding box is found for the next text line in the sequence. If at step 2920 all characters have been considered, then processing exits at step 2960.

It is to be understood that alternative versions of the Reflow Narrative Text Object may also be implemented. Specifically, groups of characters comprising words will be considered at step 2940. If any part of the word would fall outside the bounding box of the current text line, then a new next line is started.

Figure 30A:
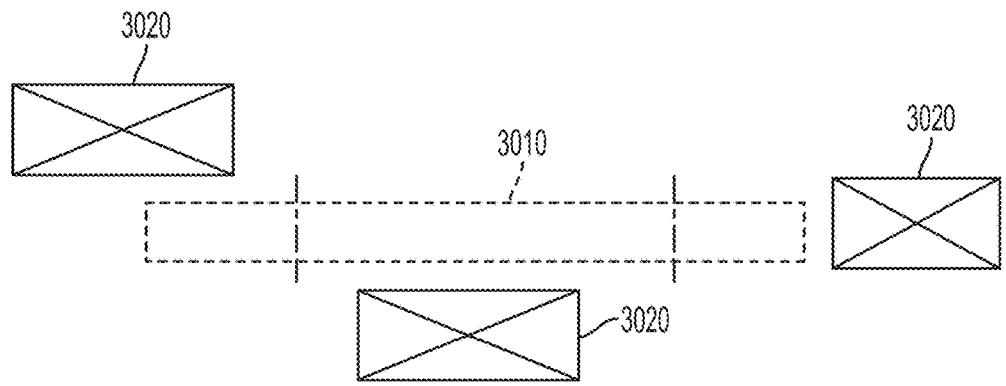
FIGS. 30A to 33B illustrates text reflow concepts.
Figure 30B:
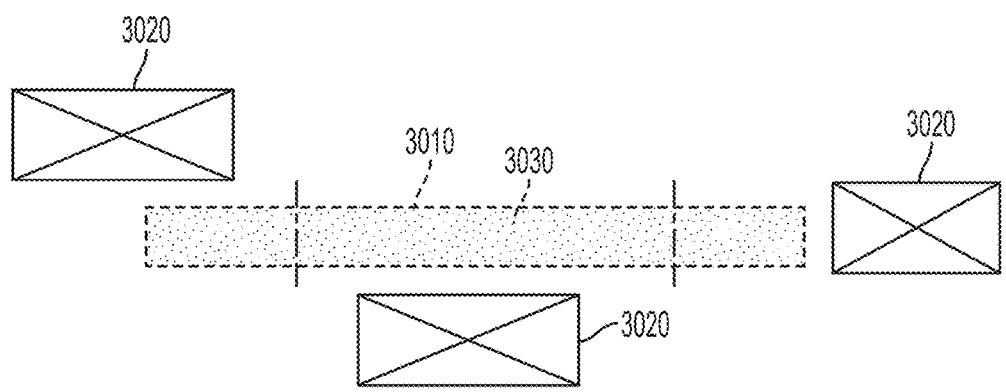

FIGS. 30A-33B illustrate the concept of step 2910 of FIG. 29 (i.e., "Find Next Viable Text Line Position") in more detail. In FIGS. 30A, 30B a target text line position, as illustrated by bounding box 3010, is determined by the target location of the Text Object on the canvas of the electronic display. The target horizontal location is determined by a user's placement of the Text Object, and its target vertical location is determined by the y_space_to_datum parameter in conjunction with the bottom location of the next narrative text object above. (If there is no narrative text object above, then the top of the canvas serves as the topmost datum.)

Obstacle document objects (obstacles) 3020 may have been placed by previous user actions in locations that intersect bounding box 3010 (representing the target text line position and width). In FIG. 30A, however, it is apparent that the obstacles 3020 do not intersect the placement of the bounding box 3010, and in FIGS. 30A, 30B the next viable text line position 3030 (stippled region) is determined to be in congruence with the target text line position.

FIGS. 31A-33B however shows ways that the next viable text line position must be set to avoid obstacles.

Figure 31A:
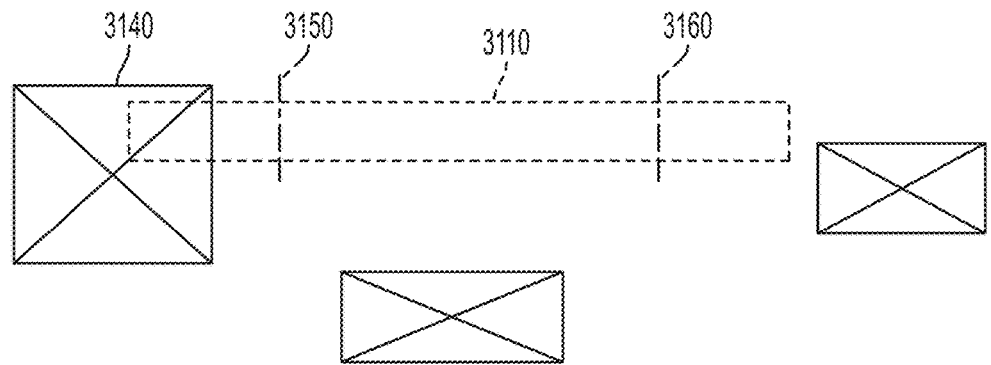

FIG. 31A shows that an obstacle 3140 intersects the bounding box 3110 representing the target text line position. The intersection falls outside the bounds of the inner region of the target text line position shown by lines 3150 and 3160.

Therefore, the viable text line position represented by bounding box 3110 may be established at this vertical location, but inset from the left margin. This is shown in FIG. 31B, where a predefined inset distance 3170 from the obstacle 3140 establishes the leftmost side 3180 of the next viable text line (stippled) position 3130.

Figure 31B:
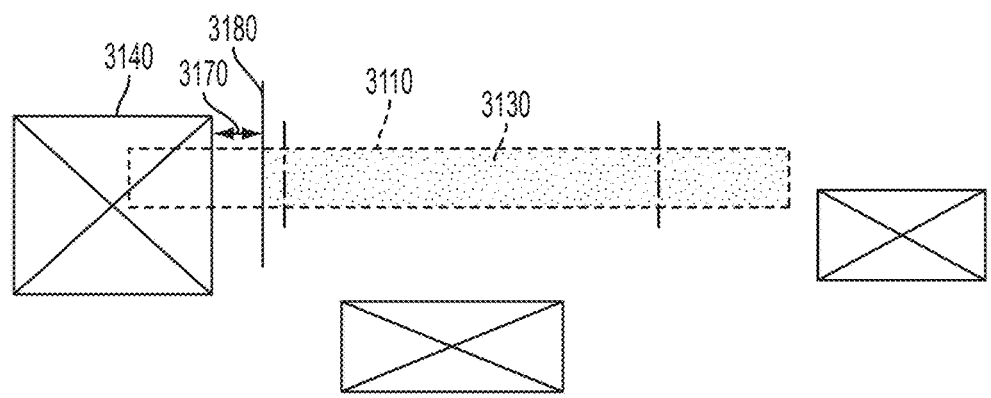
Figure 32A:
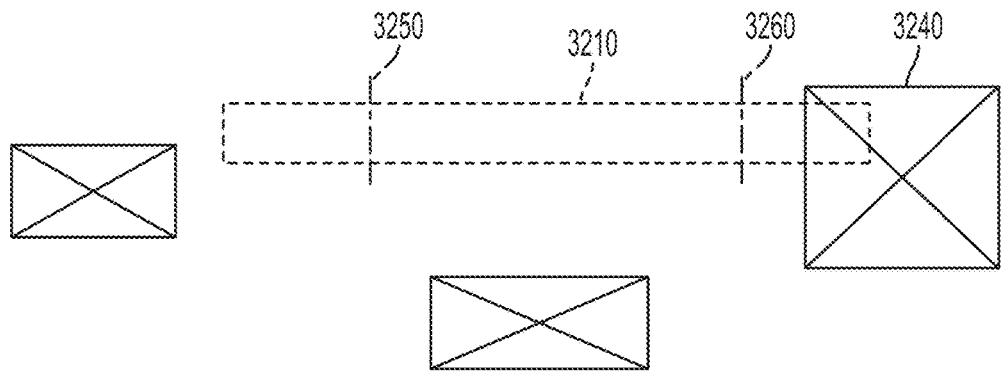
Figure 32B:
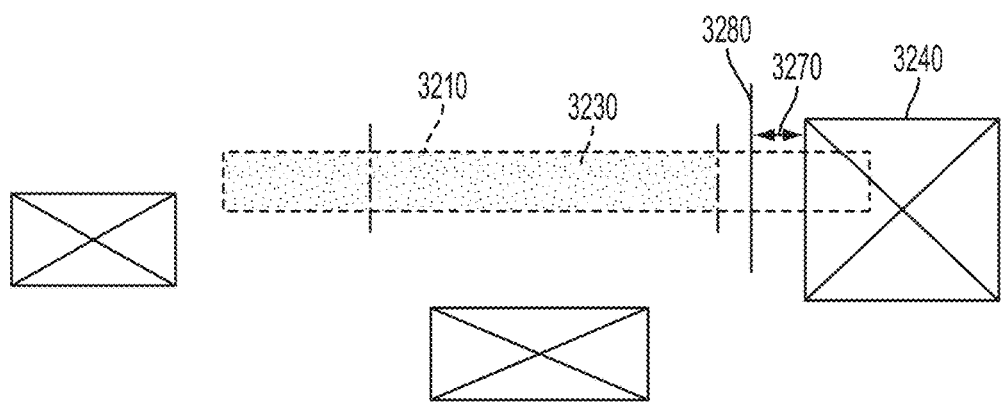

FIGS. 32A, 32B shows the mirror image situation of FIGS. 31A, 31B, whereby an obstacle 3240 encroaches on a target text line position, represented by bounding box 3210 but not within an allowable inner bounds 3250, 3260. In this case, the inset distance 3270 from the obstacle 3240 establishes the rightmost side 3280 of the next viable line bounding box. The next viable text line (stippled) position 3230.

FIGS. 33A, 33B show how the next viable line is determined when an obstacle falls within the inner bounds 3050, 3060 of the target text line position, represented by bounding box 3310. The target text line position must be sequentially move downward by one line height until no obstacle overlaps the inner bounds. In this example, first, target text line position 3370 is examined. This still suffers from occlusion by the obstacle 3340. Next target text line position 3380 is examined. This does not entail any occlusion, so target text line (stippled region) position 3330 is accepted and returned.

By this arrangement, the user is able to achieve two kinds of reflow automatically without having to specify manually or a priori which one they intend. One kind of reflow has narrative text wrap around obstacle document objects such that narrative text and obstacle document objects are horizontally juxtaposed. The other kind of reflow creates full-width gaps in the placement of narrative text, with obstacle document objects inserted between. The determination of which kind of reflow will take place is made by virtue of the user's positioning of obstacle document objects (i.e. image objects, graphic objects, annotative text). When the obstacle is placed nearer the right or left margin of a paragraph of narrative text, wrap-around reflow occurs. When the obstacle is placed nearer the vertical centerline of the paragraph narrative text, reflow automatically switches to creating a full-width gap.

Unified Digital Ink Input/Selection User Interface an Enhanced Inferred Mode Protocol The VMail application provides a user with a system and method to compose a mixed-content message which will in general include multiple types of operations, and which may be accomplished via a keyboard, a mouse, a stylus/pen, a finger, and/or a voice input system.

Among the operations are:
input of typed text
input of hand-drawn text
input of hand-drawn figures and sketches
input of hand drawn graphical markup
input of structured graphics
selection of passages of typed text
selection of entire paragraphs of typed text
selection of images, graphics, and digital ink
repositioning (translation), resizing, rotation of one or more selected objects Most of these operations can be accomplished with a pointing device or pointer, i.e. a computer mouse, touchpad, electronic pen, stylus, or finger on the touchscreen of a tablet computer. A problem arises in that the same primitive operations of pressing/touching, dragging the pointer across the screen, and releasing/raising, must be interpreted in different ways at different times in order to execute the detailed commands of each task operation.

The prevailing method for handling this problem is to introduce user interface modes. Typically, a menu item selection or button on a toolbar is used to place the system into an operation-specific mode. For example, when in DRAW mode, pressing/touching and dragging the pointing device will cause a stroke of digital ink to be placed on the canvas. When in REGION SELECT mode, the identical gesture of pressing/touching and dragging the pointing device will define a rectangular region, and objects within the region will become selected. When in LASSO SELECT mode, the same identical gesture of pressing/touching and dragging the pointing device will define a freeform-boundary region, and objects within the region will become selected.

There are at least three disadvantages of multiple mode or modal user interfaces. First, they require an extra step for users. Second, users have to remember to enter the correct mode before performing an operation, and this incurs distraction and cognitive load. Third, when users forget to enter the intended mode, their pointer actions end up performing undesired actions that disrupt the workflow and must be un-done or otherwise corrected. Further discussion of this topic can be found in, Eric Saund and Edward Lank, "Minimizing Modes for Smart Selection in Sketching/Drawing Interfaces" in J. Jorge and F. Samavati, eds., Sketch-based Interfaces and Modeling, Springer, 2011, pp. 55-80.

Previous work has shown that certain user interface design features can alleviate many of these difficulties. One such method, called Overloaded Loop Selection, is taught in U.S. Pat. No. 7,086,013, "Method and system for overloading loop selection commands in a system for selecting and arranging visible material in document images." Under this method, either a rectangular selection region or a lasso (closed or nearly closed path) selection region can be entered without the user having to specify a priori which they intend to use. The method works by analyzing the shape of the gesture path. Aspects of these concepts have, for example, been previously discussed in connection with FIG. 17.

Another such method, called the Inferred Mode Protocol, is taught in U.S. Pat. No. 7,036,077, "Method for gestural interpretation in a system for selecting and arranging visible material in document images." Under this method, either a digital ink stroke or a selection lasso may be drawn by a pen/stylus gesture, without the user having to take steps to cause the system to enter a user interface mode in advance to indicate which they intend to do. Instead, after completion of the gesture, the system conducts processing steps to consider the existence of selected objects and the geometric properties of the gesture in relation to objects on the canvas. If these factors indicate that the user's intent is unambiguous, then that action is taken. If the user's intent to draw ink versus select objects is ambiguous, then a pop-up Choice button is presented which the user may elect to press or not. If they press the button, the canvas content enclosed by the gesture is selected. Otherwise, the gesture is converted to a digital ink object which is added to the canvas. Aspects of these concepts have, for example, previously been discussed in connection with FIG. 19.

It is desired to enhance the user interface design so as to further increase the ability of the user to perform a variety of operations without prior specification of a user interface mode. Furthermore, it is desirable for the same user interface actions to apply uniformly across pointer device types. In particular, the Overloaded Loop Selection method is favored for mouse-pointer and touchpad-pointer devices (desktop and laptop computers), while the Inferred Mode Protocol is favored for pen/stylus/finger pointer devices (mobile phones and tablets).

The following discloses an Enhanced Inferred Mode Protocol that enables the input of digital ink, selection rectangle, or selection lasso, without prior specification of mode, on a mouse-pointer device, an electronic pen/stylus-pointer device, or other appropriate pointer device. The Enhanced Inferred Mode Protocol relies on improved methods for inferring user intent, and expansion of a post-action user Choice button. It is understood the enhanced inferred mode protocol is applicable to environments beyond the present VMail implementation such as other electronic document generating and editing environments.

The disclosure of the Enhanced Inferred Mode Protocol is presented in concert with FIGS. 35-39. The computer program that implements the method has entry points corresponding to mouse/touchscreen (or other appropriate command entry device) events, including PRESS (or TOUCH), DRAG, RELEASE, and MOVE.

Figure 35:
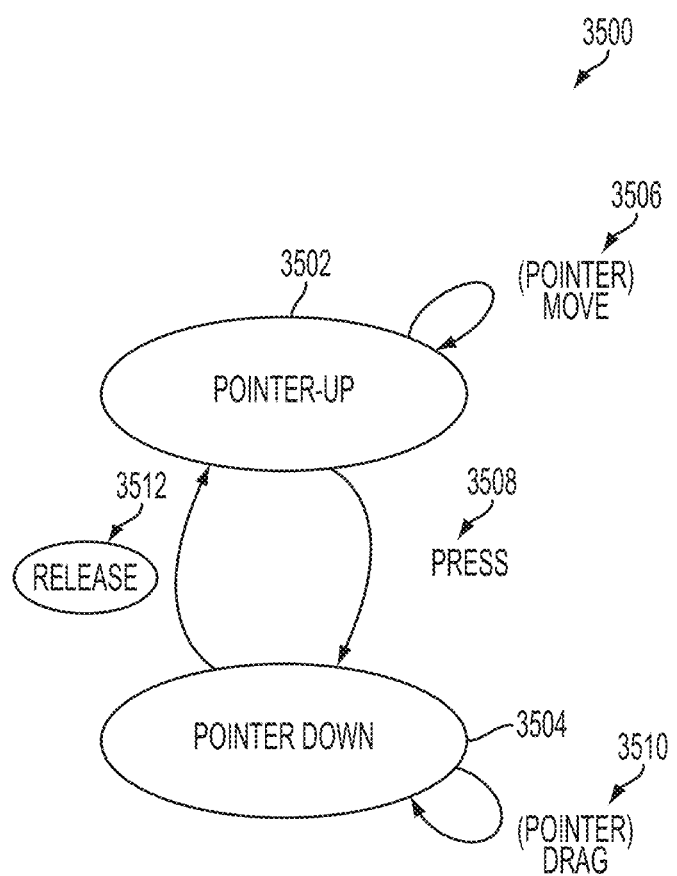
FIG. 35 is a high level state diagram.

As shown by illustration 3500 of FIG. 35, common to similar user interfaces, operating system software enables a low-level state machine that cycles between a POINTER-UP state 3502 and POINTER-DOWN state 3504. In POINTER-UP state 3502, pointer events indicating movement of the pointer may be detected and transmitted by the operating system in the form of MOVE events 3506. Also, in POINTER-UP state, the pointer may be pressed (mouse press or pen/stylus/finger touch), triggering a PRESS event 3508, in which case the system enters POINTER-DOWN state 3504. In POINTER-DOWN state 3504, the pointer may be moved, which triggers DRAG events 3510 but leaves the system in POINTER-DOWN state 3504. Or the pointer may be lifted (stylus, pen, finger) or released (i.e.

mouse), triggering a RELEASE event 3512 and transition to the POINTER-UP state. The Enhanced Inferred Mode Protocol amplifies the task level consequences of these primitive events by taking into account additional information.

Figure 36:
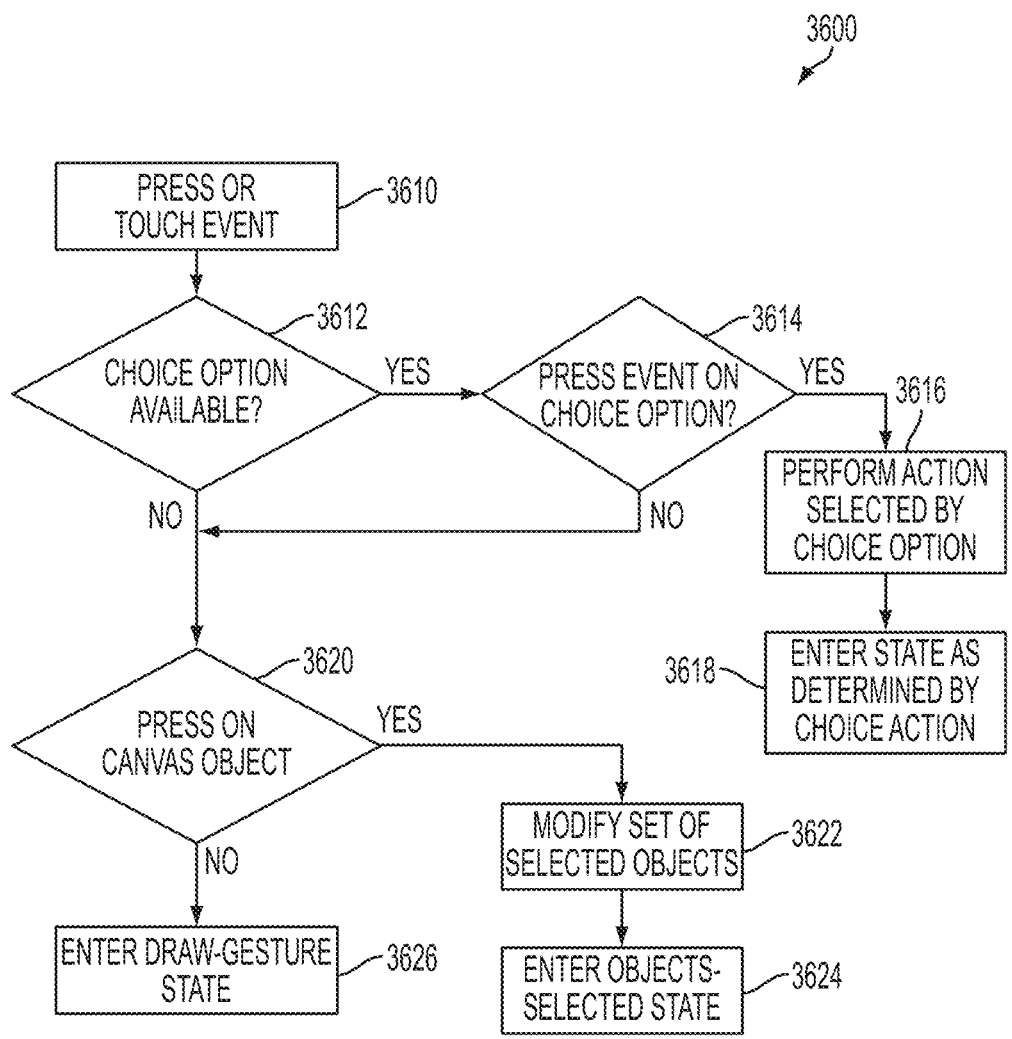
FIG. 36 is a press event routine.

Considering flow diagram 3600 of FIG. 36, when in POINTER-UP state and a PRESS (or TOUCH) event 3610 has been received, the system determines whether a Choice option 3612 has been presented to the user. If YES, and the location of the PRESS event occurs at one of the Choice option locations (for example, on a popup context menu button) 3614, then the action indicated by the selected choice option is performed 3616, and the process enters a state of operation as determined by the chosen action 3618. The actions may include but are not limited to, interpreting the just-completed stroke (drag gesture) as digital ink, interpreting the just-completed stroke (drag gesture) as a lasso selection region, interpreting the just-completed stroke (drag gesture) as a rectangle drag selection region.

If the location of the PRESS event is not on a Choice option location (NO) 3614, then the location of the press event is considered in relation to objects on the canvas of the electronic display 3620.

If the PRESS event is over a selectable object (or set of objects) (YES) 3620, then the selected object and/or sets of objects may be modified 3622, i.e., object(s) may be caused to be selected, to be deselected, or to cause other objects to become selected or deselected according to group membership, as described in U.S. Pat. No. 6,903,751, "System and method for editing electronic images." Accordingly, the system may enter an OBJECTS-SELECTED state 3624.

If the PRESS event is not over a selectable object (NO) 3620, then the system enters a DRAW-GESTURE state 36.

Figure 37:
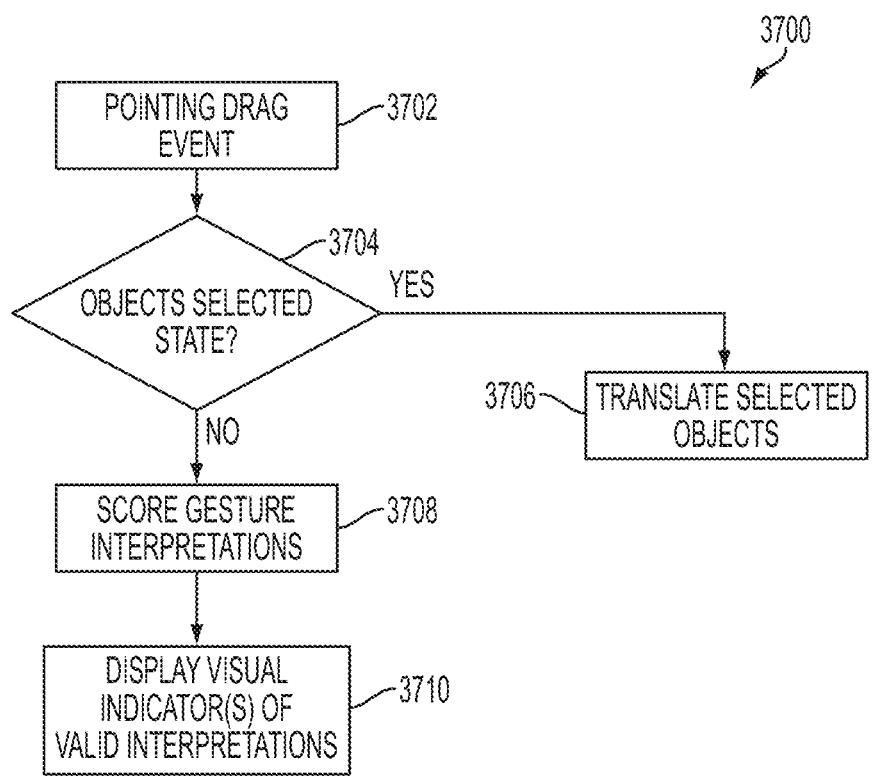
FIG. 37 is a pointer drag event routine.

Turning attention to flow diagram 3700 of FIG. 37, and where the pointer is in a POINTER-DOWN state, a DRAG event 3702 is processed according to the steps of the flow diagram 3700.

If the system is in an OBJECTS-SELECTED state (YES) 3704, then the drag event causes selected objects to be translated (i.e., moved) across the canvas 3706.

If the system is in DRAW-GESTURE state (i.e., objects have not been selected), NO at step 3704, then steps are taken to ascertain user intent. The characteristics of the drag gesture are considered in relation to other objects on the canvas, i.e., score gesture interpretations 3708 are undertaken. In particular, in one embodiment, a score or probability is assigned to each of three cases, whether the gesture (thus far) is likely in user intent to be a rectangle selection, a lasso selection, or entry of digital ink. Multiple factors known in the art can be used to assess likelihood of user intent, including length of the gesture, wiggliness of the gesture (calculated for example by sum square curvature), aspect ratio of the gesture, whether the gesture encloses any objects on the canvas, expected size of hand-drawn text on the canvas. These factors are, in at least one embodiment, combined in a machine learning classifier trained by training samples, as is well established in the art. Please refer to Rubine, D. (1991) Specifying gestures by example, Proc. SIGGRAPH 1991, New York: ACM Press, 329-337.

For each of the gesture interpretation possibilities, (rectangle select, lasso select, digital ink), if the assigned score is above or otherwise meets a predetermined threshold, then a visual indicator of that intent is presented on the electronic display 3710.

Figure 38:
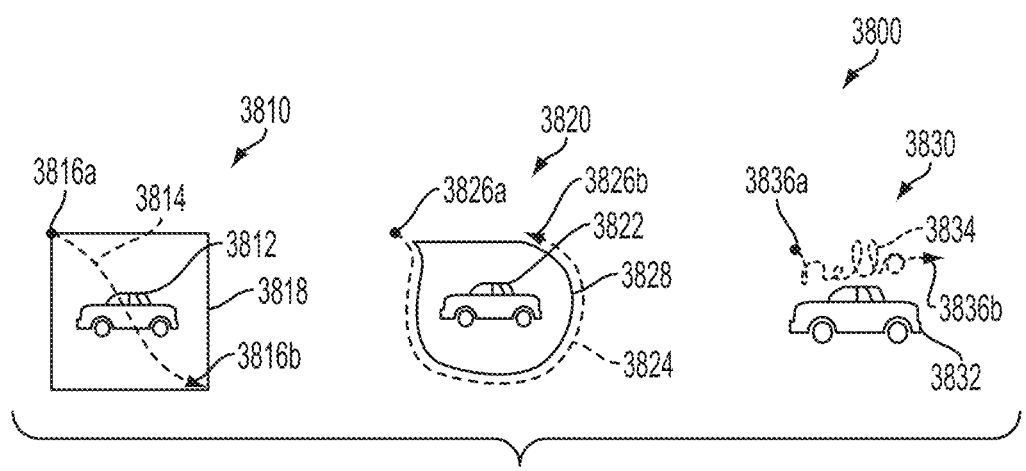
FIG. 38 illustrate various selection interpretations.

FIG. 38, provides an image 3800 illustrating such gesture interpretations (e.g., see 3810, 3820, and 3830). For example gesture interpretation example 3810, shows a drawing of a car 3812, where drawn (dotted) line 3814, from a start point 3816a to an end point 3816b, defines a valid rectangle selection interpretation (solid line) 3818, enclosing car 3812. Gesture interpretation example 3820, depicts a drawing of a car 3822, around which a valid lasso gesture (drawn dotted line—a partially closed gesture) 3824 is depicted, having a start point 3826a and an endpoint 3826b. A solid line 3828 is shown defining the fully enclosed region around the car 3822, in accordance with the partially closed lasso gesture. Gesture interpretation example 3800, depicts a drawing of a car 3832, above which is a valid digital ink (dotted line) gesture 3834, having a start point 3836a and an end point 3836b. These interpretations are re-evaluated at each DRAG event and the visual indicators adjusted accordingly, so the user can know what to expect when the mouse button is released or the pen, stylus, finger, or other pointer device is lifted from the canvas or otherwise released.

Figure 39:
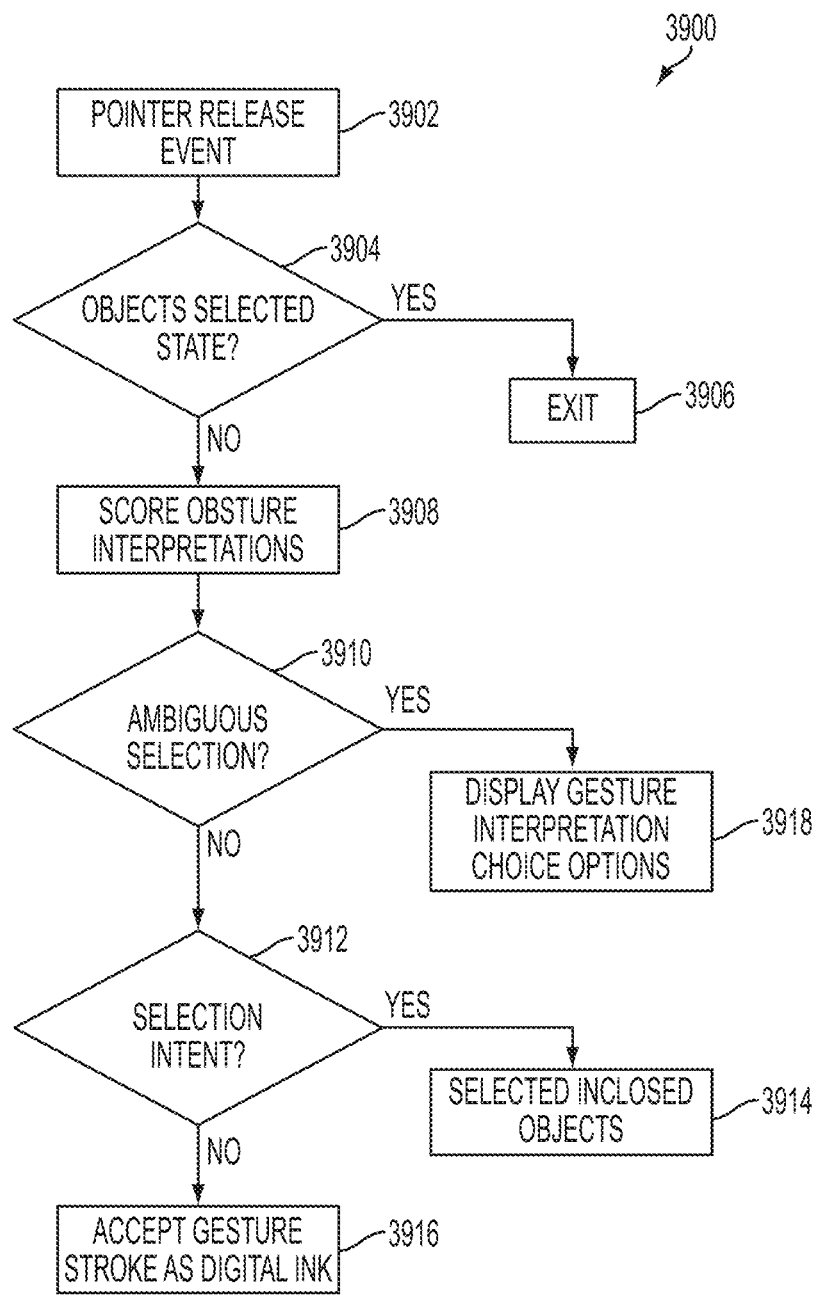
FIG. 39 is a pointer release routine.

Considering flow diagram 3900 of FIG. 39, a Pointer RELEASE Event 3902 is processed in a manner initially similar to a DRAG event. The completed gesture stroke is evaluated in relation to objects on the canvas 3904 of the electronic display. If the process is in a state of the selected objects (YES) 3904, then the process is exited 3906. If the process is not in a state of the selected objects (NO) 3904, the process moves to a score gesture interpretation step 3908. In this step scores are assigned to identify the likelihood the user intent is that the gesture is rectangle selection, lasso selection, or a drawing of visual ink. Based on these scores, an ambiguity test is undertaken 3910. If the best scoring candidate under an ambiguity test (NO—i.e., no ambiguity) 3910 out-scores other candidates by a predetermined threshold amount, then the process moves to step 3912. At step 39812, it is determined whether the gesture that has the unambiguous intent is a selection operation or not. If YES, then the enclosed objects are selected at 3914. If not (NO), then the gesture stroke is accepted as a digital ink object at 3916.

If however, the ambiguity test is not conclusive (YES) 3910, then, a post-gesture Choice option is presented to the user 3918 so that the user may unambiguously indicate their intent. By default, one of the options will be chosen if the user presses the pointer in the background.

In this manner, a user interface protocol is made available that is common to mouse, touchpad, pen, stylus, and finger, or other pointer interface devices, that enables semi-automatic disambiguation of rectangle selection, lasso selection, and digital ink entry operations without prior selection of mode.

In another embodiment of the present application, upon the RELEASE event and determination of ambiguous user intent for the just-completed gesture stroke, the candidate selection is shown with a background highlight region along with the candidate digital ink stroke.

Subsequently, if at Step 3610 (of FIG. 36), the user presses in a highlighted background region, the selection is accepted and selected object translation is enabled by virtue of entering the Objects Selected state as at step 3914. Alternatively, if at Step 3610 (of FIG. 36) the user presses elsewhere on the canvas, a digital ink stroke is created and placed on the canvas corresponding to the just-completed gesture stroke.

Figure 40:
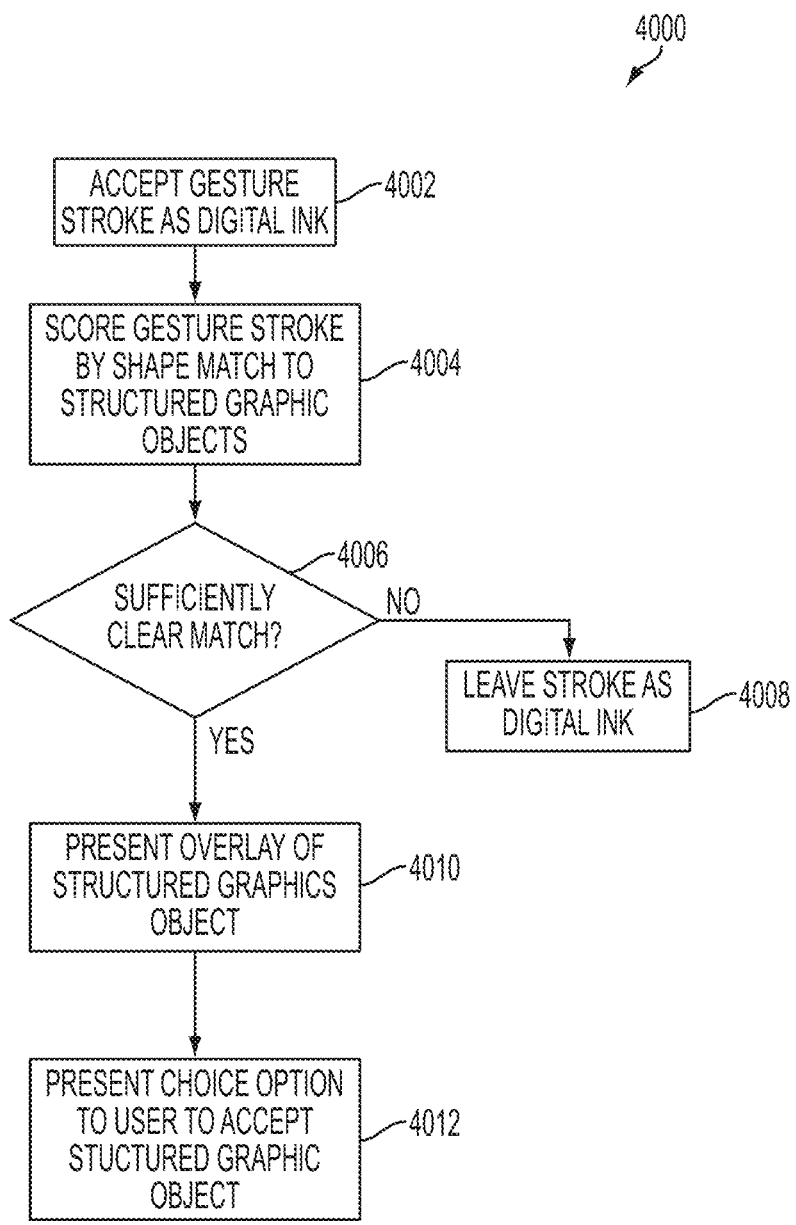
FIG. 40 is structured graphic objects routine.

As a further embodiment of the present disclosure, FIG. 40 presents a method for semi-automated entry of structured graphic objects 4000.

More specifically, after a digital ink entry is accepted 4002 (e.g., or step 3916 of FIG. 39), the gesture stroke is further evaluated (e.g., scored) to determine whether the stroke matches a shape model for one of a predetermined class of graphic objects 4004. These shapes may include but are not limited to, Rectangle, Square, Circle, Ellipse, Diamond, Arrow. Techniques for scoring matches of digital ink strokes according to such categories are known in the art. If the score for any graphic object category does not meet a predetermined threshold (i.e., clear match) (NO) 4006, then the stroke is kept as digital ink 4008. If the score meets a predetermined threshold (YES) 4006, then an overlay image of the structured graphic object is presented on the electronic display 4010, and a Choice option 4012 is presented to the user. If the user selects to confirm the choice option, then the digital ink stroke is replaced by the structured graphic object. The choice is selected or discarded at a PRESS event at Step 3610 (of FIG. 36).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of authoring an electronic document displayed on an electronic display, the electronic document having content including document objects, the document objects including at least text objects and graphical objects, the text objects including at least one of narrative text objects or annotative text objects, and the graphical objects including at least one of image objects, structured graphics, digital ink, and hyperlinks, the method comprising:
    modifying the content of the electronic document;
    automatically assigning a status of narrative text objects to at least one of the text objects at a time of input, wherein the narrative text objects are subject to automatic reflow, and wherein a text object of the text objects is automatically classified as a narrative text object when a left edge of the text object is placed within a predetermined distance from a left edge of a canvas of the electronic display;
    automatically assigning a status of annotative text objects to at least one of the text objects at a time of input, wherein the annotative text objects remain in place relative to local coordinate systems, where the local coordinate systems of graphical objects can be translated with respect to a global system of the entire document, and wherein a text object of the text objects is automatically classified as an annotative text object when a left edge of the text object is not placed within the predetermined distance from the left edge of the canvas of the electronic display;
    performing a recalculate layout routine to recalculate a layout of the electronic document in consideration of the status assigned to the text objects;
    applying an automatic hybrid reflow process; and
    reflowing at least one of the text objects of the electronic document in accordance with the applied automatic hybrid reflow process, wherein the applied automatic hybrid reflow process acts to position the text objects and the graphical objects in the electronic document, wherein the method is implemented using an electronic computing device.

2. The method according to claim 1 wherein the at least one text object that is reflowed is assigned the status of a narrative text object.

3. The method according to claim 1 further comprising:
    providing distinct treatment between the narrative text objects and the annotative text objects.

4. The method according to claim 1 wherein the performing of the recalculate layout routine further comprises:
    sorting the document objects according to positions that the document objects are located within the electronic document; and
    creating a list of obstacle document objects, wherein the obstacle document objects include at least one of the image objects and the annotative text objects.

5. The method according to claim 1 wherein at least one of the narrative text object and the annotative text object is identified on the electronic display by at least one visual indicator.

6. The method according to claim 1 wherein the automatic hybrid reflow process further comprises:
    performing a localized application of the text reflow.

7. The method according to claim 6 wherein the localized application of text reflow comprises:
    assigning a reference vertical position to document objects; and
    performing a recalculate layout routine, wherein placement of the document objects are recalculated in consideration of the reference vertical position.

8. The method according to claim 7 wherein the placement of the document objects includes translating the document objects in synchrony with surrounding narrative text objects.

9. The method according to claim 7 wherein the reference vertical position is established in reference to a narrative text object falling above the document object.

10. The method according to claim 7 wherein the reference vertical position is established in reference to a text line.

11. The method according to claim 10 wherein the reference text line is assigned to all document objects falling below the reference text line location.

12. The method according to claim 10 further including adjusting the document objects that fall below the reference text line of the reflowed narrative text objects, wherein the adjusting maintains a determined vertical distance of the document objects with respect to the reference text line.

13. The method according to claim 1, wherein the reflowing causes the at least one narrative text object to grow or shrink in height.

14. The method according to claim 1 wherein the applying of the automatic hybrid reflow process further includes:
    performing automatic determination of vertical jumps.

15. The method according to claim 14 wherein the performing automatic determination of vertical jumps comprises:
    applying a reflow narrative text object routine to the electronic document.

16. The method according to claim 15, wherein the applying of the reflow narrative object routine comprises:
    finding a viable text line position to establish a location for a current text line; and building textual content of the current text line.

17. The method according to claim 16 wherein the finding of the viable text line position comprises:
    determining the limits of the viable text line position in the presence of obstacle document objects;
    determining if, by adding at least one current character, a width of the current text line would fall within or outside limits of the viable text line position;

adding the at least one current character when it is determined the at least one current character does not extend outside the limits of the viable text line position; and finding a next viable text line position for a next text line, when the at least one next character causes the current text line to extend outside the viable text line position.

18. The method according to claim 17 wherein the at least one current character is a group of characters that comprise a word.

19. The method according to claim 17 wherein the finding of the next viable text line, includes determining locations of at least one of the obstacle document objects.

20. The method according to claim 1 wherein the reflowed electronic document is at least part of an electronic message composed by:

selecting and transferring content from a referenced document external of a message composition region to the message composition region for use in composing the electronic message, wherein the selecting and transferring are performed were a single view is presented to a user.

21. A system configured to author an electronic document displayed on an electronic display, the electronic document having content including document objects, the document objects including at least text objects and graphical objects, the text objects including at least one of narrative text objects or annotative text objects, and the graphical objects including at least one of image objects, structured graphics, digital ink, and hyperlinks, the system comprising:

an electronic computing device, programmed to:

modify the content of the electronic document;

automatically assign a status of narrative text objects to at least one of the text objects at a time of input, wherein the narrative text objects are subject to automatic reflow, and wherein a text object of the text objects is automatically classified as a narrative text object when a left edge of the text object is placed within a predetermined distance from a left edge of a canvas of the electronic display;

automatically assign a status of annotative text objects to at least one of the text objects at a time of input, wherein the annotative text objects remains in place relative to local coordinate systems, where the local coordinate systems of graphical objects can be translated with respect to a global system of the entire document, and wherein a text object of the text objects is automatically classified as an annotative text object when a left edge of the text object is not placed within the predetermined distance from the left edge of the canvas of the electronic display;

perform a recalculate layout routine to recalculate a layout of the electronic document in consideration of the status assigned to the text objects;

apply an automatic hybrid reflow process; and reflow at least one of the text objects of the electronic document in accordance with the applied automatic hybrid reflow process, wherein the applied automatic hybrid reflow process acts to position the text objects and the graphical objects on the electronic document.

22. The system according to claim 21 wherein the at least one text object that is reflowed is assigned the status of a narrative text object.

23. The system according to claim 21 wherein the electronic computing device, is further programmed to:

provide distinct treatment between the narrative text objects and the annotative text objects.

24. The system to claim 21 wherein the recalculate layout routine is further configured to:

sort the document objects according to positions that the document objects are located within the electronic document; and create a list of obstacle document objects, wherein the obstacle document objects include at least one of the image objects and the annotative text objects.

25. The system according to claim 21 wherein at least one of the narrative text object and the annotative text object is identified on the electronic display by at least one visual indicator.

26. The system according to claim 21 wherein the automatic hybrid reflow process is further configured to:

perform a localized application of the text reflow.

27. The system according to claim 26 wherein the localized application of text reflow is configured to:

assign a reference vertical position to document objects; and perform a recalculate layout routine, wherein placement of the document objects are recalculated in consideration of the reference vertical position.

28. The system according to claim 27 wherein the placement of the document objects includes translating the document objects in synchrony with surrounding narrative text objects.

29. The system according to claim 27 wherein the reference vertical position is established in reference to a narrative text object falling above the document object.

30. The system according to claim 27 wherein the reference vertical position is established in reference to a text line.

31. The method according to claim 30 wherein the reference text line is assigned to all document objects falling below the reference text line location.

32. The system according to claim 30 further including adjusting the document objects that fall below the reference text line of the reflowed narrative text objects, wherein the adjusting maintains a determined vertical distance of the document objects with respect to the reference text line.

33. The system according to claim 27 wherein the reflowing causes the at least one narrative text object to grow or shrink in height.

34. The system according to claim 21 wherein the automatic hybrid reflow process is further configured to:

perform automatic determination of vertical jumps.

35. The system according to claim 34 wherein the automatic determination of vertical jumps is further configured to:

apply a reflow narrative text object routine to the electronic document.

36. The system according to claim 35 wherein the reflow narrative object routine is further configured to:

find a viable text line position to establish a location for a current text line; and build textual content of the current text line.

37. The system according to claim 36 wherein the finding of the viable text line position is further configured to:

determine the limits of the viable text line position in the presence of obstacle document objects;

determine if, by adding at least one current character, a width of the current text line would fall within or outside limits of the viable text line position;

add the at least one current character when it is determined the at least one current character does not extend outside the limits of the viable text line position; and find a next viable text line position for a next text line, when the at least one next character causes the current text line to extend outside the viable text line position.

38. The system according to claim 37 wherein the at least one current character is a group of characters that comprise a word.

39. The system according to claim 37 wherein the finding of the next viable text line, includes a determination of locations of at least one of the obstacle document objects.

40. The system according to claim 21 wherein the reflowed electronic document is at least part of an electronic message composed by the electronic computing device further configured to:
  select and transfer content from a referenced document external of a message composition region to the message composition region for use in the composition of the electronic message,
  wherein the select and transfer occur when a single view is presented to a user.

41. Computer readable program code executed by an electronic computing device comprising at least a processor and a memory, that causes said electronic computing device to perform a method of authoring an electronic document having content including document objects, the document objects including at least text objects and graphical objects, the text objects including at least one of narrative text objects or annotative text objects, and the graphical objects including at least one of image objects, structured graphics, digital ink, and hyperlinks, the method comprising:
  modifying the content of the electronic document;
  automatically assigning a status of narrative text objects to at least one of the text objects at a time of input, wherein the narrative text objects are subject to automatic reflow, and wherein a text object of the text objects is automatically classified as a narrative text object when a left edge of the text object is placed within a predetermined distance from a left edge of a canvas of an electronic display;
  automatically assigning a status of annotative text objects to at least one of the text objects at a time of input, wherein the annotative text objects remain in place relative to local coordinate systems, where the local coordinate systems of graphical objects can be translated with respect to a global system of the entire document, and wherein a text object of the text objects is automatically classified as an annotative text object when a left edge of the text object is not placed within the predetermined distance from the left edge of the canvas of the electronic display;
  performing a recalculate layout routine to recalculate a layout of the electronic document in consideration of the status assigned to the text objects;
  applying an automatic hybrid reflow process; and
  reflowing at least one of the text objects of the electronic document in accordance with the applied automatic hybrid reflow process, wherein the applied automatic hybrid reflow process acts to position the text objects and the graphical objects on the electronic document.

* * * * *